US010678119B2

(12) United States Patent
Okada

(10) Patent No.: US 10,678,119 B2
(45) Date of Patent: *Jun. 9, 2020

(54) INTERCHANGEABLE LENS, IMAGING APPARATUS, AND CAMERA SYSTEM

(71) Applicant: SONY CORPORATION, Tokyo (JP)

(72) Inventor: Aguri Okada, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/254,131

(22) Filed: Jan. 22, 2019

(65) Prior Publication Data

US 2019/0219898 A1 Jul. 18, 2019

Related U.S. Application Data

(63) Continuation of application No. 15/647,917, filed on Jul. 12, 2017, now Pat. No. 10,234,747.

(30) Foreign Application Priority Data

Mar. 3, 2017 (JP) .................................. 2017-040138

(51) Int. Cl.
*G03B 17/14* (2006.01)
*H04N 5/232* (2006.01)
(Continued)

(52) U.S. Cl.
CPC ............. *G03B 17/14* (2013.01); *G02B 7/102* (2013.01); *G03B 7/003* (2013.01); *G03B 17/565* (2013.01);
(Continued)

(58) Field of Classification Search
None
See application file for complete search history.

(56) References Cited

U.S. PATENT DOCUMENTS 5,065,175 A * 11/1991 Suzuki ..................... G02B 7/36
359/827
10,234,747 B2 * 3/2019 Okada ................ H04N 5/23209
(Continued)

FOREIGN PATENT DOCUMENTS

EP 1 914 983 A2 4/2008
EP 2 523 451 A1 11/2012
(Continued)

OTHER PUBLICATIONS

Extended European Search Report dated Feb. 23, 2018 in corresponding European Patent Application No. 17186488.7, 7 pages.
(Continued)

*Primary Examiner* — William B Perkey
(74) *Attorney, Agent, or Firm* — Oblon, McClelland, Maier & Neustadt, L.L.P.

(57) ABSTRACT

Provided is a technology enabling an imaging apparatus and an interchangeable lens to appropriately perform initialization processes. An interchangeable lens includes one or more lens-side processors configured to perform initialization of a plurality of lens-side elements. The one or more lens-side processors is further configured to transmit lens-side initialization element information indicating the plurality of lens-side elements to an imaging apparatus. The technology can be applied to, for example, a camera system including a detachable interchangeable lens and an imaging apparatus serving as a camera body side.

19 Claims, 38 Drawing Sheets

(51) Int. Cl.
  *G03B 7/00* (2014.01)
  *G02B 7/10* (2006.01)
  *G03B 17/56* (2006.01)
(52) U.S. Cl.
  CPC ..... *H04N 5/23209* (2013.01); *H04N 5/23296* (2013.01); *G03B 2206/00* (2013.01)

(56) References Cited

U.S. PATENT DOCUMENTS

| | | |
|---|---|---|
| 2002/0118972 A1 | 8/2002 | Uenaka et al. |
| 2009/0009633 A1 | 1/2009 | Suto |
| 2011/0292270 A1 | 12/2011 | Nakamura |
| 2012/0294598 A1 | 11/2012 | Oikawa et al. |
| 2014/0184892 A1 | 7/2014 | Gutierrez et al. |
| 2015/0229829 A1 | 8/2015 | Oikawa et al. |
| 2016/0070153 A1 | 3/2016 | Oikawa et al. |
| 2017/0034420 A1 | 2/2017 | Oikawa et al. |
| 2017/0223241 A1* | 8/2017 | Yamatsuta ........... H04N 5/2254 |
| 2017/0366734 A1 | 12/2017 | Oikawa et al. |
| 2018/0252989 A1 | 9/2018 | Okada |

FOREIGN PATENT DOCUMENTS

| | | |
|---|---|---|
| EP | 2 645 163 A1 | 10/2013 |
| JP | 4-280239 A | 10/1992 |
| JP | 9-218450 A | 8/1997 |
| JP | 11-15041 A | 1/1999 |
| JP | 11-64956 A | 3/1999 |
| JP | 2009-122287 A | 6/2009 |
| JP | 2010-15137 A | 1/2010 |
| JP | 2011-239301 A | 11/2011 |
| JP | 2012-237932 A | 12/2012 |
| JP | 2013-64844 A | 4/2013 |
| JP | 2013-160897 | 8/2013 |

OTHER PUBLICATIONS

Office Action dated Oct. 19, 2017 in corresponding Japanese Patent Application No. 2017-040138, 4 pages.

* cited by examiner

FIG. 3B

| FILE TYPE IDENTIFIER | |
|---|---|
| IDENTIFIER | CONTENT |
| 0x01h | BODY-SIDE INITIALIZATION EXECUTION ELEMENT INFORMATION |
| 0x02h | LENS-SIDE INITIALIZATION EXECUTION ELEMENT INFORMATION |

FIG. 3C

| ELEMENT IDENTIFIER | |
|---|---|
| IDENTIFIER | CONTENT |
| 0x01h | DIAPHRAGM |
| 0x02h | ZOOM LENS |
| 0x03h | FOCUS LENS |
| 0x04h | CAMERA SHAKE CONTROL |
| 0x05h | LIQUID CRYSTAL ND |
| 0x06h | CAMERA SHAKE LOCK |
| 0x07h | LIQUID CRYSTAL DISPLAY UNIT |

FIG. 3D

| ELEMENT Ver. INFORMATION | |
|---|---|
| IDENTIFIER | CONTENT |
| 0x01h | INITIAL SETTING |
| 0x02h | OPTION SETTING |

FIG. 3A

INITIALIZATION EXECUTION ELEMENT INFORMATION

VARIABLE LENGTH FORMAT:
- DATA SIZE
- FILE TYPE IDENTIFIER
- ELEMENT IDENTIFIER
- ELEMENT Ver. INFORMATION
- ELEMENT IDENTIFIER
- ELEMENT Ver. INFORMATION
- ELEMENT IDENTIFIER
- ELEMENT Ver. INFORMATION
- ELEMENT IDENTIFIER
- ELEMENT Ver. INFORMATION 1 byte (8 bit)

FIG. 4

| BODY-SIDE INITIALIZATION EXECUTION ELEMENT INFORMATION | |
|---|---|
| 0x10h | (DATA SIZE = 16) |
| 0x01h | (BODY-SIDE INITIALIZATION EXECUTION ELEMENT) |
| 0x03h | (FOCUS LENS) |
| 0x01h | (INITIAL SETTING) |
| 0x02h | (ZOOM LENS) |
| 0x01h | (INITIAL SETTING) |
| 0x01h | (DIAPHRAGM) |
| 0x01h | (INITIAL SETTING) |
| 0x04h | (CAMERA SHAKE CONTROL) |
| 0x01h | (INITIAL SETTING) |
| 0x07h | (LIQUID CRYSTAL DISPLAY UNIT) |
| 0x01h | (INITIAL SETTING) |
| 0x06h | (CAMERA SHAKE LOCK) |
| 0x01h | (INITIAL SETTING) |
| 0x05h | (LIQUID CRYSTAL ND) |
| 0x01h | (INITIAL SETTING) |

FIG. 5

| LENS-SIDE INITIALIZATION EXECUTION ELEMENT INFORMATION | |
|---|---|
| 0x0Ah | (DATA SIZE = 10) |
| 0x02h | (LENS-SIDE INITIALIZATION EXECUTION ELEMENT) |
| 0x02h | (ZOOM LENS) |
| 0x01h | (INITIAL SETTING) |
| 0x03h | (FOCUS LENS) |
| 0x01h | (INITIAL SETTING) |
| 0x01h | (DIAPHRAGM) |
| 0x01h | (INITIAL SETTING) |
| 0x04h | (CAMERA SHAKE CONTROL) |
| 0x01h | (INITIAL SETTING) |

FIG. 6A

BODY-SIDE INITIALIZATION EXECUTION ELEMENT INFORMATION

| DIAPHRAGM | ZOOM LENS | FOCUS LENS | CAMERA SHAKE CONTROL |
|---|---|---|---|
|  |  |  |  |

FIG. 6B

LENS-SIDE INITIALIZATION EXECUTION ELEMENT INFORMATION

| DIAPHRAGM | ZOOM LENS | FOCUS LENS | CAMERA SHAKE CONTROL | LIQUID CRYSTAL ID | CAMERA SHAKE LOCK | LENS BARREL DISPLAY UNIT |
|---|---|---|---|---|---|---|
|  |  |  |  |  |  |  |

FIG. 6C

RESULT OF AND OPERATION

| DIAPHRAGM | ZOOM LENS | FOCUS LENS | CAMERA SHAKE CONTROL |
|---|---|---|---|
|  |  |  |  |

FIG. 7

| BIT POSITION | 1 | 2 | 3 | 4 | 5 | 6 | 7 |
|---|---|---|---|---|---|---|---|
| ELEMENT | DIAPHRAGM | ZOOM LENS | FOCUS LENS | CAMERA SHAKE CONTROL | LIQUID CRYSTAL ND | CAMERA SHAKE LOCK | LENS BARREL DISPLAY UNIT |
| VALUE (MEANING) | 1 (ASSOCIATED WITH) | 0 (NOT ASSOCIATED WITH) | 0 (NOT ASSOCIATED WITH) | 0 (NOT ASSOCIATED WITH) | 1 (ASSOCIATED WITH) | 0 (NOT ASSOCIATED WITH) | 0 (NOT ASSOCIATED WITH) |

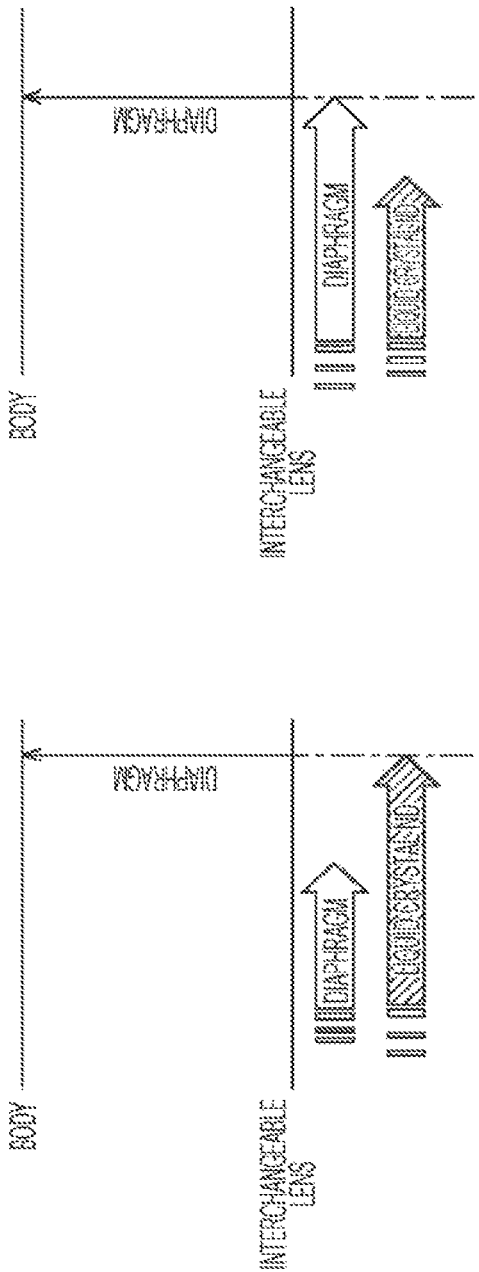

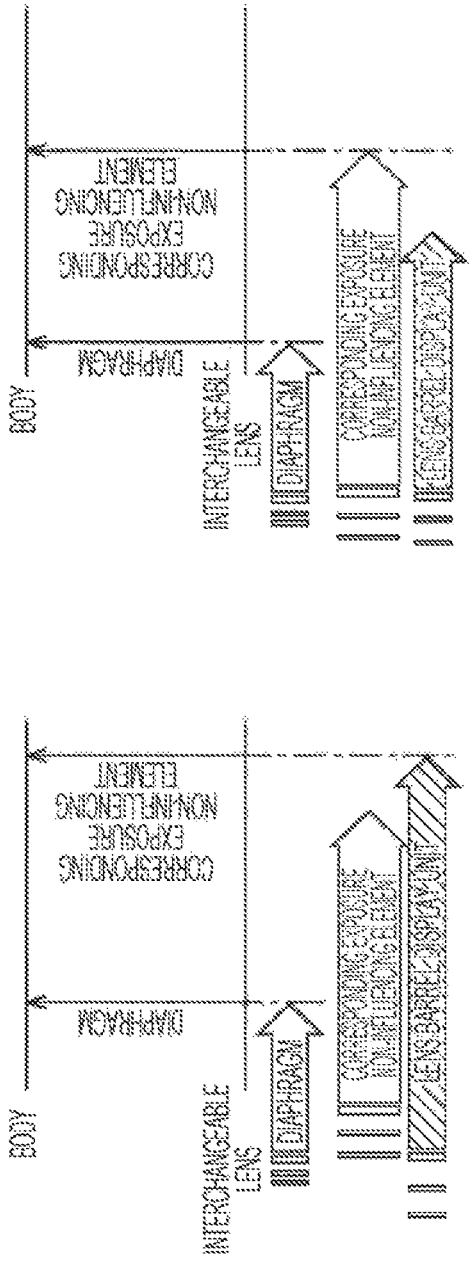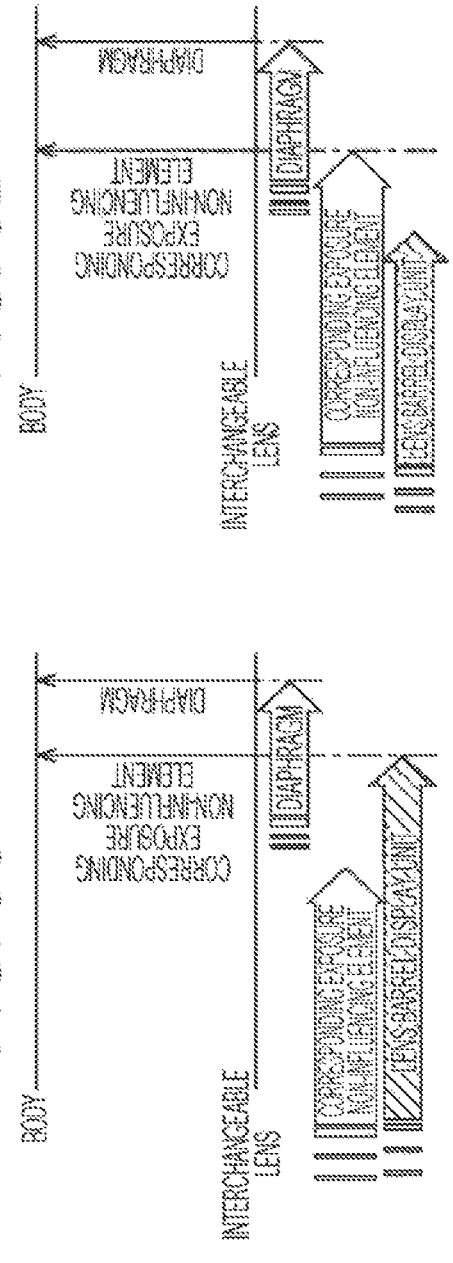

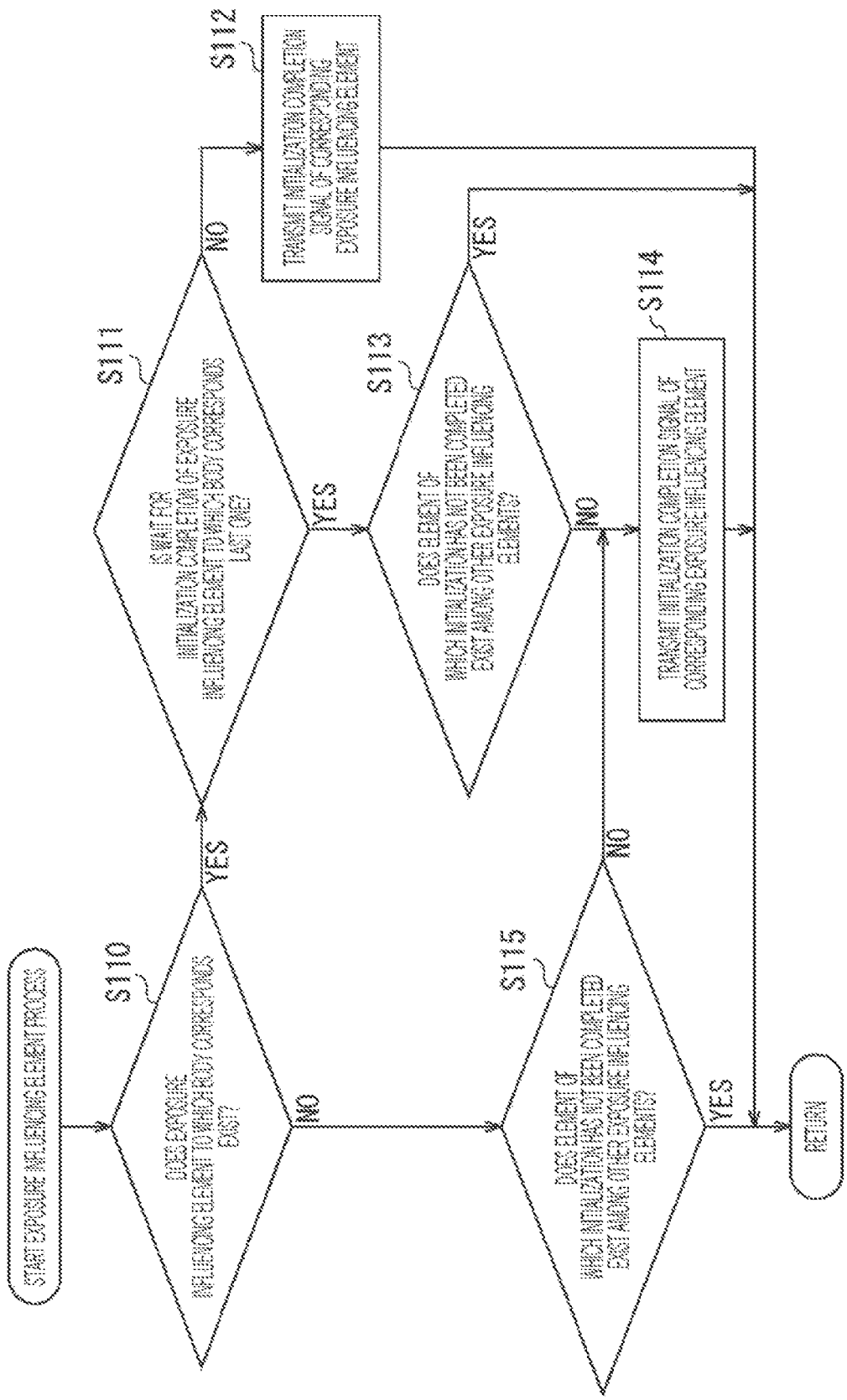

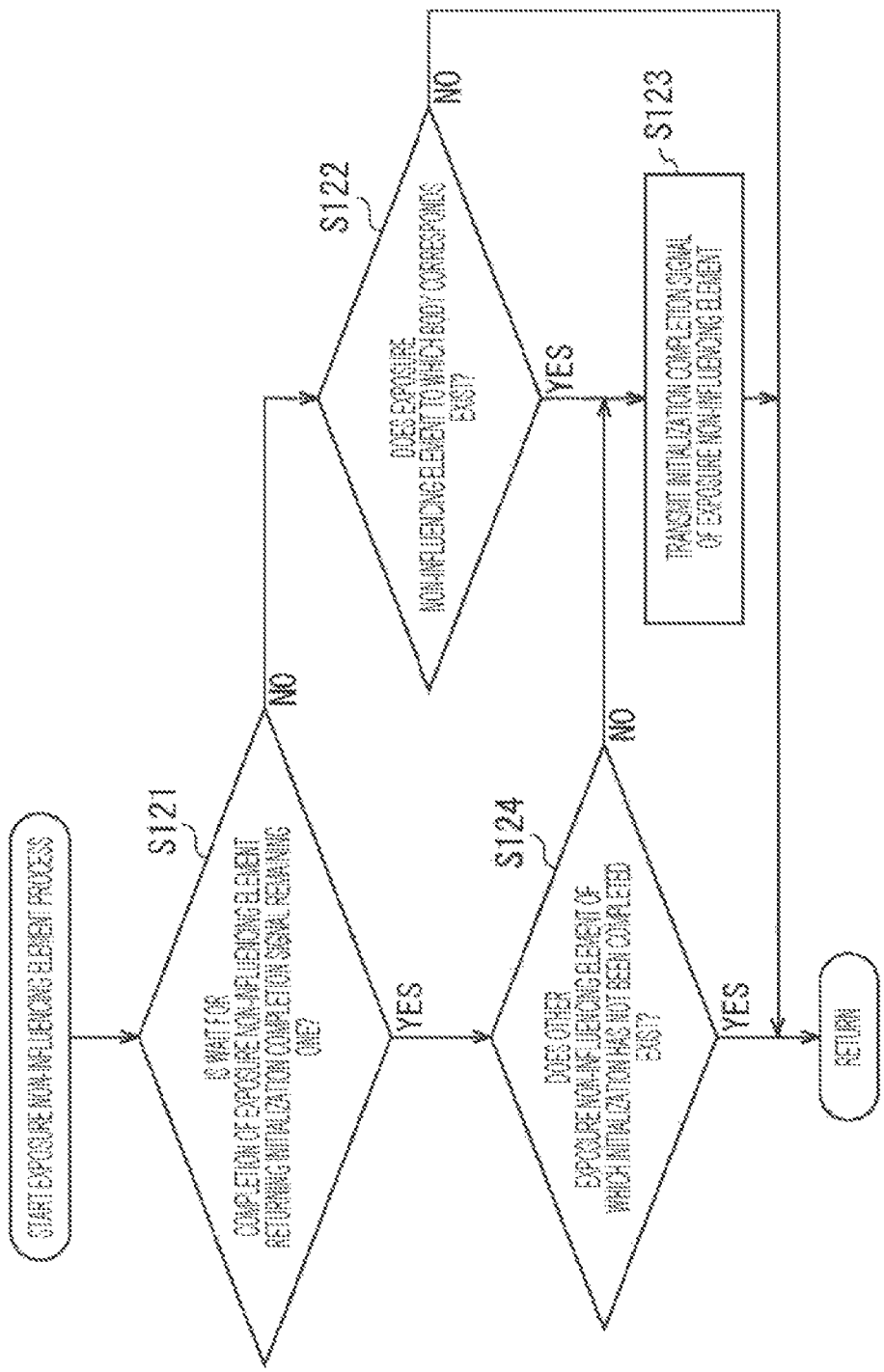

FIG. 20A

BODY-SIDE INITIALIZATION EXECUTION ELEMENT INFORMATION

| DIAPHRAGM | ZOOM LENS | FOCUS LENS | CAMERA SHAKE CONTROL | LIQUID CRYSTAL ND | CAMERA SHAKE LOCK | LENS BARREL DISPLAY UNIT |

FIG. 20B

LENS-SIDE INITIALIZATION EXECUTION ELEMENT INFORMATION

| DIAPHRAGM | ZOOM LENS | FOCUS LENS | CAMERA SHAKE CONTROL | LIQUID CRYSTAL ND | CAMERA SHAKE LOCK | LENS BARREL DISPLAY UNIT |

FIG. 20C

RESULT OF AND OPERATION

| DIAPHRAGM | ZOOM LENS | FOCUS LENS | CAMERA SHAKE CONTROL | LIQUID CRYSTAL ND | CAMERA SHAKE LOCK | LENS BARREL DISPLAY UNIT |

FIG. 23A

BODY-SIDE INITIALIZATION EXECUTION ELEMENT INFORMATION

| DIAPHRAGM | ZOOM LENS | FOCUS LENS | CAMERA SHAKE CONTROL |

FIG. 23B

LENS-SIDE INITIALIZATION EXECUTION ELEMENT INFORMATION

| DIAPHRAGM | FOCUS LENS |

FIG. 23C

RESULT OF AND OPERATION

| DIAPHRAGM | FOCUS LENS |

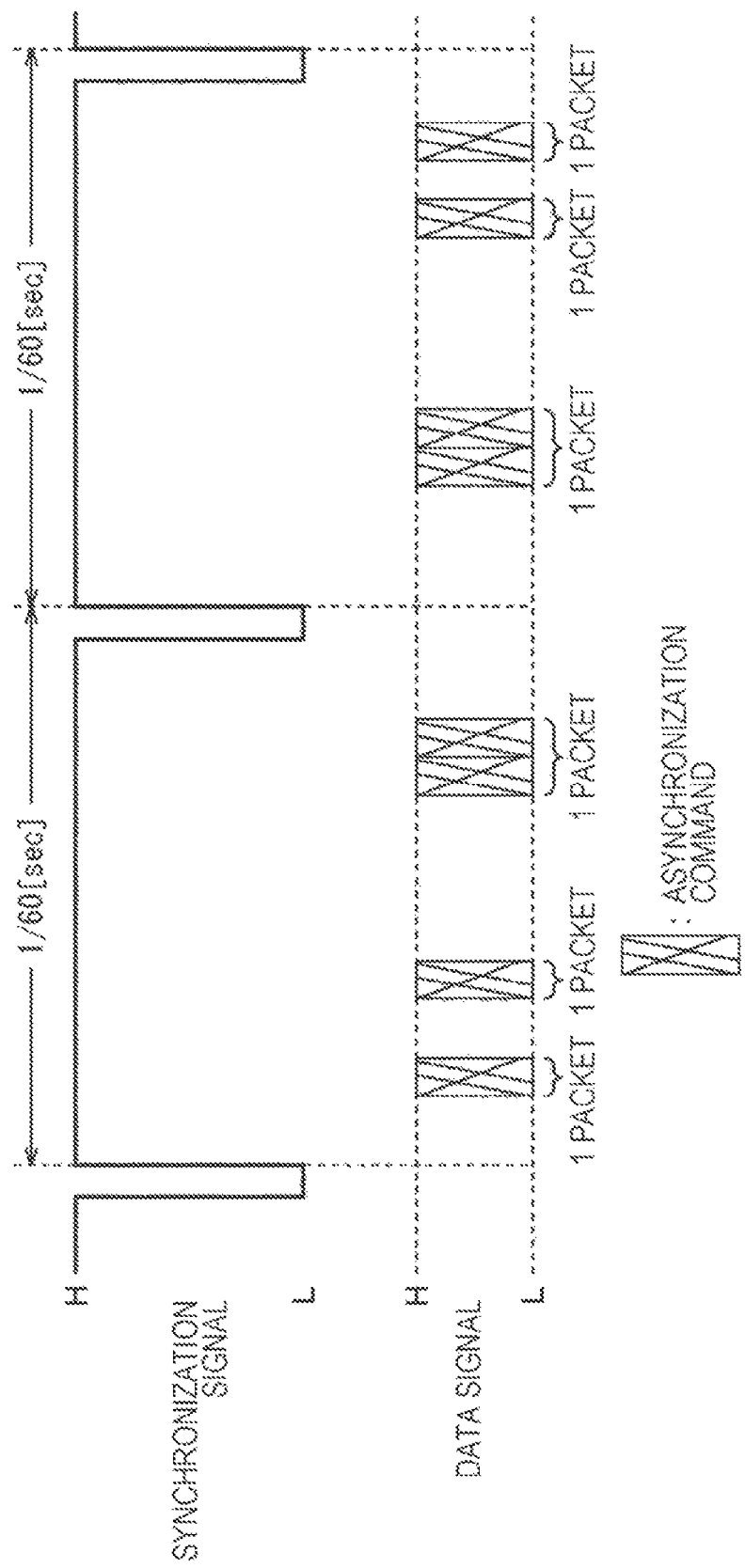

INTERCHANGEABLE LENS, IMAGING APPARATUS, AND CAMERA SYSTEM

CROSS REFERENCE TO RELATED APPLICATIONS

This application is a continuation of U.S. Ser. No. 15/647,917 filed Jul. 12, 2017, which claims the benefit of Japanese Priority Patent Application JP 2017-040138 filed on Mar. 3, 2017, the entire contents of which are incorporated herein by reference.

TECHNICAL FIELD

The present technology relates to an interchangeable lens, an imaging apparatus, and a camera system, and more particularly, to an interchangeable lens, an imaging apparatus, and a camera system that enables an imaging apparatus and an interchangeable lens to appropriately perform an initialization process.

BACKGROUND ART

There is known a camera system including an imaging apparatus and an interchangeable lens detachable from the imaging apparatus. In such an interchangeable lens type camera system, for example, there is an advantage that the interchangeable lens can be replaced in response to the photographing application, or the interchangeable lens can be replaced with a new product added with a new function.

In the interchangeable lens type camera system, when an interchangeable lens is mounted, a process of initializing each element (function) of the mounted interchangeable lens is necessary. For example, in a camera system of PTL 1, in a case where an interchangeable lens is mounted and power-on operation is performed, when a camera body transmits an initialization start command to the interchangeable lens, each driven member of the interchangeable lens executes an initialization process.

CITATION LIST

Patent Literature

[PTL 1]
JP 2012-237932A

SUMMARY

Technical Problem

However, as interchangeable lenses that can be attached to one imaging apparatus, there may be interchangeable lenses having different specifications, interchangeable lenses as new products added with new functions, and the like. Even in such a case, it is necessary for the imaging apparatus and the interchangeable lens to appropriately perform initialization processes.

The present technology has been made in view of such a situation, and the present technology is to enable the imaging apparatus and the interchangeable lens to appropriately perform initialization processes.

Solution to Problem

An interchangeable lens of a first aspect of the present technology includes a lens control unit configured to transmit lens-side initialization execution element information indicating a plurality of lens-side elements on which the lens control unit itself performs initialization to an imaging apparatus in response to reception of body-side initialization execution element information indicating body-side elements on which the imaging apparatus performs initialization from the imaging apparatus.

In the first aspect of the present technology, lens-side initialization execution element information indicating a plurality of lens-side elements on which the lens control unit itself performs initialization is transmitted to an imaging apparatus in response to reception of body-side initialization execution element information indicating body-side elements on which the imaging apparatus performs initialization from the imaging apparatus.

An imaging apparatus of a second aspect of the present technology includes a body control unit configured to transmit body-side initialization execution element information indicating a plurality of body-side elements which are elements on which the body control unit itself performs initialization to an interchangeable lens and to perform initialization on the plurality of body-side elements on which the body control unit itself performs initialization in response to lens-side initialization element information which is received from the interchangeable lens and indicates a plurality of lens-side elements which are elements on which the interchangeable lens performs initialization.

In the second aspect of the present technology, a body control unit transmits body-side initialization execution element information indicating a plurality of body-side elements which are elements on which the body control unit itself performs initialization to an interchangeable lens and performs initialization on the plurality of body-side elements on which the body control unit itself performs initialization in response to lens-side initialization element information which is received from the interchangeable lens and indicates a plurality of lens-side elements which are elements on which the interchangeable lens performs initialization.

According to a third aspect of the present technology, there is provided a camera system including: an interchangeable lens; and an imaging apparatus, in which the interchangeable lens includes a lens control unit configured to transmit lens-side initialization execution element information indicating a plurality of lens-side elements which are elements on which the interchangeable lens performs initialization to the imaging apparatus in response to reception of body-side initialization execution element information indicating body-side elements which are elements on which the imaging apparatus performs initialization from the imaging apparatus, and the imaging apparatus includes a body control unit configured to transmit the body-side initialization execution element information to the interchangeable lens and to perform initialization on a plurality of body-side elements on which the imaging apparatus performs initialization in response to the lens-side initialization execution element information received from the interchangeable lens. In the third aspect of the present technology, an interchangeable lens and an imaging apparatus are included, in which the interchangeable lens transmits lens-side initialization execution element information indicating a plurality of lens-side elements which are elements on which the interchangeable lens performs initialization to the imaging apparatus in response to reception of body-side initialization execution element information indicating body-side elements which are elements on which the imaging apparatus performs initialization from the imaging apparatus. On the other hand, in the imaging apparatus, the body-side initialization execution element information is transmitted to the interchangeable lens, and the initialization is performed on the plurality of body-side elements on which the imaging apparatus performs initialization in response to the lens-side initialization execution element information received from the interchangeable lens.

Advantageous Effects of Invention

According to the first to third aspects of the present technology, the imaging apparatus and the interchangeable lens can appropriately perform the initialization processes.

In addition, the effects described herein are not necessarily limited, and any of the effects described in the present disclosure may be obtained.

BRIEF DESCRIPTION OF DRAWINGS

FIGS. 3A-3D are diagrams illustrating a data format of initialization execution element information.

FIG. 4 is a diagram illustrating an example of body-side initialization execution element information.

FIG. 5 is a diagram illustrating an example of lens-side initialization execution element information.

FIGS. 6A-6C are diagrams illustrating an example of initialization execution element information in a case where the interchangeable lens is higher in functionality than the body.

FIG. 7 is a diagram illustrating an example of exposure adjustment process information.

FIGS. 8A-8B are diagrams illustrating transmission of an initialization completion signal for a liquid crystal ND which is a non-corresponding exposure influencing element.

FIGS. 9A-9D are diagrams illustrating transmission of an initialization completion signal for a lens barrel display unit which is a non-corresponding exposure non-influencing element.

FIG. 18 is a flowchart illustrating an exposure influencing element process executed in step S78 of FIG. 16.

FIG. 19 is a flowchart illustrating an exposure non-influencing element process executed in step S79 of FIG. 16.

FIGS. 20A-20C are diagrams illustrating initialization execution element information and a result of an AND operation in a case where the interchangeable lens and the body are equivalent in function.

FIGS. 23A-23C are diagrams illustrating initialization execution element information and a result of an AND operation in a case where the interchangeable lens is lower in function than the body.

FIG. 38 is a time chart illustrating an example of packet communication in step S507 of FIG. 35.

DESCRIPTION OF EMBODIMENTS

Hereinafter, modes (hereinafter, referred to as embodiments) for implementing the present technology will be described. Note that the description will be performed in the following order.

1. Block Diagram of Camera System
2. Overview of Initialization Process

3. Initialization Execution Element Information Data Format

4. First Initialization Process 4.1 Case Where Interchangeable Lens Is Higher in Function than Body 4.2 Case Where Interchangeable Lens and Body Are Equivalent in Function 4.3 Case Where Interchangeable Lens Is Lower in Function than Body 5. Second Initialization Process 5.1 Case Where Interchangeable Lens Is Higher in Function than Body 5.2 Case Where Interchangeable Lens and Body Are Equivalent in Function 5.3 Case Where Interchangeable Lens Is Lower in Function than Body 6. Selection of Initialization Process 7. Summary 8. Synchronization Commands and Asynchronization Commands <1. Block Diagram of Camera System>

Figure 1:
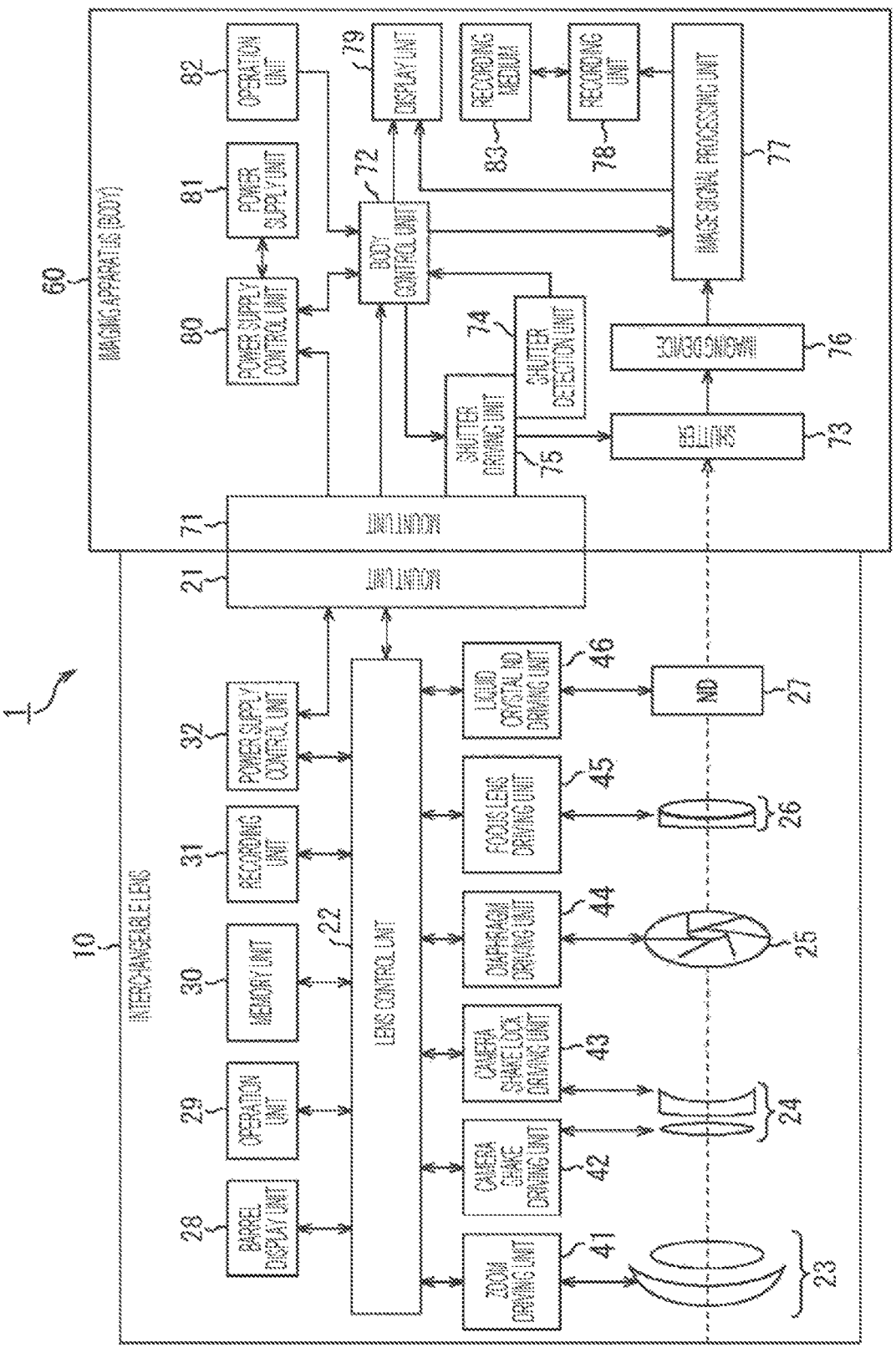
FIG. 1 is a block diagram illustrating a configuration example of an embodiment of a camera system to which the present technology is applied.

FIG. 1 is a block diagram illustrating a configuration example of an embodiment of a camera system to which the present technology is applied.

The camera system 1 in FIG. 1 is a lens interchangeable type digital camera and is configured to include a detachable interchangeable lens 10 and an imaging apparatus 60 which is on a camera body side. The interchangeable lens 10 is configured to include a mount unit 21 which is detachably attached to a mount unit 71 of the imaging apparatus 60. The mount unit 21 has a plurality of terminals (not illustrated) which are to be electrically connected to the imaging apparatus 60.

In addition, the interchangeable lens 10 is configured to include a lens control unit 22, a zoom lens 23, a camera shake correction lens 24, a diaphragm 25, a focus lens 26, a liquid crystal neutral density (ND) filter 27, a lens barrel display unit 28, an operation unit 29, a memory unit 30, a recording unit 31, and a power supply control unit 32.

Furthermore, the interchangeable lens 10 is configured to include a zoom driving unit 41, a camera shake driving unit 42, a camera shake lock driving unit 43, a diaphragm driving unit 44, a focus lens driving unit 45, and a liquid crystal ND driving unit 46.

The lens control unit 22 is configured to include an arithmetic processing unit such as a central processing unit (CPU), a micro processing unit (MPU), peripheral circuits, and the like to control the entire interchangeable lens 10 by reading out and executing a predetermined control program recorded in the recording unit 31.

For example, the lens control unit 22 controls the position of the zoom lens 23 according to instruction from the imaging apparatus 60 supplied through a predetermined communication terminal of the mount unit 21 or user's operation accepted by the operation unit 29. More specifically, the lens control unit 22 acquires the current position of the zoom lens 23 from a zoom position detection sensor (not illustrated) configured with, for example, a magnetic sensor (MR sensor) or the like, determines a driving direction and amount for moving the zoom lens 23 to a predetermined position on the basis of a result of the acquisition, and outputs the determined driving direction and amount together with the movement instruction to the zoom driving unit 41. On the basis of the movement instruction supplied from the lens control unit 22, the zoom driving unit 41 moves the zoom lens 23 in the optical axis direction so as to obtain the instructed driving direction and amount.

In addition, the lens control unit 22 controls the camera shake correction lens 24 so as to correct camera shake. Specifically, the lens control unit 22 determines the driving direction and amount of the camera shake correction lens 24 in the direction for removing the camera shake amount on the basis of the camera shake amount detected by the camera shake detection sensor (not illustrated) and outputs the determined driving direction and amount together with the movement instruction to the camera shake driving unit 42. The camera shake detection sensor is configured with, for example, one or both of a gyro sensor and a triaxial acceleration sensor. The gyro sensor is used for detecting shift (blur) in the direction corresponding to pitch or yaw as a correction direction of the camera shake correction lens 24. The triaxial acceleration sensor is used for detecting shift (blur) in the directions of the X axis and the Y axis in a case where the optical axis direction is set as the Z axis. The camera shake driving unit 42 moves the camera shake correction lens 24 on the basis of the movement instruction supplied from the lens control unit 22 so as to achieve the instructed driving direction and amount.

The lens control unit 22 performs control to mechanically lock the camera shake correction lens 24 in a case where the power supply is turned off. Namely, in a state where power is supplied from the imaging apparatus 60 to the interchangeable lens 10, the camera shake correction lens 24 is controlled to a predetermined position by the control through the camera shake driving unit 42. However, if power is turned off, the position control by the camera shake driving unit 42 is stopped, and the camera shake correction lens 24 falls down by a predetermined amount in the direction of gravity. According to the timing when power is turned off, the lens control unit 22 mechanically locks the camera shake correction lens 24 through the camera shake lock driving unit 43 to prevent the camera shake correction lens from falling down. The camera shake lock driving unit 43 mechanically locks the camera shake correction lens 24 on the basis of fixation instruction supplied from the lens control unit 22.

The lens control unit 22 controls (an aperture diameter of) the diaphragm 25 in response to instruction from the imaging apparatus 60 which is supplied through a predetermined communication terminal of the mount unit 21. Specifically, the lens control unit 22 acquires the aperture diameter of the diaphragm 25 detected by an aperture detection sensor (not illustrated) and instructs the diaphragm driving unit 44 to drive the diaphragm 25 so that the diaphragm has an F value instructed from the imaging apparatus 60. The diaphragm driving unit 44 drives the diaphragm 25 so as to have an aperture diameter instructed from the lens control unit 22. Furthermore, the lens control unit 22 controls the focus lens 26. Specifically, the lens control unit 22 acquires the current position of the focus lens 26 from a lens position detection sensor (not illustrated), determines the driving direction and amount for moving the focus lens 26 to a predetermined position on the basis of a result of the acquisition, and outputs the determined driving direction and amount together with the movement instruction to the focus lens driving unit 45. The focus lens driving unit 45 moves the focus lens 26 in the optical axis direction so as to achieve the instructed driving direction and amount. The focus lens 26 includes one or a plurality of optical elements. In addition, the focus lens 26 may be configured with two types of focus lens groups, that is, a focus lens group on the side closer to the zoom lens 23 and a focus lens group on the side closer to an imaging device 76 of the imaging apparatus 60.

The lens position detection sensor may be configured with, for example, a magnetic sensor, a photodiode array, a potentiometer, a reflection type encoder, or the like.

The focus lens driving unit 45 may be configured with, for example, an ultrasonic motor, a DC motor, a linear actuator, a stepping motor, a piezo element (piezoelectric element), or the like.

The lens control unit 22 controls the liquid crystal ND filter 27. Specifically, the lens control unit 22 determines transmittance of the liquid crystal ND filter 27 in response to instruction from the imaging apparatus 60 supplied through a predetermined communication terminal of the mount unit 21 or user's operation accepted by the operation unit 29 and outputs the determined transmittance to the liquid crystal ND driving unit 46. The liquid crystal ND driving unit 46 determines a voltage value at which the instructed transmittance is obtained and supplies a driving voltage to the liquid crystal ND filter 27. The liquid crystal ND filter 27 changes the light transmittance in response to the driving voltage by using a liquid crystal element.

The lens barrel display unit 28 is a display unit which is arranged in the lens barrel unit and is configured to include a liquid crystal panel or an organic EL (Electro Luminescence) display. The lens barrel display unit 28 displays predetermined numerical values, characters, or symbols such as a focus distance and a depth of field at the current lens position.

The operation unit 29 corresponds to a zoom ring for manually setting zoom magnification, a focus ring for manually setting a focus lens, and the like, accepts a manual operation by a user, and supplies an operation signal corresponding to the received operation to the lens control unit 22.

The memory unit 30 is, for example, a volatile storage medium such as a RAM (Random Access Memory) and is used as a storage area for various data during operation.

The recording unit 31 is a nonvolatile storage medium, and the recording unit 31 stores various data such as a predetermined control program and adjustment parameters executed by the lens control unit 22.

The power supply control unit 32 detects a power amount of power supplied from the imaging apparatus 60 and supplies power with optimally allocated power amounts to each unit (the lens control unit 22 and various driving units) inside the interchangeable lens 10 on the basis of the detected power amount.

On the other hand, the imaging apparatus 60 which is on the body side is configured to include a mount unit 71 to which the interchangeable lens 10 is detachably attached. The mount unit 71 has a plurality of terminals (not illustrated) which are to be electrically connected to the mount unit 21 of the interchangeable lens 10.

When the interchangeable lens 10 is mounted on the mount unit 71 of the imaging apparatus 60, the terminals of the mount unit 71 and the corresponding terminals of the mount unit 21 of the interchangeable lens 10 are electrically and physically connected to each other. As the terminals to be connected, for example, there are a terminal for power supply (power supply terminal), a terminal for transmitting commands and data (communication terminal), a terminal for transmitting a synchronous signal (synchronous signal terminal), and the like.

The imaging apparatus 60 is configured to further include a body control unit 72, a shutter 73, a shutter detection unit 74, a shutter driving unit 75, an imaging device 76, an image signal processing unit 77, a recording unit 78, a display unit 79, a power supply control unit 80, a power supply unit 81, and an operation unit 82.

The body control unit 72 is configured to include, for example, an arithmetic processing unit such as a CPU (Central Processing Unit) and an MPU (Micro Processing Unit), a nonvolatile memory, peripheral circuits, and the like to control the entire camera system 1 by reading out and executing a predetermined control program stored in an internal nonvolatile memory.

For example, the body control unit 72 allows the imaging device 76 to perform imaging or to transmit a predetermined command to the interchangeable lens 10 through the mount unit 71 to drive the focus lens 26, the zoom lens 23, and the like on the basis of an operation signal representing user's predetermined operation supplied from the operation unit 82.

Furthermore, for example, lens position information of the focus lens 26, zoom position information of the zoom lens 23, or the like is supplied from the interchangeable lens 10 to the body control unit 72 through the mount unit 71, and the body control unit 72 allows the imaging device 76 to perform capturing an image to be recorded in the recording unit 78 and capturing an image for transmission to an external device at an optimum timing based on the information. The image (or data thereof) obtained by the imaging device 76 is recorded (stored) in a recording medium 83 through the recording unit 78 or displayed on the display unit 79 under the control of the body control unit 72.

The shutter 73 is arranged in front of the imaging device 76 and is opened and closed under the control of the shutter driving unit 75. When the shutter 73 is in the closed state, the light of the object passing through the optical system of the interchangeable lens 10 is shut off. The shutter detection unit 74 detects the opened/closed state of the shutter 73 and supplies a result of the detection to the body control unit 72. The shutter driving unit 75 drives the shutter 73 in the open state or the closed state under the control of the body control unit 72.

The imaging device 76 is configured with, for example, a charge coupled device (CCD) or complementary metal oxide semiconductor (CMOS) sensor, or the like to capture an image of an object, generates image data, and outputs the image data.

In addition, in a case where the imaging device 76 is configured with a CCD sensor or a CMOS sensor, an electronic shutter can be used, so that the shutter 73 can be omitted. In a case where the shutter 73 is omitted, the shutter detection unit 74 and the shutter driving unit 75 used for the control of the shutter are also omitted. The image signal processing unit 77 executes a predetermined image signal process on the image supplied from the imaging device 76. For example, the image signal processing unit 77 converts a RAW image supplied from the imaging device 76 into image data in a predetermined file format and records the image data on the recording medium 83 through the recording unit 78. In addition, the image signal processing unit 77 performs a demosaic process on the RAW image, furthermore, performs lossless compression or irreversible compression to converts the image into image data in a predetermined file format, and records the image data on the recording medium 83 through the recording unit 78. In addition, for example, the image signal processing unit 77 converts the image data supplied from the imaging device 76 into an image signal in a predetermined display format, supplies the image signal to the display unit 79, and displays the captured image.

The recording unit 78 controls recording (storing) the data or the like of the image captured by the imaging device 76 on the recording medium 83 configured with, for example, a nonvolatile memory or controls reading the image data from the recording medium 83. The recording medium 83 may be configured to be removable.

The display unit 79 is configured with a panel type display device such as a liquid crystal panel or an organic EL display to display an image (a moving image or a still image) supplied from the image signal processing unit 77. The display unit 79 is arranged on the rear surface opposite to the front surface where the mount unit 71 is arranged and can perform displaying a through image, displaying an image recorded on the recording medium 83, and the like.

The power supply control unit 80 supplies the power supplied from the power supply unit 81 to each unit of the imaging apparatus 60. Furthermore, the power supply control unit 80 calculates the power amount of the power that can be supplied to the interchangeable lens 10 in consideration of an operation state of the imaging apparatus 60 and supplies the power to the interchangeable lens 10 through the mount unit 71. The power supply unit 81 is configured with, for example, a NiCd battery, a NiMH battery, a secondary battery such as a Li battery, an AC adapter, and the like.

The operation unit 82 is configured to include hardware keys such as a shutter button, a mode dial, and a zoom button and software keys on a touch panel laminate on the display unit 79 to accept a predetermined operation performed by the user and to transmit an operation signal to the body control unit 72. By operating the operation unit 82, the user can perform, for example, setting a shooting mode, setting camera parameters, and the like.

In the camera system 1 configured as described above, a lock function of the camera shake correction lens 24 included in the interchangeable lens 10, a light amount adjustment function of the liquid crystal ND filter 27, and a display function of the lens barrel display unit 28 do not exist in an old-type interchangeable lens, but these functions are newly added configuration (function) by model change or the like.

<2. Overview of Initialization Process>

An imaging apparatus 60 (hereinafter, referred to as a body 60) on the camera body side executes a initialization process for initializing the entire camera system 1 in a case where the interchangeable lens 10 is mounted on the imaging apparatus 60 and the power is turned on.

In addition, in case of mounting the interchangeable lens 10 on the imaging apparatus 60, it is assumed that the mount type of the mount unit 71 of the imaging apparatus 60 and the mount type of the mount unit 21 of the interchangeable lens 10 are the same. However, in a case where the two mount types are different, a mount adapter for converting the mount types is inserted between the imaging apparatus 60 and the interchangeable lens 10, so that even a different mount type interchangeable lens can be mounted.

Figure 2:
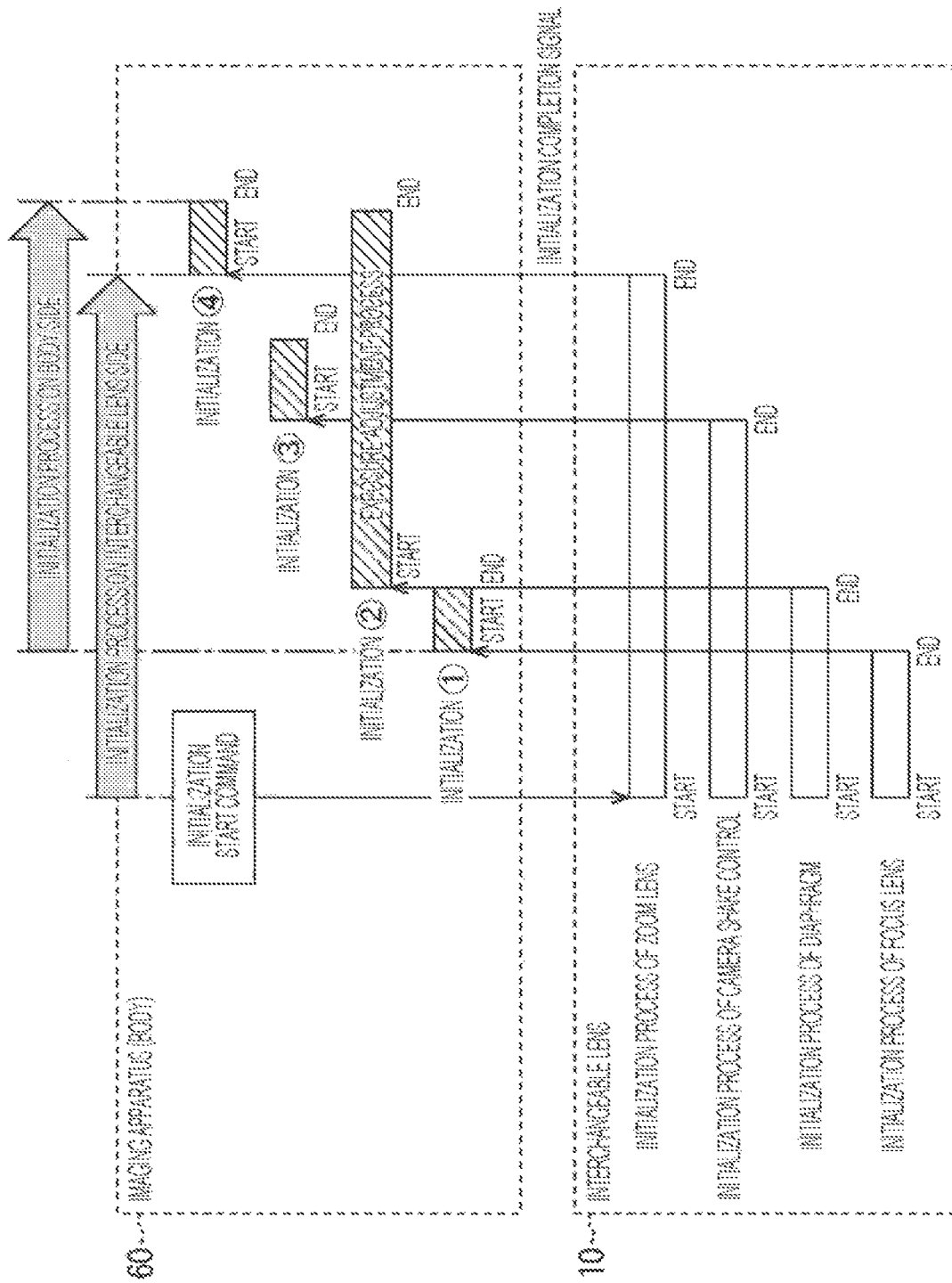
FIG. 2 is a diagram illustrating a schematic flow of an initialization process executed in a camera system.

FIG. 2 is a diagram illustrating a schematic flow of the initialization process executed in the camera system 1.

In the initialization process, an initialization start command for starting initialization is transmitted from the body control unit 72 on the body 60 side to the lens control unit 22 of the interchangeable lens 10.

Upon receiving the initialization start command, the lens control unit 22 performs initialization for each element in the interchangeable lens 10.

Herein, the element is a control unit which is a group of modules (parts) in the interchangeable lens 10 in a predetermined unit of a device, an optical member, a function, or the like. In the interchangeable lens 10 according to the embodiment, the elements may be classified into a control mechanism of the zoom lens 23, a control mechanism of the camera shake correction lens 24, a lock mechanism of the camera shake correction lens 24, a control mechanism of the diaphragm 25, a control mechanism of the focus lens 26, a control mechanism of the liquid crystal ND filter 27, and a display mechanism of the lens barrel display unit 28.

In the following description, for simplifying the description, the elements of the control mechanism of the zoom lens 23 of the interchangeable lens 10, the control mechanism of the camera shake correction lens 24, the lock mechanism of the camera shake correction lens 24, the control mechanism of the diaphragm 25, the control mechanism of the focus lens 26, the control mechanism of the liquid crystal ND filter 27, and the display mechanism of the lens barrel display unit 28 are simply referred to as a zoom lens, a camera shake control, a camera shake lock, a diaphragm, a focus lens, a liquid crystal ND, and a lens barrel display unit, respectively. Upon receiving the initialization start command, the lens control unit 22 starts the initialization process for each element of the zoom lens, the camera shake control, the camera shake lock, the diaphragm, the focus lens, the liquid crystal ND, and the lens barrel display unit.

In addition, in FIG. 2, the three elements of the camera shake lock, the liquid crystal ND, and the lens barrel display unit which are elements corresponding to the newly added configurations are omitted, and a case where the three new elements are not provided will be described.

At the timing when each element in the interchangeable lens 10 completes the initialization, the lens control unit 22 transmits to the body control unit 72 an initialization completion signal indicating that the initialization of each element has been completed. Specifically, at the timing when the initialization of the focus lens has been completed, an initialization completion signal of the focus lens is transmitted, and at the timing when the initialization of the diaphragm has been completed, an initialization completion signal of the diaphragm is transmitted. Similarly, at the timing when the initialization of the camera shake control has been completed, an initialization completion signal of the camera shake control is transmitted, and at the timing when the initialization of the zoom lens has been completed, an initialization completion signal of the zoom lens is transmitted. During the initialization process, the lens control unit 22 does not give notice of the initialization status of each element sequentially.

Upon receiving the initialization completion signal representing the completion of initialization in unit of an element, the body control unit 72 starts a initialization process (hereinafter, referred to as an element corresponding initialization process) on the body side corresponding to an element of which the initialization has been completed, for each received element.

For example, upon receiving the initialization completion signal of the focus lens, the body control unit 72 starts an element corresponding initialization process corresponding to the focus lens, and upon receiving the initialization completion signal of the diaphragm, the body control unit 72 starts an element corresponding initialization process corresponding to the diaphragm. Similarly, upon receiving the initialization completion signal of the camera shake control, the body control unit 72 starts an element corresponding initialization process corresponding to the camera shake control, and upon receiving the initialization completion signal of the zoom lens, the body control unit 72 starts an element corresponding initialization process corresponding to the zoom lens. In the example of FIG. 2, the initialization processes of the entire interchangeable lens 10 side correspond to the interval from the timing when the initialization start command is received and the initialization of each element is started to the timing when the initialization process of the zoom lens has been completed, that is, when the initialization process of the element is finally completed. The initialization processes of the entire body 60 side correspond to the interval from the time when the initialization completion signal is first received and the element corresponding initialization process corresponding to the element is started to the timing when the element corresponding initialization process corresponding to the last received initialization completion signal has been completed.

In addition, although FIG. 2 illustrates an example in which the lens control unit 22 simultaneously starts the initialization processes of the elements, the order of execution of the initialization processes of the elements is arbitrary, and the start time points of the initialization processes of the elements may be different.

On the body 60 side, the exposure adjustment process which is a process of adjusting the brightness to an appropriate range in response to the setting of the light amount in the interchangeable lens 10 side can be executed when the initialization of the diaphragm changing the light amount among the elements of the interchangeable lens 10 has been completed. The exposure adjustment process includes, for example, adjustment of a signal gain, adjustment of a shutter speed, adjustment of white balance, and the like of the imaging device 76.

In general, among the element corresponding initialization processes executed by the body side, the element corresponding initialization process corresponding to the diaphragm (hereinafter, also referred to as diaphragm element corresponding initialization process) includes the exposure adjustment process, and thus, the process time of the diaphragm element corresponding initialization process is longer than those of other element corresponding initialization processes.

In the camera system 1, as illustrated in FIG. 2, since the initialization completion signals are sequentially transmitted in unit of an element of the interchangeable lens 10, the imaging apparatus 60 side can sequentially start the necessary element corresponding initialization processes according to the elements of which the initialization completion signals have been received. For example, as illustrated in FIG. 2, even though the camera shake control or the initialization of the elements of the zoom lens has not been completed, since the diaphragm element corresponding initialization process of which the initialization process time is relatively long can be started at the point of receiving the initialization completion signal of the diaphragm, it is possible to shorten the time required for the initialization processes of the entire camera system 1 and to increase the activation time. Herein, as described with reference to FIG. 2, in order to complete the initialization by executing the initialization process in unit of an element, it is necessary for the interchangeable lens 10 and the body 60 to know the number of elements that transmit and receive the initialization completion signals.

For example, in a case where the body 60 does not know the number of elements of the initialization completion signals transmitted by the interchangeable lens 10, the body 60 receives the sequentially transmitted initialization completion signals, but the body does not know which of the initialization completion signals is an initialization completion signal of the last element and does not know how long to wait for the initialization completion signal.

Namely, it may be difficult to grasp the timing when the initialization processes for all the elements have been completed. Therefore, in the camera system 1, each of the interchangeable lens 10 and the body 60 is configured to notify the counter party of the element information indicating the element to which each of the interchangeable lens and the body corresponds.

<3. Initialization Execution Element Information Data Format>

A of FIG. 3 corresponds to the interchangeable lens 10 or the body 60 itself and illustrates a data format at the time of notifying the counter party of element information (hereinafter, referred to as initialization execution element information) indicating the element performing the initialization.

The initialization execution element information is configured to include a data size, a file type identifier, one or more element identifiers, and element ver. information (element version information). Each data of the data size, the file type identifier, the element identifier, and the element ver. information is represented by information of 1 byte (8 bits). The element identifiers and the element ver. information are stored as many as the number corresponding to the elements on which the interchangeable lens 10 or the body 60 as a transmission source performs initialization.

Therefore, the initialization execution element information is of a variable length format of which the data size varies according to the number of elements.

The data size indicates the data size of the initialization execution element information to be transmitted.

The file type identifier is information identifying whether the initialization execution element information to be transmitted is the initialization execution element information on the body 60 side (hereinafter, also referred to as body-side initialization execution element information) or the initialization execution element information on the interchangeable lens 10 side (hereinafter, also referred to as lens-side initialization execution element information).

For example, as illustrated in B of FIG. 3, in a case where the initialization execution element information to be transmitted is initialization execution element information on the body 60 side, 0x01h is stored in the file type identifier. On the other hand, in a case where the initialization execution element information to be transmitted is the initialization execution element information on the interchangeable lens 10 side, 0x02h is stored in the file type identifier. In addition, in FIGS. 3 to 5, the notation of 0xYYh denotes that "YY" is expressed in hexadecimal notation.

The element identifier is information identifying an element on which the interchangeable lens 10 or the body 60 as a transmission source performs initialization.

For example, as illustrated in C of FIG. 3, in a case where the element on which the interchangeable lens 10 or the body 60 as a transmission source performs initialization is the diaphragm, 0x01h is stored in the element identifier, and in a case where the element is the zoom lens, and 0x02h is stored in the element identifier. Similarly, in a case where the elements are the focus lens, the camera shake control, the liquid crystal ND, the camera shake lock, the liquid crystal display unit, 0x03h, 0x04h, 0x05h, 0x06h, and 0x07h are stored in the element identifiers, respectively.

The element ver. information is information indicating version information of an element indicated by an element identifier transmitted as a set with the element ver. information.

For example, as illustrated in D of FIG. 3, in a case where the element ver. information is 0x01h, the information indicates that the element is an initial setting version, and in a case where the element ver. information is 0x02h, the information indicates that the element is an option setting version.

FIG. 4 illustrates an example of the body-side initialization execution element information which is initialization execution element information transmitted by the body 60 side.

According to the example of FIG. 4, the body 60 corresponds to each of the elements of the focus lens, the zoom lens, the diaphragm, the camera shake control, the liquid crystal display unit, the camera shake lock, and the liquid crystal ND and performs initialization thereof.

FIG. 5 illustrates an example of the lens-side initialization execution element information which is initialization execution element information transmitted by the interchangeable lens 10 side. According to the example of FIG. 5, the interchangeable lens 10 corresponds to each of the elements of the zoom lens, the focus lens, the diaphragm, and the camera shake control and performs initialization thereof.

The element identifier and the element ver. information are stored corresponding to the number of elements on which the interchangeable lens 10 or the body 60 as a transmission source performs initialization. However, as illustrated in FIGS. 4 and 5, the order of storing the element identifier and the element ver. information is considered to be arbitrary, and there is no particular order. Therefore, the lens control unit 22 or the body control unit 72 that has received the initialization execution element information sorts the element identifiers and the element ver. information stored in the received initialization execution element information of the counter party in an arbitrary order such as a descending order and compares the initialization execution element information with the initialization execution element information of the lens control unit itself to determine whether or not the counter party side has an element to which the lens control unit itself does not correspond. In addition, in an actual combination of the interchangeable lens 10 and the body 60, there may be cases where it may not be said that one of the interchangeable lens 10 and the body 60 is higher in function, for example, a case where the interchangeable lens 10 and the body 60 are provided with elements which do not exist on the counter party. In this specification, a case where the interchangeable lens 10 is higher in function than the body 60 denotes a case where the interchangeable lens 10 is provided with an element which the body 60 does not correspond to. On the contrary, a case where the interchangeable lens 10 is lower in function than the body 60 denotes a case where the interchangeable lens 10 is not provided with an element which the body 60 corresponds to and can perform initialization on.

<4. First Initialization Process>

The initialization process executed by the camera system 1 will be described more in detail.

A first initialization process which is a first example of the initialization process according to an embodiment of the present disclosure will be described.

<4.1 Case where Interchangeable Lens is Higher in Function than Body>

First, a case where the interchangeable lens 10 is higher in function than the body 60, specifically, a case where the interchangeable lens 10 is provided with three new elements of a camera shake lock, a liquid crystal ND, and a barrel display unit but the body 60 does not correspond to the three new elements will be described.

The body 60 transmits, to the interchangeable lens 10, element information indicating an element to which the body itself corresponds as body-side initialization execution element information indicating elements on which the body performs initialization.

A of FIG. 6 illustrates elements (body-side elements) which are indicated by the body-side initialization execution element information and on which the body 60 performs initialization. The body 60 does not correspond to the three new elements of the camera shake lock, the liquid crystal ND, and the lens barrel display unit and performs initialization on four elements of the diaphragm, the zoom lens, the focus lens, and the camera shake control.

The interchangeable lens 10 also transmits, to the body 60, element information indicating an element to which the interchangeable lens itself corresponds as lens-side initialization execution element information indicating elements on which the interchangeable lens performs initialization.

B of FIG. 6 illustrates elements (lens-side elements) which are indicated by the lens-side initialization execution element information and on which the interchangeable lens 10 performs initialization.

The interchangeable lens 10 corresponds to three new elements of the camera shake lock, the liquid crystal ND, and the lens barrel display unit and performs initialization on seven elements of the diaphragm, the zoom lens, the focus lens, the camera shake control, the liquid crystal ND, the camera shake lock, and the lens barrel display unit.

In this case, since the body 60 does not correspond to the three new elements of the camera shake lock, the liquid crystal ND, and the lens barrel display unit, the interchangeable lens 10 may not transmit initialization completion signals of these elements to the body 60.

As illustrated in C of FIG. 6, the elements of which the initialization completion signals the interchangeable lens 10 can transmit are elements common to the body-side initialization execution element information and the lens-side initialization execution element information, that is, elements corresponding to an operation result obtained by sorting the body-side initialization execution element information and the lens-side initialization execution element information in an arbitrary order and performing AND operation. Therefore, the interchangeable lens 10 can transmit the initialization completion signal for only the diaphragm, the zoom lens, the focus lens, and the camera shake control.

Herein, as described with reference to FIG. 2, the body control unit 72 on the body 60 side that has received the initialization completion signal in unit of an element executes the element corresponding initialization processes. If the interchangeable lens 10 transmits the initialization completion signal of the diaphragm, the body 60 starts the diaphragm element corresponding initialization process. If there is an element that influences the exposure adjustment process among the elements of which the initialization completion signal the interchangeable lens 10 does not transmit, it may be necessary to wait until the initialization of the element has been completed and, then, to transmit the initialization completion signal of the diaphragm. This is because, if the light amount setting on the interchangeable lens 10 side changes after the start of the diaphragm element corresponding initialization process on the body 60 side, the exposure adjustment process does not become a correct value.

Therefore, in preparation for a case where the body 60 does not correspond to each of the elements included in the interchangeable lens 10 itself, the interchangeable lens 10 retains the exposure adjustment process information concerning whether each of the elements is associated with (or influences) the exposure adjustment process in the memory unit 30.

For example, as illustrated in FIG. 7, as data where bit information of "1" in a case associated with the exposure adjustment process and bit information of "0" in a case not associated with the exposure adjustment process are arranged in a predetermined element order, the exposure adjustment process information is stored in the memory unit 30.

Alternatively, as the exposure adjustment process information, a list of only the elements associated with the exposure adjustment process may be stored in the memory unit 30. The data format of the exposure adjustment process information may be any format.

As illustrated in FIG. 7, among the three new elements of the camera shake lock, the liquid crystal ND, and the lens barrel display unit to which the body 60 does not correspond, similarly to the diaphragm, the liquid crystal ND is also an element changing the light amount, so that the liquid crystal ND is also an element associated with the exposure adjustment process.

Hereinafter, an element that influences the exposure adjustment process is referred to as an exposure influencing element, and an element that does not influence the exposure adjustment process is referred to as an exposure non-influencing element.

With respect to an element (hereinafter, also referred to as a "non-corresponding exposure influencing element") which the body 60 does not correspond to and, thus, which may have an undesirable influence on the body 60 side if the initialization completion signal thereof is transmitted and which influences the exposure adjustment process, the lens control unit 22 transmits the initialization completion signal to be included in the element of the diaphragm.

On the other hand, with respect to an element (hereinafter, also referred to as a "non-corresponding exposure non-influencing element") which the body 60 does not correspond to and, thus, of which the initialization completion signal may not be transmitted and which does not influence the exposure adjustment process, the lens control unit 22 transmits the initialization completion signal to be included in the elements other than the diaphragm of which the initialization completion signal can be transmitted.

In addition, with respect to exposure influencing elements and exposure non-influencing elements to which the body 60 corresponds, the elements are referred to as corresponding exposure influencing elements and corresponding exposure non-influencing elements, respectively.

In this specification, for example, the phrase "transmitting the initialization completion signal (of the second element) to be included in the second element with respect to the first element" denotes that the initialization completion signal of the first element is not transmitted, and the second initialization completion is transmitted at the time when the initialization of both of the first element and the second element has been completed.

FIG. 8 is a diagram illustrating the transmission of the initialization completion signal for the liquid crystal ND which is an element which the body 60 does not correspond to and which influences the exposure adjustment process (non-corresponding exposure influencing element).

With respect to the liquid crystal ND which is the non-corresponding exposure influencing element, as illustrated in FIG. 8, the lens control unit 22 transmits the initialization completion signal to be included in the diaphragm to the body control unit 72 at the time when the initialization of both of the diaphragm and the liquid crystal ND has been completed.

More specifically, as illustrated in A of FIG. 8, even in a case where the initialization of the diaphragm has been completed earlier, the lens control unit 22 does not transmit the initialization completion signal of the diaphragm at the time when the initialization of the liquid crystal ND has not been completed, and the lens control unit transmits the initialization completion signal of the diaphragm at the time when the initialization of the liquid crystal ND has been completed.

Furthermore, as illustrated in B of FIG. 8, in a case where the initialization of the liquid crystal ND has been completed earlier, after that, the lens control unit 22 transmits the initialization completion signal of the diaphragm at the time when the initialization of the diaphragm has been completed.

FIG. 9 is a diagram illustrating the transmission of the initialization completion signal for the lens barrel display unit which is an element (non-corresponding exposure non-influencing element) which the body 60 does not correspond to and which does not influence the exposure adjustment process.

With respect to the lens barrel display unit which is a non-corresponding exposure non-influencing element, the element is processed independently of the initialization completion of the diaphragm, and the lens control unit 22 transmits the initialization completion signal to be included in the corresponding exposure non-influencing element at the time when the initialization of the corresponding exposure non-influencing element has been completed. In consideration of the timing of the initialization completion of the diaphragm, as the initialization completion timing of the lens barrel display unit and the initialization completion timing of the corresponding exposure non-influencing element, there may be four patterns A to D in FIG. 9.

A and B of FIG. 9 illustrate examples of a case where initialization of a plurality of exposure non-influencing elements has been completed after initialization of the diaphragm has been completed earlier. A of FIG. 9 is an example of a case where, among the plurality of exposure non-influencing elements, the initialization of the corresponding exposure non-influencing element to which the body 60 corresponds has been completed, and after that, the initialization of the lens barrel display unit to which the body 60 does not correspond has been completed. B of FIG. 9 is an example of a case where, among the plurality of exposure non-influencing elements, the initialization of the lens barrel display unit to which the body 60 does not correspond has been completed, and after that, the initialization of the corresponding exposure non-influencing element to which the body 60 corresponds has been completed.

C and D of FIG. 9 illustrate examples of a case where the initialization of the diaphragm has been completed after the initialization of a plurality of exposure non-influencing elements has been completed earlier. C of FIG. 9 is an example of a case where, among the plurality of exposure non-influencing elements, the initialization of the corresponding exposure non-influencing element to which the body 60 corresponds has been completed, and after that, the initialization of the lens barrel display unit to which the body 60 does not correspond has been completed. D of FIG. 9 is an example of a case where the initialization of the lens barrel display unit to which the body 60 does not correspond has been completed earlier, and after that, the initialization of the corresponding exposure non-influencing element to which the body 60 corresponds has been completed.

Each of the four patterns A to D of FIG. 9 will be described in detail with reference to FIGS. 10 to 13.

Figure 10:
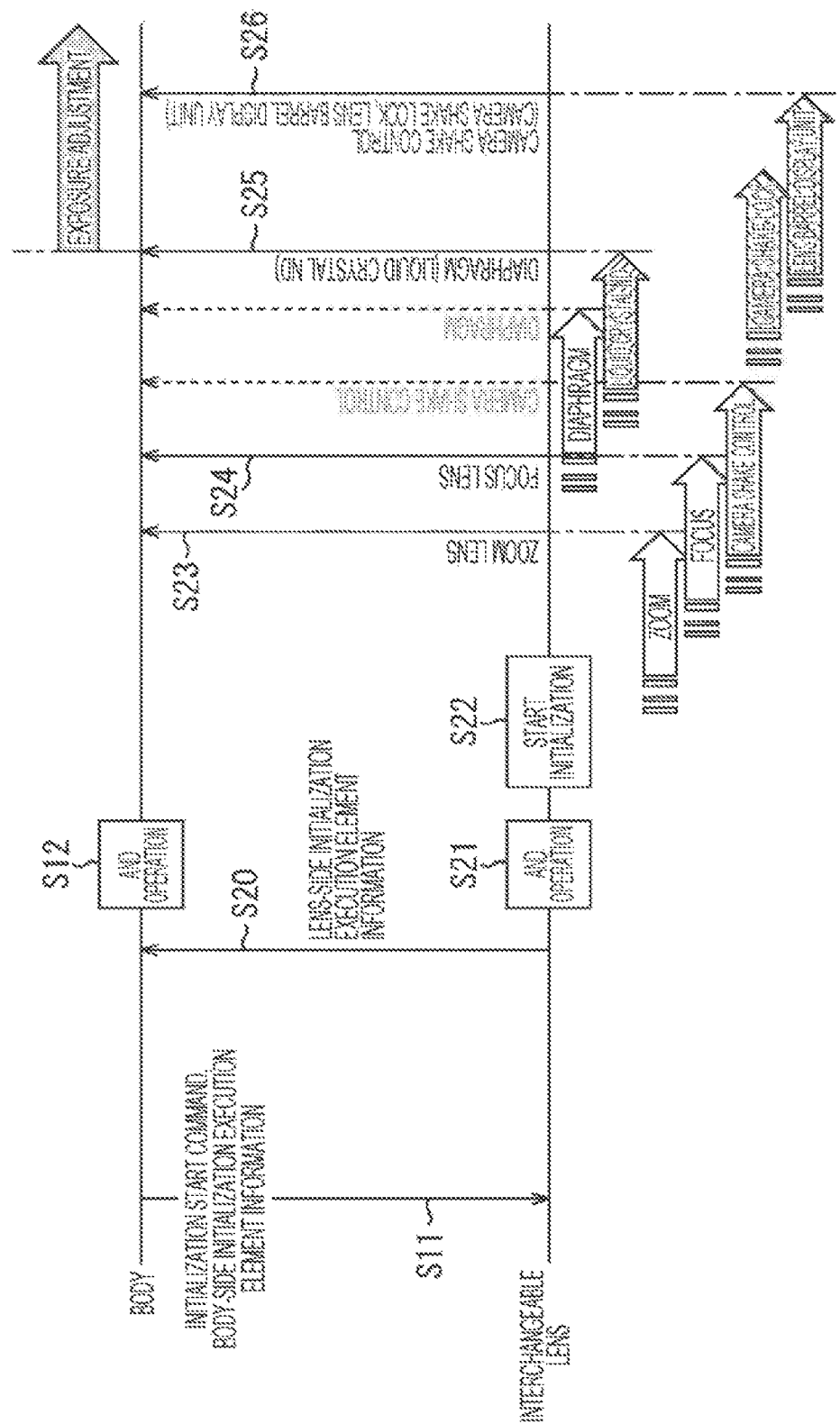
FIG. 10 is a diagram illustrating a process flow corresponding to a pattern illustrated in A of FIG. 9.

FIG. 10 illustrates a process flow corresponding to the pattern illustrated in A of FIG. 9.

First, in step S11, the body control unit 72 transmits body-side initialization execution element information indicating elements on which the body 60 performs initialization, together with an initialization start command requesting the start of initialization, to the lens control unit 22.

Upon receiving the initialization start command and the body-side initialization execution element information, in step S20, the lens control unit 22 transmits the lens-side initialization execution element information indicating elements on which the interchangeable lens 10 performs initialization to the body control unit 72.

Upon receiving the lens-side initialization execution element information transmitted from the lens control unit 22, in step S12, the body control unit 72 performs an AND operation between the lens-side initialization execution element information and the body-side initialization execution element information to recognize the initialization completion transmission element which is an element of which the initialization completion signal is transmitted. In this case, the initialization completion transmission elements are four elements, namely, the diaphragm, the zoom lens, the focus lens, and the camera shake control.

Upon receiving the lens-side initialization execution element information transmitted from the lens control unit 22, the body control unit 72 can recognize that the initialization start command is normally received by the interchangeable lens 10 side and the initialization process is performed on the interchangeable lens 10 side, in other words, that it is possible to expect the initialization completion signal of each element to be received. On the other hand, after transmitting the lens-side initialization execution element information in step S20, in step S21, the lens control unit 22 performs an AND operation between the received body-side initialization execution element information and the initialization execution element information indicating elements on which the lens control unit itself performs initialization.

Therefore, the elements of which the initialization completion signals the lens control unit 22 transmits are determined. Subsequently, in step S22, the initialization process of each element is started. Herein, the lens-side initialization execution element information is transmitted before the start of the initialization process. However, the transmission of the lens-side initialization execution element information may be performed after the AND operation or after the start of the initialization process. In addition, the start of the initialization process and the transmission of the lens-side initialization execution element information may be simultaneously performed.

In step S23, which is the timing when the initialization process of the zoom lens has been completed, the lens control unit 22 transmits the initialization completion signal of the zoom lens to the body control unit 72.

In step S24, which is the timing when the initialization process of the focus lens has been completed, the lens control unit 22 transmits the focus lens initialization completion signal to the body control unit 72.

After step S24, the initialization process of the camera shake control has been completed, but since the camera shake control is the last corresponding exposure non-influencing element of which the initialization completion signal is to be transmitted, the lens control unit 22 does not transmit the initialization completion signal of the camera shake control at this timing, but the lens control unit transmits the initialization completion signal of the camera shake control to the body control unit 72 in step S26 which is the timing when the initialization of both of the camera shake lock and the lens barrel display unit has been completed. Namely, the initialization completion of both of the camera shake lock and the lens barrel display unit is included in the initialization completion signal of the camera shake control. However, this does not denote that signals corresponding to the initialization completion signals of the camera shake lock and the lens barrel display unit are included in the initialization completion signal of the camera shake control.

With respect to the exposure influencing element, the lens control unit 22 does not transmit the initialization completion signal of the diaphragm at the timing when the initialization of the diaphragm has been completed, but the lens control unit transmits the initialization completion signal of the diaphragm to the body control unit 72 in step S25 which is the timing when the initialization of the liquid crystal ND has been completed. Namely, the initialization completion of the liquid crystal ND is included in the initialization completion signal of the diaphragm. However, this does not denote that a signal corresponding to the initialization completion signal of the liquid crystal ND is included in the initialization completion signal of the diaphragm.

At the time when the body control unit 72 receives the initialization completion signal of the diaphragm in step S25, the body control unit 72 starts the diaphragm element corresponding initialization process including the exposure adjustment process.

Figure 11:
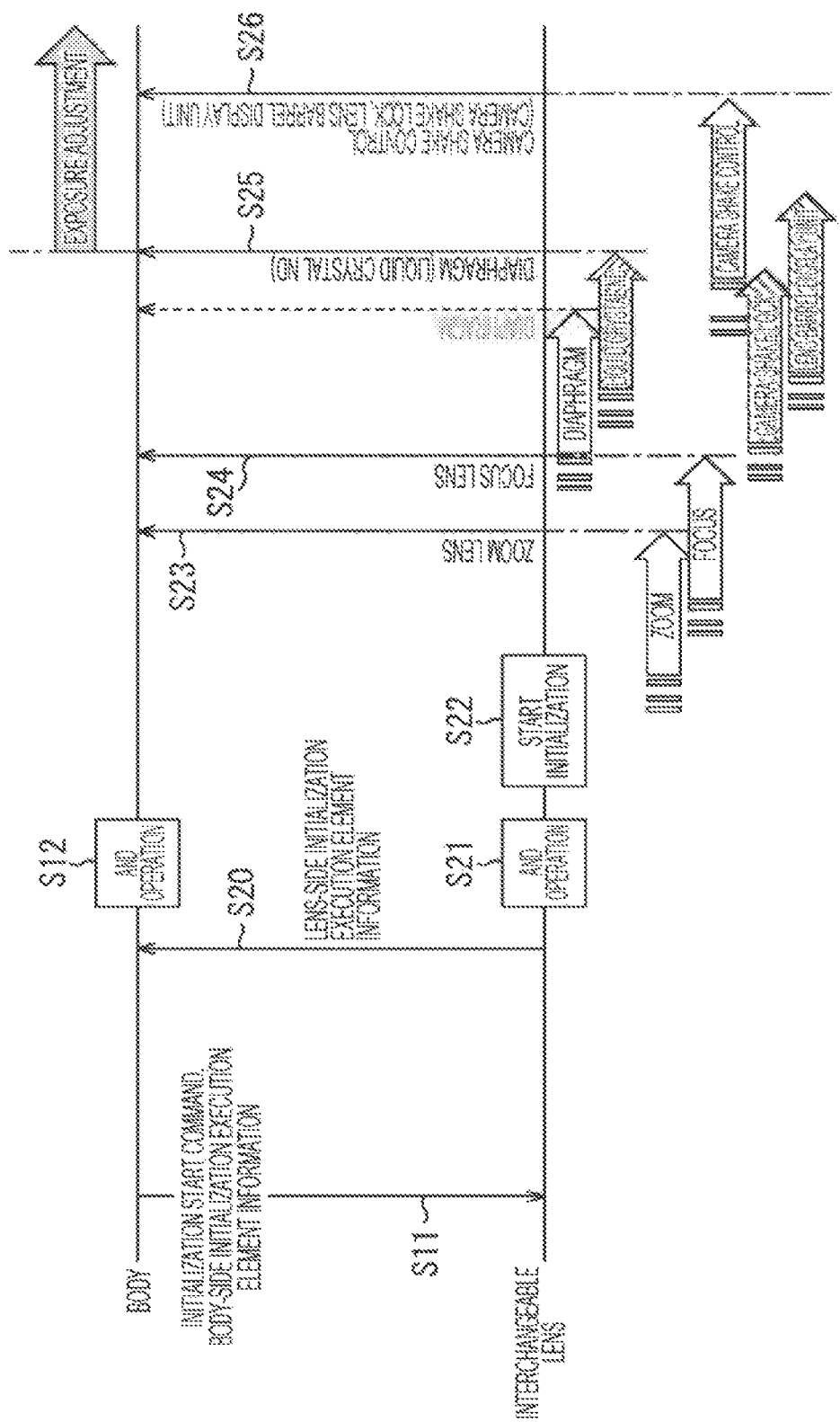
FIG. 11 is a diagram illustrating a process flow corresponding to a pattern illustrated in B of FIG. 9.

FIG. 11 illustrates a process flow corresponding to the pattern illustrated in B of FIG. 9.

In FIG. 10, in the interchangeable lens 10, the initialization of the camera shake control has been completed earlier, and after that, the initialization of the camera shake lock and the initialization of the lens barrel display unit have been completed in order.

However, in FIG. 11, the initialization of the camera shake lock and the initialization of the lens barrel display unit have been completed earlier, and after that, the initialization of the camera shake control has been completed.

Even in this case, the initialization process is similar to the flow illustrated in FIG. 10, and in step S26, the initialization completion signal of the camera shake control including the initialization completion of both of the camera shake lock and the lens barrel display unit is transmitted to the body control unit 72. The other processes are similar to those in FIG. 10.

Figure 12:
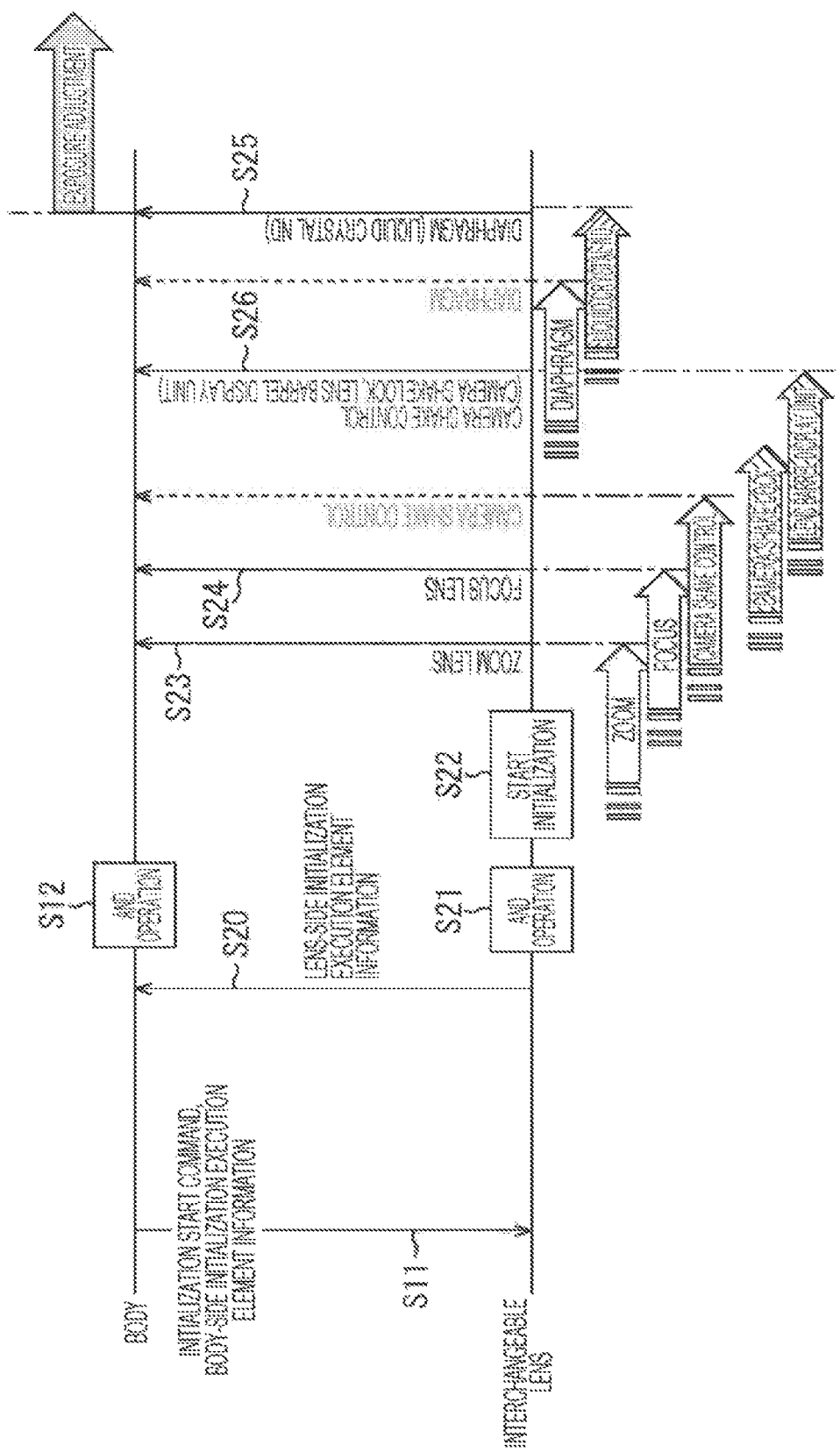
FIG. 12 is a diagram illustrating a process flow corresponding to a pattern illustrated in C of FIG. 9.

FIG. 12 illustrates a process flow corresponding to the pattern illustrated in C of FIG. 9.

FIG. 12 is different from FIG. 10 in that the initialization completion timing of the liquid crystal ND which is the exposure influencing element is later than the initialization completion timing of the camera shake lock and the barrel display unit which are the exposure non-influencing elements. Therefore, in FIG. 12, the order of step S25 of transmitting the initialization completion signal of the diaphragm to the body control unit 72 and step S26 of transmitting the initialization completion signal of the camera shake control to the body control unit 72 is opposite to that of the case of FIG. 10. With respect to the others, FIG. 12 is similar to FIG. 10.

At the timing when the initialization of the camera shake control has been completed, the lens control unit 22 does not transmit the initialization completion signal of the camera shake control, and at the timing when the initialization of both of the camera shake lock and the lens barrel display unit has been completed, the lens control unit 22 transmits the initialization completion signal of the camera shake control to the body control unit 72.

Figure 13:
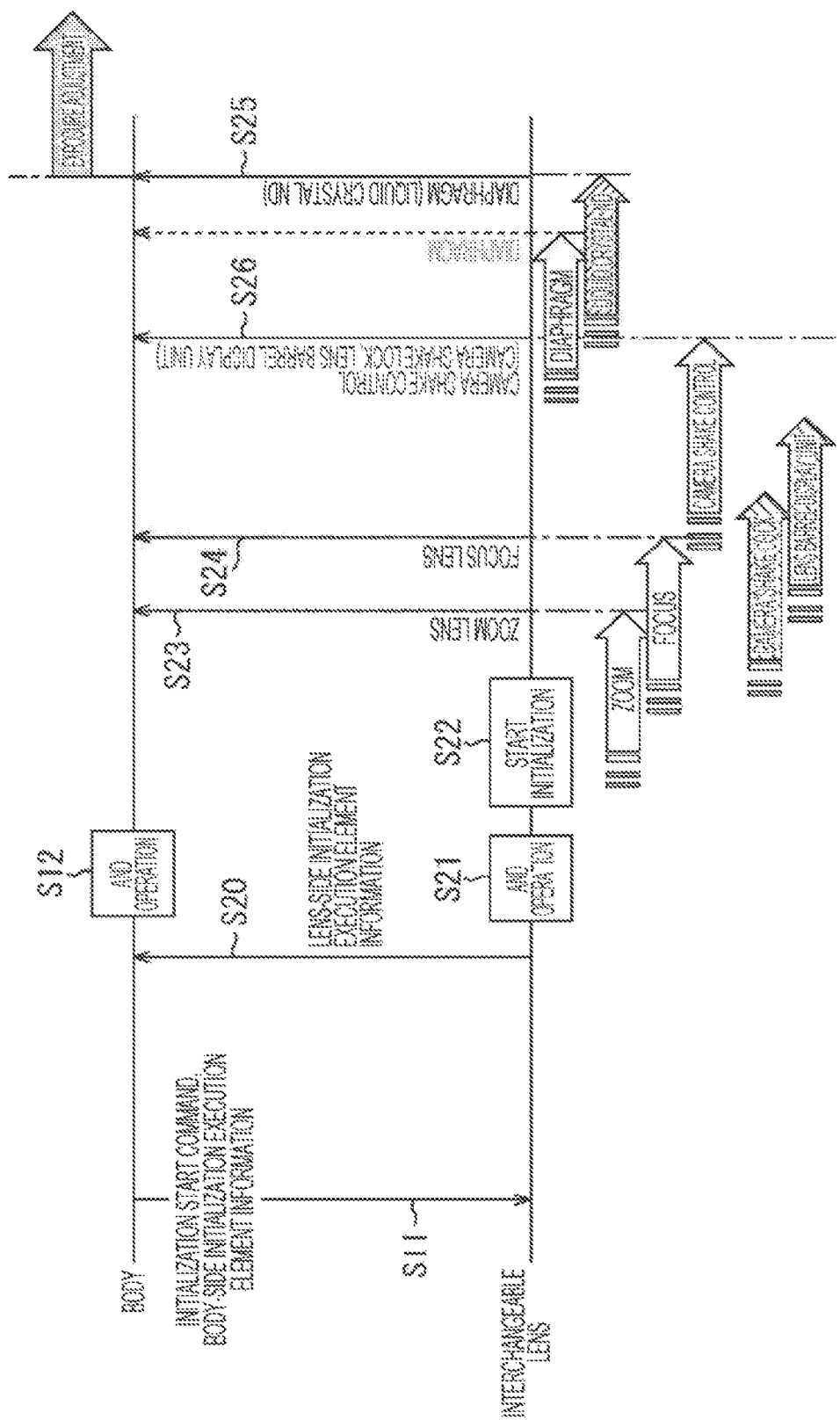
FIG. 13 is a diagram illustrating a process flow corresponding to a pattern illustrated in D of FIG. 9.

FIG. 13 illustrates a process flow corresponding to the pattern illustrated in D of FIG. 9.

FIG. 13 is different from FIG. 11 in that the initialization completion timing of the liquid crystal ND which is the exposure influencing element is later than the initialization completion timing of the camera shake lock and the barrel display unit which are the exposure non-influencing elements. Therefore, in FIG. 13, the order of step S25 of transmitting the initialization completion signal of the diaphragm to the body control unit 72 and step S26 of transmitting the initialization completion signal of the camera shake control to the body control unit 72 is opposite to that in the case of FIG. 11. With respect to the others, FIG. 13 is similar to FIG. 11.

The lens control unit 22 transmits the initialization completion signal of the camera shake control to the body control unit 72 at the timing when the initialization of both of the camera shake lock and the lens barrel display unit has been completed, and after that, the initialization of the camera shake control has been completed. As described above, the lens control unit 22 transmits the initialization completion signal in an exclusive manner with respect to the non-corresponding exposure influencing element which is an element which the body 60 side does not correspond to and which influences the exposure adjustment process and the non-corresponding exposure non-influencing element which is an element which the body 60 side does not correspond to and which does not influence the exposure adjustment process. Namely, with respect to the non-corresponding exposure influencing element, the lens control unit 22 transmits the initialization completion signal to be included in the element of the diaphragm, and with respect to the non-corresponding exposure non-influencing element, the lens control unit transmits the initialization completion signal to be included in the corresponding exposure non-influencing element other than the diaphragm of which the initialization completion signal can be transmitted.

In a case where the element to which the body 60 side does not correspond influences the exposure adjustment process, the timing of giving notice of the initialization completion signal of the diaphragm is set as the timing satisfying an AND condition with the timing when the initialization of the non-corresponding exposure non-influencing element has been completed and is transmitted from the interchangeable lens 10, so that the element can be allowed not to influence the exposure adjustment process on the body 60 side. In addition, in a case where the element to which the body 60 side does not correspond does not influence the exposure adjustment process, the initialization completion of the non-corresponding exposure non-influencing element is allowed to be associated with (be included in) the exposure non-influencing element (corresponding exposure non-influencing element) to which the body 60 side corresponds, the element can be allowed to be associated with the exposure adjustment process on the body 60 side. As a result, the body 60 side can start the diaphragm element corresponding initialization process according to the initialization completion of the exposure influencing element without waiting for the initialization completion of the entire interchangeable lens 10, and thus, the start of the exposure adjustment process can be performed earlier, so that it is possible to shorten the initialization time of the camera system 1 as a whole.

In addition, FIGS. 10 to 13 illustrate examples where the initialization processes of the diaphragm and the liquid crystal ND which are elements which influence the exposure adjustment process are associated, and the initialization of the diaphragm has been completed earlier as illustrated in A of FIG. 8, and after that, the initialization completion signal of the diaphragm is transmitted at the time when the initialization of the liquid crystal ND has been completed. However, as illustrated in B of FIG. 8, even in a case where the completion of initialization signal of the diaphragm is transmitted at the time when the initialization of the liquid crystal ND has been completed earlier, and after that, the initialization of the diaphragm has been completed, similar process is performed.

Furthermore, FIGS. 10 to 13 illustrate the examples where the initialization completion signal of the camera shake lock and the lens barrel display unit which are exposure non-influencing elements is included in the initialization completion signal of the camera shake control, but this is merely an example.

In a case where, in the state where the initialization of the non-corresponding exposure non-influencing element has not been completed, the corresponding exposure non-influencing element becomes the last one, at the time when the initialization of both of the last remaining corresponding exposure non-influencing element and the non-corresponding exposure non-influencing element has been completed, the initialization completion signal of the corresponding exposure non-influencing element is transmitted. Namely, the initialization completion signal of the non-corresponding exposure non-influencing element is included in the initialization completion signal of the last remaining corresponding exposure non-influencing element.

In addition, in a case where there are two or more remaining exposure non-influencing elements (corresponding exposure non-influencing elements) of which the initialization completion signals are to be transmitted to the body 60 side, the initialization completion signals of the non-corresponding exposure non-influencing elements are included in the initialization completion signal of the corresponding exposure non-influencing element of which the initialization has been completed immediately after that.

A case where there are two or more remaining exposure non-influencing elements (corresponding exposure non-influencing elements) of which the initialization completion signals are to be transmitted to the body 60 side will be described with specific examples. For example, as illustrated in FIG. 14, it is assumed that the initialization has been completed in the order of the camera shake lock, the zoom lens, the lens barrel display unit, the focus lens, and the camera shake control which are exposure non-influencing elements.

At the time of the initialization completion of each of the camera shake lock and the lens barrel display unit which are exposure non-influencing elements (non-corresponding exposure non-influencing elements) which the body 60 side does not correspond to, two or more exposure non-influencing elements (corresponding exposure non-influencing elements) (more specifically, the focus lens and camera shake control) of which the initialization completion signal is to be transmitted to the body 60 side remain.

Figure 14:
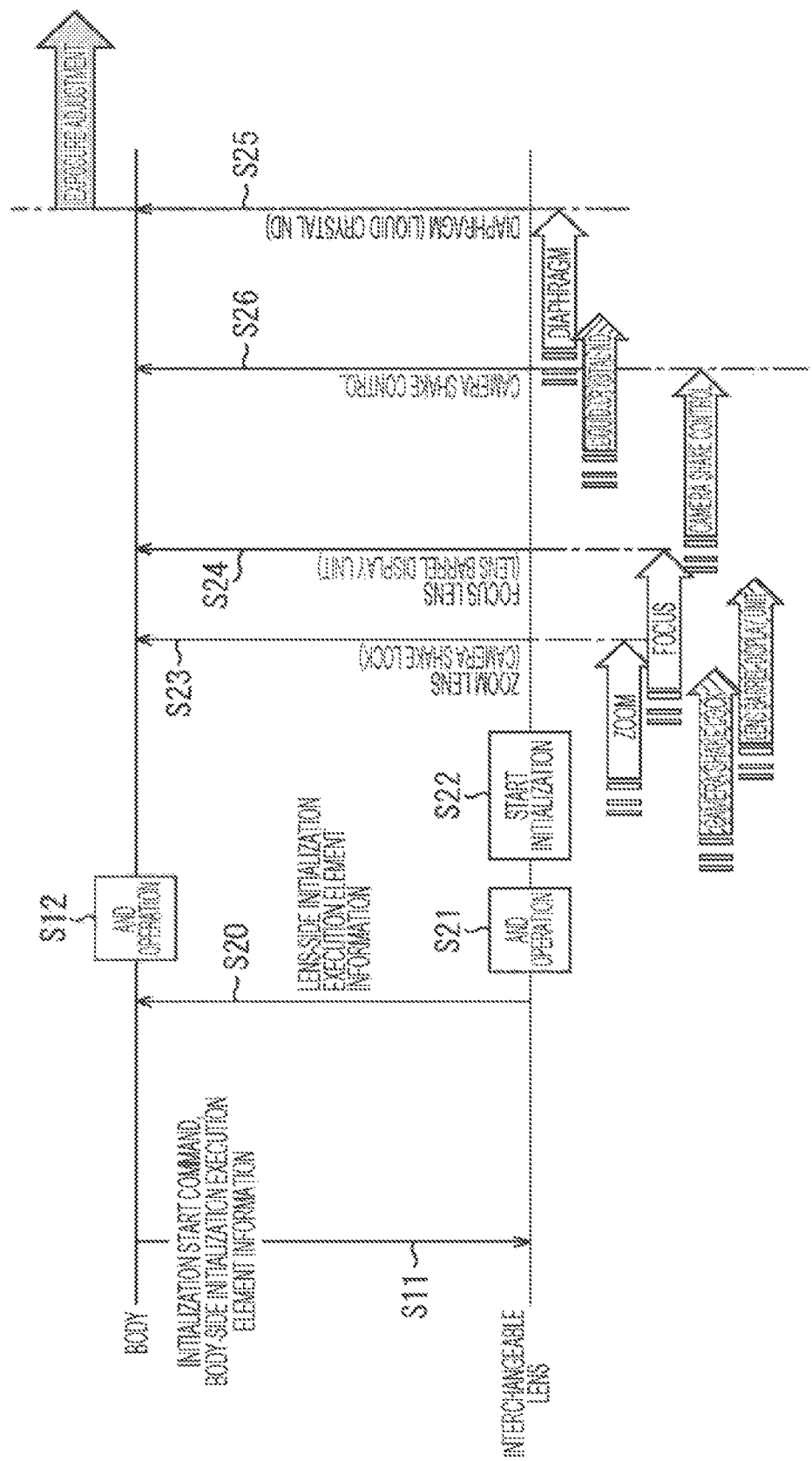
FIG. 14 is a diagram illustrating that an initialization completion signal of a non-corresponding exposure non-influencing element is included.

In this case, as illustrated in FIG. 14, the initialization completion of the camera shake lock is included in the initialization completion signal of the zoom lens which is an corresponding exposure non-influencing element of which the initialization has been completed immediately after that, and the completion of the initialization of the lens barrel display unit is included in the initialization completion signal of the focus lens which is a corresponding exposure non-influencing element of which the initialization have been completed immediately after that. However, as described above, signals corresponding to the initialization completion signals of the camera shake lock and the lens barrel display unit which are non-corresponding exposure non-influencing elements are not included in the initialization completion signal of the including side element.

<Flowchart of First Initialization Process on Body Side>

Next, in a case where only the interchangeable lens 10 corresponds to a new element, a first initialization process executed on the body 60 side will be described with reference to the flowchart of FIG. 15. This process is started, for example, when the interchangeable lens 10 is attached to the body 60 and the power is turned on.

First, in step S51, the body control unit 72 transmits an initialization start command for starting initialization, together with body-side initialization execution element information indicating elements on which the body 60 performs initialization, to the lens control unit 22.

In step S52, the body control unit 72 determines whether or not lens-side initialization execution element information indicating elements on which the interchangeable lens 10 performs initialization has been received from the lens control unit 22, and the process of step S52 is repeated until it is determined that the lens-side initialization execution element information has been received.

Then, in step S52, in a case where it is determined that the lens-side initialization execution element information has been received, the process proceeds to step S53, and the body control unit 72 performs an AND operation between the initialization execution element information and the body-side initialization execution element information. Therefore, the lens control unit 22 can recognize the element of which the initialization completion signal is transmitted.

In step S54, the body control unit 72 sets the number of elements corresponding to a result of the AND operation to a variable d_count indicating an element scheduled to be received. According to the example of FIG. 6, the variable d_count is set to 4.

In step S55, the body control unit 72 sets a conversion i_count for counting the elements of which the initialization completion signals have been received to 0.

In step S56, the body control unit 72 determines whether or not the initialization completion signal has been received, and the process of step S56 is repeated until it is determined that the initialization completion signal has been received.

Then, in a case where it is determined in step S56 that the initialization completion signal has been received, the process proceeds to step S57, and the body control unit 72 determines whether or not the element of which the initialization completion signal has been received is an element associated with the diaphragm. In a case where it is determined in step S57 that the element of which the initialization completion signal has been received is not associated with the diaphragm, the process proceeds to step S58, and the body control unit 72 starts the element corresponding initialization process which is an initialization process corresponding to the received element (exposure non-influencing element).

On the other hand, in a case where it is determined in step S57 that the element of which the initialization completion signal has been received is an element associated with the diaphragm (exposure influencing element), the process proceeds to step S59, and the body control unit 72 determines whether or not the element of which the initialization completion signal has been received is the last element associated with the diaphragm. In other words, the process of step S59 is a process of determining whether or not the element of which the initialization completion signal has been received is the last element associated with the exposure adjustment process. Under the conditions of the interchangeable lens 10 and the body 60 according to this embodiment described with reference to FIG. 6 and the like, the element of which the initialization completion signal is transmitted and which is associated with the diaphragm are only the diaphragm. However, there may be a case (to be described later) where the body 60 corresponds to three new elements of the camera shake lock, the liquid crystal ND, and the lens barrel display unit or a case where other elements associated with the exposure adjustment process are included. In step S59, it is determined whether or not the element of which the initialization completion signal has been received is the last element on the interchangeable lens 10 side which changes a light amount and the body 60 may start the exposure adjustment process.

In a case where it is determined in step S59 that the element of which the initialization completion signal has been received is not the last element associated with the diaphragm, the process of step S60 is skipped, and the process proceeds to step S61.

On the other hand, in a case where it is determined in step S59 that the element of which the initialization completion signal has been received is the last element associated with the diaphragm, the process proceeds to step S60, and the body control unit 72 starts the exposure adjustment process.

Next, in step S61, the body control unit 72 increments the conversion i_count for counting the elements of which the initialization completion signals have been received by 1.

In step S62, the body control unit 72 determines whether or not the conversion i_count for counting the elements of which the initialization completion signals have been received is equal to the variable d_count indicating the elements scheduled to be received.

In step S62, in a case where it is determined that the conversion i_count for counting the elements of which the initialization completion signals have been received is not equal to the variable d_count indicating the elements scheduled to be received, the process returns to step S56. As a result, the body control unit 72 waits again until the initialization completion signal of a predetermined element is received.

On the other hand, in a case where it is determined in step S62 that the conversion i_count for counting the elements of which the initialization completion signals have been received is equal to the variable d_count indicating the elements scheduled to be received, the process proceeds to step S63, and the body control unit 72 determines whether all the element corresponding initialization processes executed on the body 60 side have been completed. In step S63, the process waits until it is determined that all the element corresponding initialization processes executed on the body 60 side have been completed. In addition, in a case where it is determined in step S63 that all the element corresponding initialization processes executed on the body 60 side have been completed, the first initialization process on the body 60 side has been completed.

The first initialization process on the body 60 side is executed in such a manner described above.

<Flowchart of First Initialization Process on Lens Side>

Next, in a case where only the interchangeable lens 10 corresponds to a new element, a first initialization process executed on the interchangeable lens 10 side will be described with reference to the flowchart of FIG. 16. This process is started, for example, when the initialization start command and the body-side initialization execution element information transmitted from the body control unit 72 are received.

First, in step S71, the lens control unit 22 transmits lens-side initialization execution element information indicating elements on which the interchangeable lens 10 performs initialization to the body control unit 72 on the basis of the received initialization start command and the received body-side initialization execution element information. Note that, as illustrated in FIG. 6, the lens-side initialization execution element information includes information indicating all elements on which the interchangeable lens 10 performs initialization.

In step S72, the lens control unit 22 performs the AND operation on the received body-side initialization execution element information and the received lens-side initialization execution element information. Therefore, the elements of which the initialization completion signals the lens control unit 22 transmits are determined. In step S73, the lens control unit 22 sets the number of elements on which initialization is to be performed to a variable d_count indicating the elements scheduled to be implemented. According to the example of FIG. 6, the variable d_count is set to 7.

In step S74, the lens control unit 22 sets a conversion i_count for counting the elements of which the initialization process has been completed to 0.

In addition, the variables d_count and i_count are independent variables for the lens control unit 22 on the interchangeable lens 10 side and the body control unit 72 on the body 60 side.

In step S75, the lens control unit 22 starts the initialization process for each element with respect to all elements requiring initialization. The process of step S75 corresponds to the processes of step S22 of FIGS. 10 to 14. In this embodiment, the initialization processes of all the elements are started simultaneously, but the initialization process may be performed in a predetermined order or with a priority.

In step S76, the lens control unit 22 determines whether there is an element of which the initialization process has been completed among the elements which are in initialization execution.

In step S76, the process waits until it is determined that there is an element of which the initialization process has been completed, and in a case where it is determined that there is an initialization-completed element, the process proceeds to step S77. The, in step S77, the lens control unit 22 determines whether or not the element of the initialization process has been completed is an exposure influencing element.

In a case where it is determined in step S77 that the element of which the initialization process has been completed is an exposure influencing element, the process proceeds to step S78, and the lens control unit 22 executes the exposure influencing element process. Details of this process will be described later with reference to FIGS. 17 and 18.

On the other hand, in a case where it is determined in step S77 that the element of which the initialization process has been completed is not an exposure influencing element, the process proceeds to step S79, and the lens control unit 22 executes the exposure non-influencing element process. Details of this process will be described later with reference to FIG. 19.

In step S80, the lens control unit 22 increments the conversion i_count for counting the elements of which the initialization process has been completed by 1.

In step S81, the lens control unit 22 determines whether or not the conversion i_count for counting the elements of which the initialization process has been completed is equal to the variable d_count indicating the elements scheduled to be implemented.

In step S81, in a case where it is determined that the conversion i_count for counting the elements of which the initialization process has been completed is not equal to the variable d_count indicating the elements scheduled to be implemented, the process returns to step S76. As a result, the lens control unit 22 waits again until the next element after the completion of the initialization process is generated.

On the other hand, in a case where it is determined in step S81 that the conversion i_count for counting the elements of which the initialization process has been completed is equal to the variable d_count indicating the elements scheduled to be implemented, the first initialization process on the interchangeable lens 10 side has been completed.

Next, the exposure influencing element process executed in step S78 of FIG. 16 will be described with reference to the flowchart of FIG. 17. This exposure influencing element process is an exposure influencing element process in a case where the body 60 does not correspond to all the exposure influencing elements other than the diaphragm.

In this process, first, in step S101, the lens control unit 22 determines whether or not the initialization of all the other exposure influencing elements has been completed.

Figure 16:
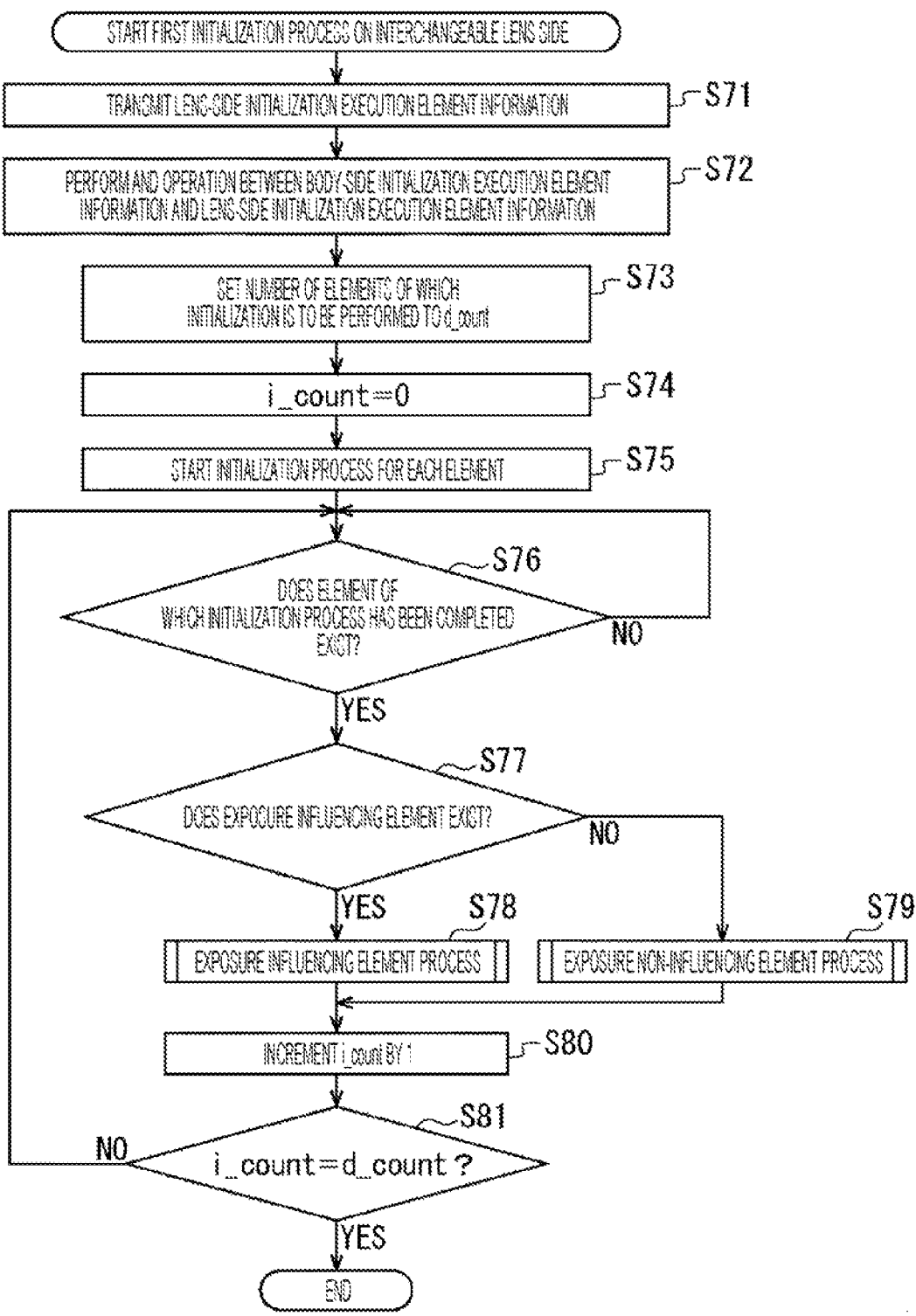
FIG. 16 is a flowchart illustrating a first initialization process executed on the interchangeable lens side in a case where only the interchangeable lens corresponds to a new element.
Figure 17:
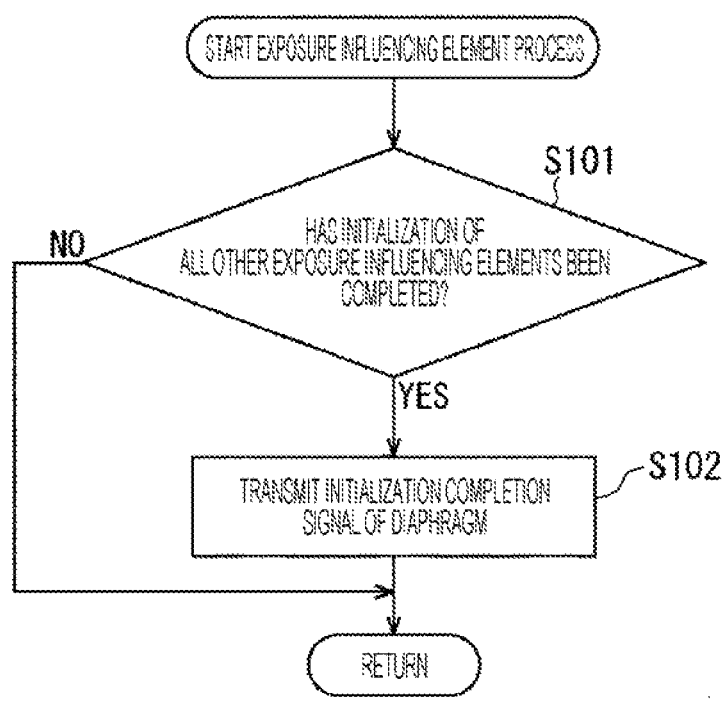
FIG. 17 is a flowchart illustrating an exposure influencing element process executed in step S78 of FIG. 16.

In step S101, in a case where it is determined that the initialization of all the other exposure influencing elements has not been completed, the lens control unit 22 ends the exposure influencing element process and returns to the first initialization process in FIG. 16.

On the other hand, in a case where it is determined in step S101 that the initialization of all the other exposure influencing elements have been completed, the process proceeds to step S102, and the lens control unit 22 transmits the initialization completion signal of the diaphragm to the body control unit 72. With respect to the transmission of the initialization completion signal of the diaphragm to the body control unit 72, the initialization completion signal is stored in the queue buffer for command transmission by the lens control unit 22, and when a predetermined transmission timing arrives by the command transmission control processing described later with reference to FIG. 35, the initialization completion signal is transmitted to the body control unit 72. After that, the exposure influencing element process is ended, and the process returns to the first initialization process in FIG. 16.

As described above, in the exposure influencing element process in a case where the body 60 does not correspond to all the exposure influencing elements other than the diaphragm, in a case where the diaphragm and the non-corresponding exposure influencing elements to which the body 60 does not correspond and which influences the exposure adjustment process of the body 60 are included in a plurality of the elements which the interchangeable lens 10 includes, the lens control unit 22 stores the initialization completion signal of the diaphragm in the queue buffer for command transmission at the timing according to the initialization completion of all the non-corresponding exposure influencing elements and the diaphragm. In other words, the lens control unit 22 stores the initialization completion signal of the diaphragm in the queue buffer for command transmission on condition that the initialization of all the non-corresponding exposure influencing elements and the diaphragm has been completed.

Next, the exposure influencing element process executed in step S78 of FIG. 16 will be described with reference to the flowchart of FIG. 18. This exposure influencing element process is an exposure influencing element process in a case where there is an exposure influencing element to which the body 60 corresponds besides the diaphragm.

In this process, first, in step S110, the lens control unit 22 determines whether or not the exposure influencing element of which the initialization has been completed is the exposure influencing element (corresponding exposure influencing element) to which the body 60 corresponds.

In a case where it is determined in step S110 that the exposure influencing element of which the initialization has been completed is the exposure influencing element to which the body 60 corresponds, the process proceeds to step S111, and the lens control unit 22 determines whether or not the wait for initialization completion of the exposure influencing element to which the body 60 corresponds is the last one.

In a case where it is determined in step S111 that the wait for initialization completion of the exposure influencing element to which the body 60 corresponds is not the last one, the process proceeds to step S112, and the lens control unit 22 stores the initialization completion signal of the corresponding exposure influencing element of which the initialization has been completed in the queue buffer for command transmission and transmits the initialization completion signal to the body control unit 72. The exposure influencing element process is ended, and the process returns to the first initialization process in FIG. 16.

On the other hand, in a case where it is determined in step S111 that the wait for initialization completion of the exposure influencing element to which the body 60 corresponds is the last one, the process proceeds to step S113, and the lens control unit 22 determines whether or not an element of which the initialization has not been completed exists among the other exposure influencing elements.

In step S113, in a case where it is determined that the element of which the initialization has not been completed exists among the other exposure influencing elements, the exposure influencing element process is ended, and the process returns to the first initialization process in FIG. 16.

On the other hand, in a case where it is determined in step S113 that the element of which the initialization has not been completed does not exist among the other exposure influencing elements, the process proceeds to step S114, and the lens control unit 22 stores the initialization completion signal of the last corresponding exposure influencing element in the queue buffer for command transmission and transmits the initialization completion signal to the body control unit 72. The exposure influencing element process is ended, and the process returns to the first initialization process in FIG. 16.

In addition, in a case where it is determined in step S110 that the exposure influencing element of which the initialization has been completed is not the exposure influencing element to which the body 60 corresponds, the process proceeds to step S115, and the lens control unit 22 determines whether there is an element of which the initialization has not been completed in the other exposure influencing elements.

In a case where it is determined in step S115 that there is the element of which the initialization has not been completed among the other exposure influencing elements, the exposure influencing element process is ended, and the process returns to the first initialization process in FIG. 16.

On the other hand, in a case where it is determined in step S115 that there is no element of which the initialization has not been completed among the other exposure influencing elements, the process proceeds to step S114 described above, and the lens control unit 22 stores the initialization completion signal of the diaphragm in the queue buffer for command transmission and transmits the initialization completion signal to the body control unit 72.

The exposure influencing element process in a case where there is an exposure influencing element to which the body 60 corresponds in the exposure influencing element other than the diaphragm is executed in such a manner as described heretofore.

Next, the exposure non-influencing element process executed in step S79 of FIG. 16 will be described with reference to the flowchart of FIG. 19.

In the process, first, in step S121, the lens control unit 22 determines whether or not the wait for completion of the exposure non-influencing element returning the initialization completion signal is the remaining one.

In a case where it is determined in step S121 that the wait for completion of the exposure non-influencing element returning the initialization completion signal is not the remaining one (two or more), the process proceeds to step S122, and the lens control unit 22 determines whether or not the exposure non-influencing element of which the initialization process has been completed is the exposure non-influencing element (corresponding exposure non-influencing element) to which the body 60 corresponds.

In a case where it is determined in step S122 that the exposure non-influencing element of which the initialization process has been completed is not an exposure non-influencing element to which the body 60 corresponds, that is, it is determined that the exposure non-influencing element is a non-corresponding exposure non-influencing element, the process of step S123 is skipped and the exposure non-influencing element process is ended. Therefore, in a case where the exposure non-influencing element of which the initialization process has been completed is an element to which the body 60 does not correspond, the initialization completion signal is not transmitted.

On the other hand, in a case where it is determined in step S122 that the exposure non-influencing element of which the initialization process has been completed is an exposure non-influencing element to which the body 60 corresponds, the process proceeds to step S123, and the lens control unit 22 stores the initialization completion signal of the exposure non-influencing element of which the initialization process has been completed in the queue buffer for command transmission and transmits the initialization completion signal to the body control unit 72. On the other hand, in a case where it is determined in step S121 that the wait for completion of the exposure non-influencing element returning the initialization completion signal is the remaining one, the process proceeds to step S124, and the lens control unit 22 determines whether or not there is another exposure non-influencing element of which the initialization has not been completed.

In a case where it is determined in step S124 that there is no another exposure non-influencing element of which the initialization has not been completed, the process proceeds to step S123 described above, and the lens control unit 22 stores the initialization completion signal of the exposure non-influencing element of which the initialization process has been completed in the queue buffer for command transmission and transmits the initialization completion signal to the body control unit 72.

On the other hand, in a case where it is determined in step S124 that there is another exposure non-influencing element of which the initialization has not been completed, the exposure non-influencing element process is ended. Accordingly, in a case where it is determined that there is still another exposure non-influencing element of which the initialization has not been completed, the initialization completion signal is not transmitted, and the exposure non-influencing element process is ended.

According to the exposure non-influencing element process described heretofore, in a case where there are two or more exposure non-influencing elements returning the initialization completion signals, in other words, there are two or more exposure non-influencing elements to which the body 60 corresponds and of which the initialization completion signals are not transmitted, the lens control unit 22 transmits the initialization completion signal of the element at the time when the initialization of the exposure non-influencing element (corresponding exposure non-influencing element) to which the body 60 corresponds has been completed.

Then, in a case where the exposure non-influencing element that returns the initialization completion signal, in other words, the exposure non-influencing element (corresponding exposure non-influencing element) to which the body 60 corresponds and of which the initialization completion signal has not been transmitted is the last one, the lens control unit 22 transmits the initialization completion signal of the last corresponding exposure non-influencing element at the time when the initialization of all the non-corresponding exposure non-influencing elements has been completed. Namely, the initialization completion signal of the corresponding exposure non-influencing element in a case where it is determined in the previous step S124 that there is another exposure non-influencing element of which the initialization has not been completed and the initialization completion signal of the corresponding exposure non-influencing element which remains without being transmitted is included in the initialization completion signal of the exposure non-influencing element in a case where it is determined in step S124 that there is no exposure non-influencing element of which the initialization has not been completed and the process of step S123 is performed, and the initialization completion signal is transmitted to the body control unit 72.

The first initialization process on the interchangeable lens 10 side is executed in such a manner as described heretofore.

According to the first initialization process of the camera system 1 described above, even in a case where only the interchangeable lens 10 corresponds to a new element, the interchangeable lens 10 can perform initialization of all the elements which the interchangeable lens includes, and the body 60 can appropriately start the initialization of the body 60 side in the order in which the necessary initialization has been completed in units of an element on the interchangeable lens 10 side including the elements to which the body itself does not correspond. In addition, the initialization completion signal of the element to which the body 60 does not correspond is not received.

Accordingly, it is possible to correctly recognize the elements included in each of the body 60 and the interchangeable lens 10 and to appropriately execute the initialization process.

Upon receiving the lens-side initialization execution element information, the body control unit 72 can recognize that the initialization start command is normally received by the interchangeable lens 10 side and the initialization process is performed on the interchangeable lens 10 side, in other words, that it is possible to expect the initialization completion signal of each element to be received.

In addition, the body control unit 72 performs an AND operation between the lens-side initialization execution element information transmitted from the lens control unit 22 and the body-side initialization execution element information of the body control unit itself, so that the body control unit can recognize the element of which the initialization completion signal is transmitted from the interchangeable lens 10 side.

<4.2 Case where Interchangeable Lens and Body are Equivalent in Function>

Next, a case where the interchangeable lens 10 and the body 60 are equivalent in function, in other words, a case where the elements to which the interchangeable lens 10 and the body 60 correspond are coincident with each other will be described.

Specifically, a case where, similarly to the interchangeable lens 10, the body 60 can correspond to three elements of the camera shake lock, the liquid crystal ND, and the lens barrel display unit in addition to the diaphragm, the zoom lens, the focus lens, and the camera shake control will be described.

A of FIG. 20 illustrates elements which are indicated by the body-side initialization execution element information and on which the body 60 performs initialization.

B of FIG. 20 illustrates the elements which are indicated by the lens-side initialization execution element information and on which the interchangeable lens 10 performs initialization.

Each of the interchangeable lens 10 and the body 60 corresponds to the initialization of seven elements of the diaphragm, the zoom lens, the focus lens, the camera shake control, the liquid crystal ND, the camera shake lock, and the lens barrel display unit.

As illustrated in C of FIG. 20, the elements of which the initialization completion signal the interchangeable lens 10 can transmit becomes the elements corresponding to an operation result of the AND operation common to the body-side initialization execution element information and the lens-side initialization execution element information. Therefore, the interchangeable lens 10 can transmit the initialization completion signals of seven elements of the diaphragm, the zoom lens, the focus lens, the camera shake control, the liquid crystal ND, the camera shake lock, and the lens barrel display unit.

The body control unit 72 on the body 60 side performs an AND operation between the body-side initialization execution element information and the lens-side initialization execution element information, so that it is possible to recognize that the initialization completion signal of each of the zoom lens, the camera shake control, the camera shake lock, the diaphragm, the focus lens, the liquid crystal ND, and the lens barrel display unit is transmitted from the interchangeable lens 10.

The lens control unit 22 on the interchangeable lens 10 side transmits the initialization completion signal to the body control unit 72 at the timing of the completion of initialization with respect to each of the zoom lens, the camera shake control, the camera shake lock, the diaphragm, the focus lens, the liquid crystal ND, and the lens barrel display unit.

Figure 21:
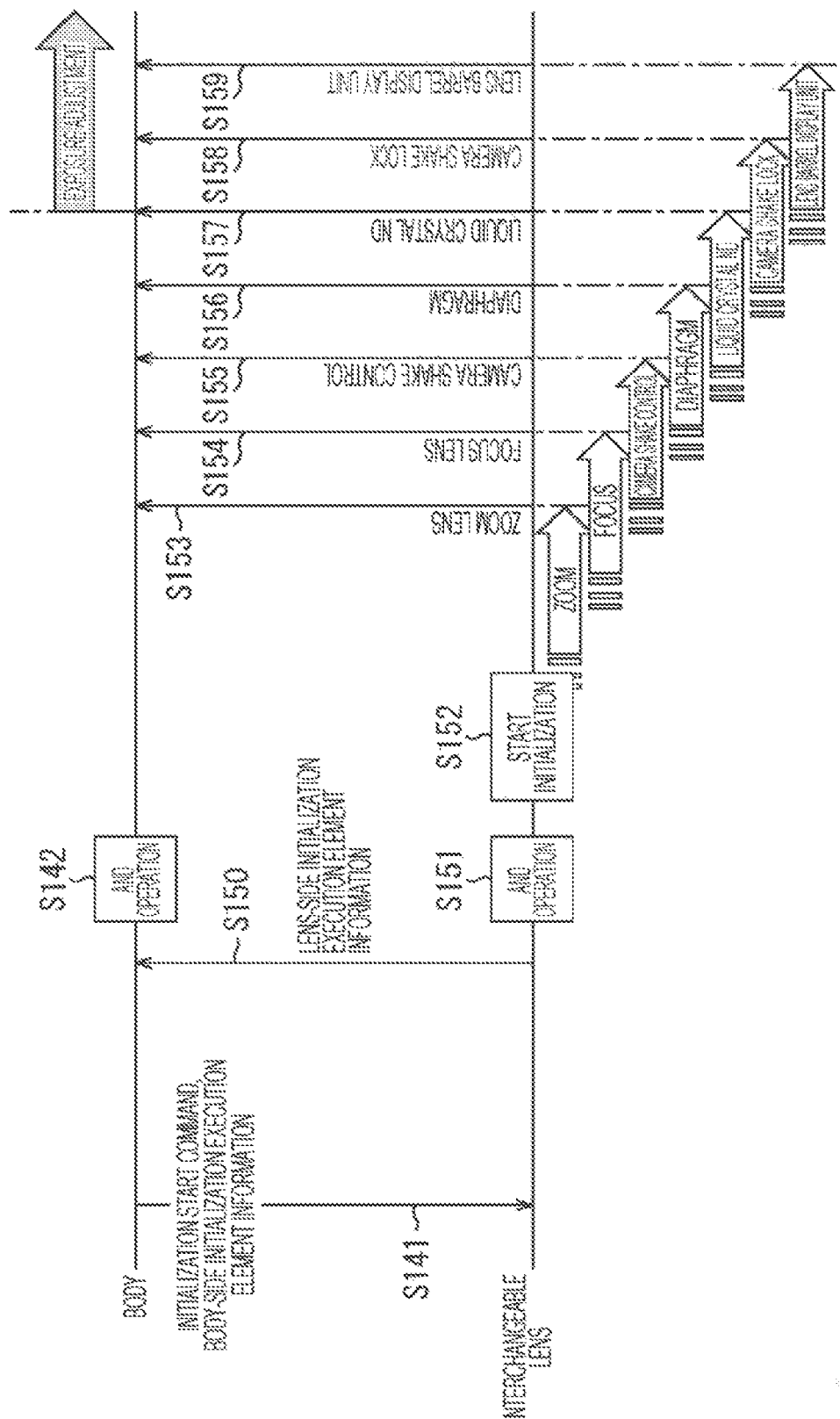
FIG. 21 is a diagram illustrating a process flow in a case where the interchangeable lens and the body are equivalent in function.

FIG. 21 illustrates a process flow in a case where the elements to which the interchangeable lens 10 and the body 60 can correspond are coincident with each other.

First, in step S141, the body control unit 72 transmits the body-side initialization execution element information indicating elements on which the body 60 performs initialization together with an initialization start command requesting the start of initialization to the lens control unit 22.

Upon receiving the initialization start command and the body-side initialization execution element information, in step S150, the lens control unit 22 transmits the lens-side initialization execution element information indicating elements on which the lens control unit itself performs initialization to the body control unit 72. Upon receiving the lens-side initialization execution element information transmitted from the lens control unit 22, in step S142, the body control unit 72 performs an AND operation between the lens-side initialization execution element information and the body-side initialization execution element information and recognizes the initialization completion transmission element which is an element of which the initialization completion signal is transmitted. The initialization completion transmission elements are seven elements of the diaphragm, the zoom lens, the focus lens, the camera shake control, the liquid crystal ND, the camera shake lock, and the lens barrel display unit.

On the other hand, after the transmission of the lens-side initialization execution element information in step S150, in step S151, the lens control unit 22 performs an AND operation between the received body-side initialization execution element information and the lens-side initialization execution element information indicating elements on which the lens control unit itself performs initialization. Therefore, the lens control unit 22 determines the elements of which the initialization completion signals are to be transmitted. Subsequently, in step S152, the initialization process of each element is started. Herein, the lens-side initialization execution element information is transmitted before the start of the initialization process. However, the transmission of the lens-side initialization execution element information may be performed after the AND operation or after the start of the initialization process. In addition, the start of the initialization process and the transmission of the lens-side initialization execution element information may be performed simultaneously.

After that, at the timing when the initialization process of each element has been completed, as steps S153 to S159, the lens control unit 22 transmits the initialization completion signals of the elements of which the initialization process has been completed to the body control unit 72.

In the example of FIG. 21, in steps S153 to S159, the initialization process has been completed in the order of the zoom lens, the focus lens, the camera shake control, the diaphragm, the liquid crystal ND, the camera shake lock, and the lens barrel display unit, and the initialization completion signals are transmitted in this order. The order of completion of the initialization is an exemplary one. In a case where the interchangeable lens 10 and the compatible element of the body 60 are coincident with each other, the body control unit 72 can recognize which of the plurality of elements of which the initialization completion signal is transmitted from the lens control unit 22 is an element associated with the exposure adjustment process (diaphragm). Accordingly, in a case where the initialization completion signals of both of the diaphragm and the liquid crystal ND are received, the body control unit 72 starts the diaphragm element corresponding initialization process including the exposure adjustment process.

<Flowchart of First Initialization Process on Body Side>

The first initialization process executed on the body 60 side in a case where the elements to which the interchangeable lens 10 and the body 60 can correspond are coincident with each other is similar to the first initialization process described with reference to FIG. 15 in a case where only the interchangeable lens 10 corresponds to a new element, and thus, the description thereof will be omitted.

<Flowchart of First Initialization Process on Lens Side>

Next, in a case where the elements to which the interchangeable lens 10 and the body 60 can correspond are coincident with each other, a first initialization process executed on the interchangeable lens 10 side will be described with reference to the flowchart of FIG. 22. This process is started, for example, when the initialization start command and the body-side initialization execution element information transmitted from the body control unit 72 are received. First, in step S171, the lens control unit 22 transmits the lens-side initialization execution element information indicating elements on which the interchangeable lens 10 performs initialization to the body control unit 72 on the basis of the received initialization start command and the received body-side initialization execution element information.

In step S172, the lens control unit 22 performs an AND operation between the received body-side initialization execution element information and the lens-side initialization execution element information. Therefore, the elements of which the initialization completion signals the lens control unit 22 transmits are determined. In step S173, the lens control unit 22 sets the number of elements of which initialization is to be performed to a variable d_count indicating the elements scheduled to be implemented. According to the example of FIG. 20, the variable d_count is set to 7, which is the same as the number of elements of "1" in the initialization execution element information.

In step S174, the lens control unit 22 sets the conversion i_count for counting the elements of which the initialization process has been completed to 0

In addition, the variables d_count and i_count are independent variables for the lens control unit 22 on the interchangeable lens 10 side and the body control unit 72 on the body 60 side.

In step S175, the lens control unit 22 starts the initialization process for each element with respect to all elements requiring initialization. The process of step S175 corresponds to the process of step S152 of FIG. 21. In this embodiment, the initialization processes of all the elements are started simultaneously, but the initialization process may be performed in a predetermined order or with a priority.

In step S176, the lens control unit 22 determines whether there is an element of which the initialization process has been completed among the elements which are in initialization execution.

In step S176, the process waits until it is determined that there is an element of which the initialization process has been completed, and in a case where it is determined that there is an initialization-completed element, the process proceeds to step S177. Then, in step S177, the lens control unit 22 transmits the initialization completion signal of the element of which the initialization process has been completed to the body control unit 72.

In step S178, the lens control unit 22 increments the conversion i_count for counting the elements of which the initialization process has been completed by 1.

In step S179, the lens control unit 22 determines whether or not the conversion i_count for counting the elements of which the initialization process has been completed is equal to the variable d_count indicating the elements scheduled to be implemented.

In step S179, in a case where it is determined that the conversion i_count for counting the elements of which the initialization process has been completed is not equal to the variable d_count indicating the elements scheduled to be implemented, the process returns to step S176. As a result, the lens control unit 22 waits again until the next element after the completion of the initialization process is generated.

On the other hand, in a case where it is determined in step S179 that the conversion i_count for counting the elements of which the initialization process has been completed is equal to the variable d_count indicating the elements scheduled to be implemented, the first initialization process on the interchangeable lens 10 side has been completed.

According to the first initialization process of the camera system 1 described above, even in a case where the elements to which the interchangeable lens 10 and the body 60 can correspond are coincident with each other, the interchangeable lens 10 can perform initialization of all the elements which the interchangeable lens includes, and the body 60 can appropriately start the element corresponding initialization process in the order in which the initialization of each of the elements on the interchangeable lens 10 side has been completed.

Accordingly, it is possible to correctly recognize the elements which each of the body 60 and the interchangeable lens 10 includes and to appropriately execute the initialization processes.

<4.3 Case where Interchangeable Lens is Lower in Function than Body>

Next, a case where the interchangeable lens 10 is lower in function than the body 60, in other words, a case where the interchangeable lens 10 does not correspond to an element to which the body 60 can correspond will be described.

Specifically, a case where the body 60 can correspond the diaphragm, the zoom lens, the focus lens, and the camera shake control and the interchangeable lens 10 is a short focus lens, does not have a zooming function and a camera shake correction function, can correspond to only the focus lens will be described.

A of FIG. 23 illustrates elements which are indicated by the body-side initialization execution element information and on which the body 60 performs initialization.

B of FIG. 23 illustrates elements which are indicated by the lens-side initialization execution element information and on which the interchangeable lens 10 performs initialization.

The body 60 corresponds to four elements of the diaphragm, the zoom lens, the focus lens, and the camera shake control.

The interchangeable lens 10 corresponds to two elements of the diaphragm and the focus lens.

As illustrated in C of FIG. 23, the elements of which the initialization completion signals the interchangeable lens 10 can transmit are elements corresponding to a result of an AND operation common to the body-side initialization execution element information and the lens-side initialization execution element information. Therefore, the interchangeable lens 10 can transmit the initialization completion signals of only the diaphragm and the focus lens.

The body control unit 72 of the body 60 performs an AND operation between the body-side initialization execution element information and the lens-side initialization execution element information, so that it is possible to recognize that the initialization completion signal of each of the diaphragm and the focus lens is transmitted from the interchangeable lens 10.

The lens control unit 22 of the interchangeable lens 10 transmits the initialization completion signal to the body control unit 72 at the timing of completion of initialization with respect to each of the diaphragm and the focus lens.

Figure 24:
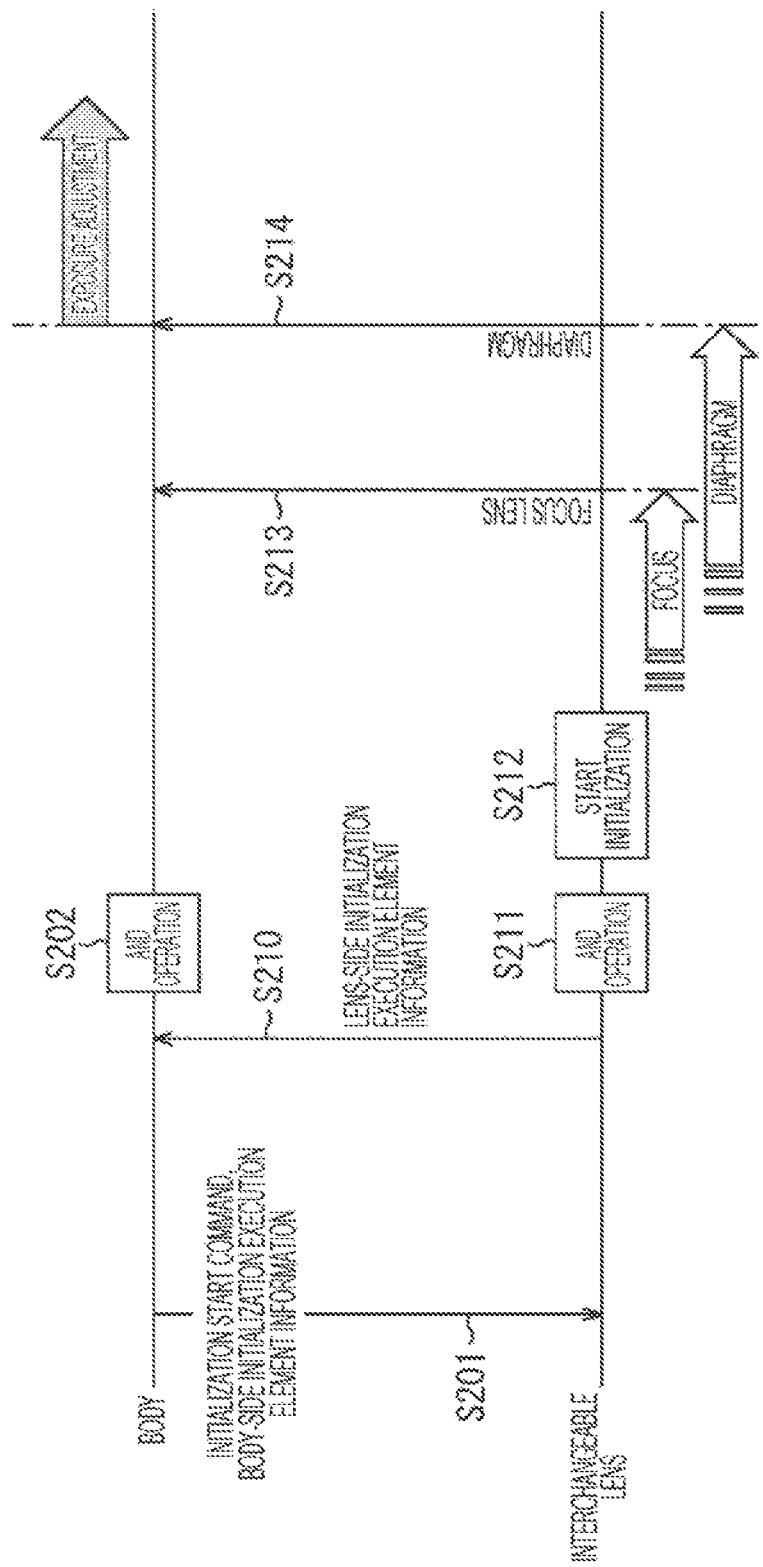
FIG. 24 is a diagram illustrating a process flow in a case where the interchangeable lens does not correspond to elements to which the body can correspond.

FIG. 24 illustrates a process flow in a case where the interchangeable lens 10 does not correspond to the elements to which the body 60 can correspond.

First, in step S201, the body control unit 72 transmits body-side initialization execution element information indicating elements on which the body 60 performs initialization together with an initialization start command requesting the start of initialization to the lens control unit 22.

Upon receiving the initialization start command and the body-side initialization execution element information, in step S210, the lens control unit 22 transmits the lens-side initialization execution element information indicating elements on which the lens control unit itself performs initialization to the body control unit 72.

Upon receiving the lens-side initialization execution element information transmitted from the lens control unit 22, in step S202, the body control unit 72 performs an AND operation between the lens-side initialization execution element information and the body-side initialization execution element information and recognizes the initialization completion transmission element which is an element of which the initialization completion signal is transmitted. The initialization completion transmission elements are two elements of the diaphragm and the focus lens.

On the other hand, after the transmission of the lens-side initialization execution element information in step S210, in step S211, the lens control unit 22 performs an AND operation between the received body-side initialization execution element information and the lens-side initialization execution element information on which the lens control unit itself performs initialization. Therefore, the lens control unit 22 determines the elements of which initialization completion signals are to be transmitted.

Subsequently, in step S212, the initialization process of each element is started. In addition, the lens-side initialization execution element information may be transmitted after the start of the initialization process, or the information may be transmitted at the same time as the start of the initialization process.

After that, at the timing when the initialization process of each element has been completed, as steps S213 and S214, the lens control unit 22 sequentially transmits the initialization completion signals of the elements of which the initialization process has been completed to the body control unit 72

In the example of FIG. 24, in steps S213 and S214, the initialization process has been completed in the order of the focus lens and the diaphragm, and the initialization completion signals are transmitted in this order. The order of completion of the initialization is an exemplary one.

In a case where the interchangeable lens 10 does not correspond to the elements to which the body 60 can correspond, the body control unit 72 determines which element among the plurality of elements of which the completion of initialization is transmitted from the lens control unit 22 is associated with the exposure adjustment process (diaphragm). Therefore, the body control unit 72 starts the element corresponding initialization processes in the order of the elements of which the completion of initialization has been received.

<Flowchart of First Body-Initialization Process on Body Side>

The first initialization process executed on the body 60 side in a case where the interchangeable lens 10 does not correspond to the elements to which the body 60 can correspond is similar to the first initialization process described with reference to FIG. 15 in a case where only the interchangeable lens 10 corresponds to a new element, and thus, the description thereof will be omitted.

<Flowchart of First Initialization Process on Lens Side>

The first initialization process executed on the interchangeable lens 10 side in a case where the interchangeable lens 10 does not correspond to the elements to which the body 60 can correspond is similar to the first initialization process described with reference to FIG. 22 in a case where the elements to which the interchangeable lens 10 and the body 60 can correspond are coincident with each other, and thus, the description thereof will be omitted.

According to the first initialization process of the camera system 1 described above, even in a case where the interchangeable lens 10 does not correspond to the elements to which the body 60 can correspond, the interchangeable lens 10 can perform initialization of all the elements the interchangeable lens includes, and the body 60 can appropriately start the element corresponding initialization process in the order in which the initialization of each element on the interchangeable lens 10 side has been completed.

Accordingly, it is possible to correctly recognize the elements included in each of the body 60 and the interchangeable lens 10 and to appropriately execute the initialization process.

<5. Second Initialization Process>

Next, a second initialization process which is a second example of the initialization process according to an embodiment of the present disclosure will be described.

In the first initialization process described above, the body 60 transmits the element information indicating an element to which the body itself corresponds as body-side initialization execution element information to the interchangeable lens 10, and the interchangeable lens 10 transmits the element information indicating elements which the interchangeable lens itself includes as lens-side initialization execution element information to the body 60.

Then, upon receiving the lens-side initialization execution element information, the body control unit 72 performs an AND operation between the lens-side initialization execution element information and the body-side initialization execution element information, and the body control unit recognizes the element of which the initialization completion signal is transmitted on the basis of a result of the operation.

On the other hand, in the second initialization process, the interchangeable lens 10 side performs the AND operation between the body-side initialization execution element information transmitted from the body 60 and the element information indicating elements which the interchangeable lens side itself includes, and the interchangeable lens side transmits a result of the operation as lens-side initialization execution element information to the body 60. The body control unit 72 on the body 60 side recognizes the element of which the initialization completion signal is transmitted on the basis of the lens-side initialization execution element information that is a result of the AND operation between the body-side initialization execution element information and the lens-side initialization execution element information.

Hereinafter, with respect to the second initialization process, similarly to the first initialization process, a case where the interchangeable lens 10 is higher in function than the body 60, a case where the interchangeable lens 10 and the body 60 are equivalent in function, and a case where the interchangeable lens 10 is lower in function than the body 60 will be described.

<5.1 Case where Interchangeable Lens is Higher in Function than Body>

First, a case where the interchangeable lens 10 is higher in function than the body 60 will be described.

Figure 25:
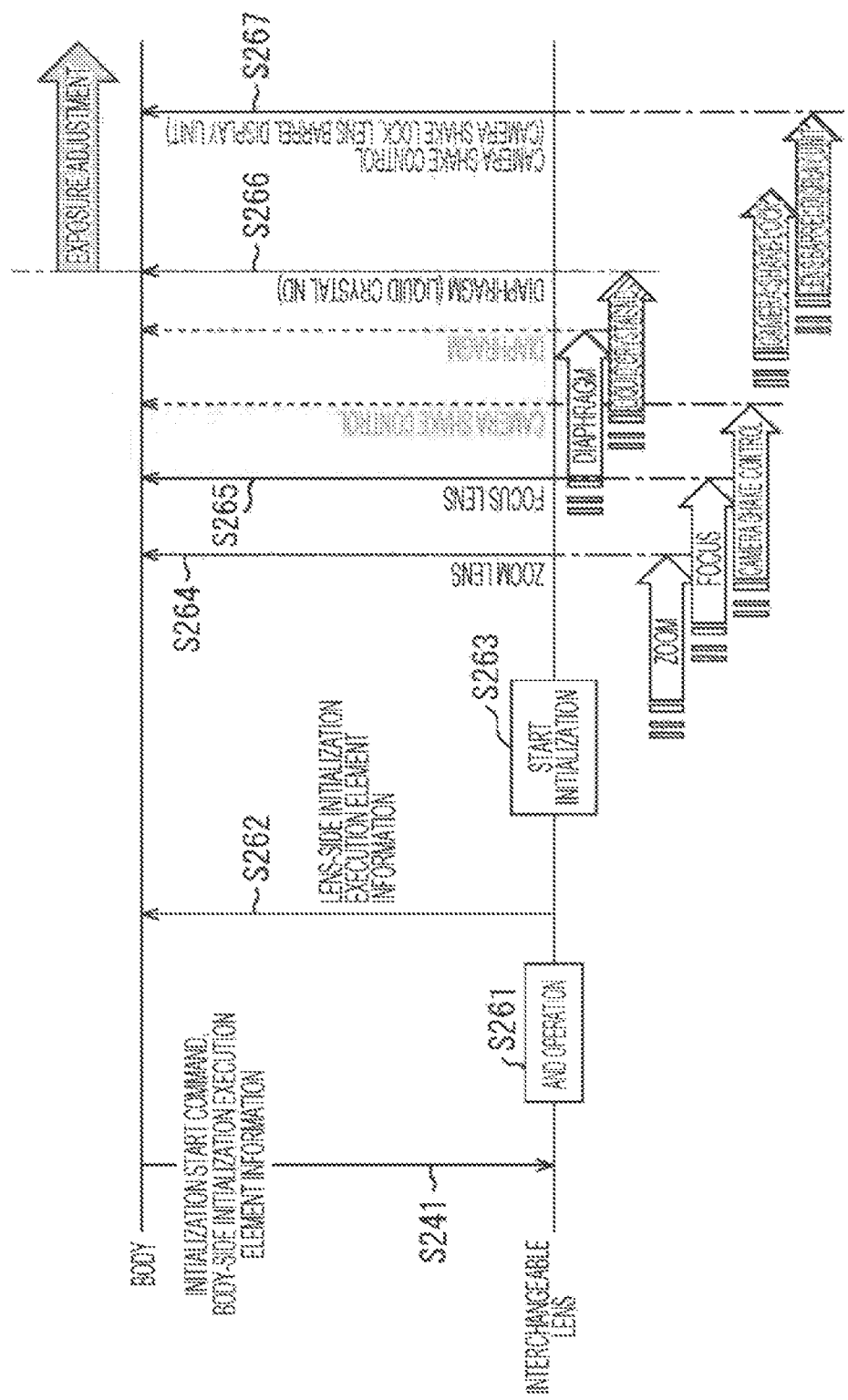
FIG. 25 is a diagram illustrating a process flow of a second initialization process corresponding to a case illustrated in FIG. 10.

FIG. 25 illustrates a process flow in a case where the initialization of the exposure non-influencing element to which the body 60 can correspond among the plurality of exposure non-influencing elements corresponding to the case illustrated in FIG. 10 in the first initialization process has been completed, and after that, the initialization of the lens barrel display unit to which the body 60 does not correspond has been completed.

First, in step S241, the body control unit 72 transmits body-side initialization execution element information indicating an initialization element on which the body 60 performs initialization, together with an initialization start command requesting the start of initialization, to the lens control unit 22.

Upon receiving the initialization start command and the body-side initialization execution element information transmitted from the body 60, in step S261, the lens control unit 22 performs an AND operation between the received body-side initialization execution element information and the element information indicating the elements to which the lens control unit itself corresponds.

Then, in step S262, the lens control unit 22 transmits a result of the AND operation as lens-side initialization execution element information to the body control unit 72.

The body-side initialization execution element information transmitted by the body control unit 72 in step S241 of FIG. 25 is the same as the body-side initialization execution element information indicated by A of FIG. 6. On the other hand, the lens-side initialization execution element information transmitted by the lens control unit 22 in step S262 is element information corresponding to a result of the AND operation illustrated by C of FIG. 6.

Accordingly, upon receiving the lens-side initialization execution element information transmitted from the lens control unit 22, the body control unit 72 can recognize the initialization completion transmission element which is an element of which the initialization completion signal is transmitted without the body control unit itself performing an AND operation. In case of the example, the initialization completion transmission elements are four elements, namely, the diaphragm, the zoom lens, the focus lens, and the camera shake control.

After transmitting the lens-side initialization execution element information in step S262, the lens control unit 22 starts the initialization process of each element in step S263. Any one of the processes of step S262 and step S263 may be performed earlier, or the processes may be performed simultaneously.

In step S264, the lens control unit 22 transmits the initialization completion signal of the zoom lens to the body control unit 72 at the timing when the initialization process of the zoom lens has been completed.

In step S265, the lens control unit 22 transmits the initialization completion signal of the focus lens to the body control unit 72 at the timing when the initialization process of the focus lens has been completed.

After step S265, the initialization process of the camera shake control has been completed. However, since the camera shake control is the last exposure non-influencing element of which the initialization completion signal can be transmitted, the lens control unit 22, does not transmit the initialization completion signal of the camera shake control at this timing, and the lens control unit transmits the initialization completion signal of the camera shake control to the body control unit 72 in step S267 which is the timing when the initialization of both of the camera shake lock and the lens barrel display unit has been completed. Namely, the initialization completion of both of the camera shake lock and the lens barrel display unit is included in the initialization completion signal of the camera shake control. However, this does not denote that the signals corresponding to the initialization completion signals of the camera shake lock and the lens barrel display unit are included in the initialization completion signal of the camera shake control.

With respect to the exposure influencing element, the lens control unit 22 does not transmit the initialization completion signal of the diaphragm at the timing when the initialization of the diaphragm has been completed, and the lens control unit transmits the initialization completion signal of the diaphragm to the body control unit 72 in step S266 which is the timing when the initialization of the liquid crystal ND has been completed. Namely, the initialization completion of the liquid crystal ND is included in the initialization completion signal of the diaphragm. However, this does not denote that a signal corresponding to the initialization completion signal of the liquid crystal ND is included in the initialization completion signal of the diaphragm. At the time when the body control unit 72 receives the initialization completion signal of the diaphragm in step S266, the body control unit 72 starts the diaphragm element corresponding initialization process including the exposure adjustment process.

Figure 26:
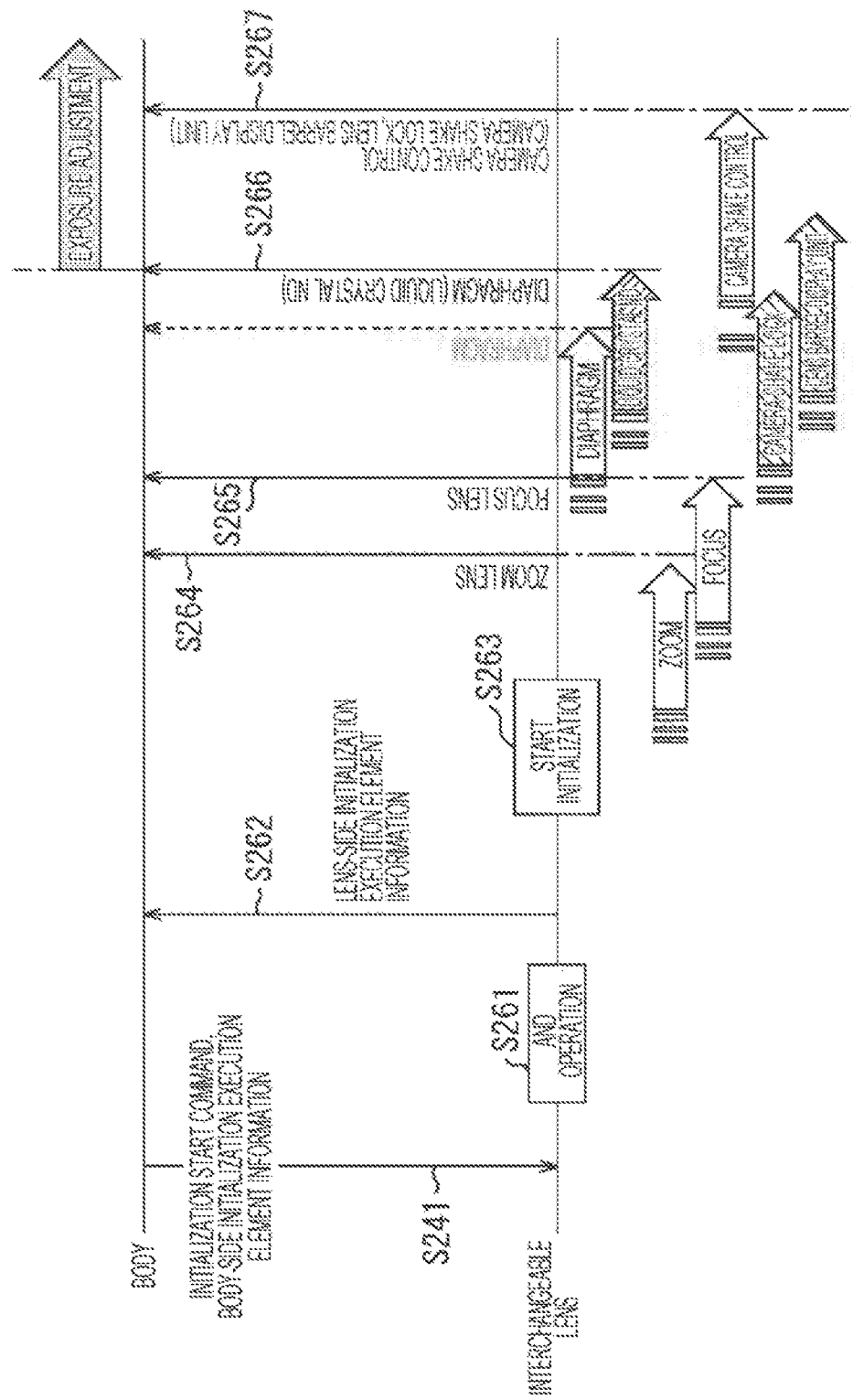
FIG. 26 is a diagram illustrating a process flow of a second initialization process corresponding to a case illustrated in FIG. 11.

Next, FIG. 26 illustrates a process flow in a case where the initialization of the element to which the body 60 does not correspond among the plurality of exposure non-influencing elements corresponding to the case illustrated in FIG. 11 in the first initialization process has been completed earlier, and after that, the initialization of the element to which the body 60 corresponds has been completed.

In FIG. 25, in the interchangeable lens 10, the initialization of the camera shake control has been completed earlier, and after that, the initialization of the camera shake lock and the initialization of the lens barrel display unit have been completed in order. However, in FIG. 26, the initialization of the camera shake lock and the initialization of the lens barrel display unit have been completed earlier, and after that, the initialization of the camera shake control has been completed. Others are similar to in FIG. 25. Even In this case, the initialization process is similar to the flow illustrated in FIG. 25, and in step S267, the initialization completion signal of the camera shake control including the initialization completion of both of the camera shake lock and the lens barrel display unit is transmitted to the body control unit 72. Next, FIG. 27 illustrates a process flow in a case where the initialization of the elements to which the body 60 can correspond among the plurality of exposure non-influencing elements corresponding to the case illustrated in FIG. 12 in the first initialization process has been completed earlier, after that, the initialization of the elements to which the body 60 does not correspond has been completed, and finally, the initialization of the exposure influencing elements has been completed.

Figure 27:
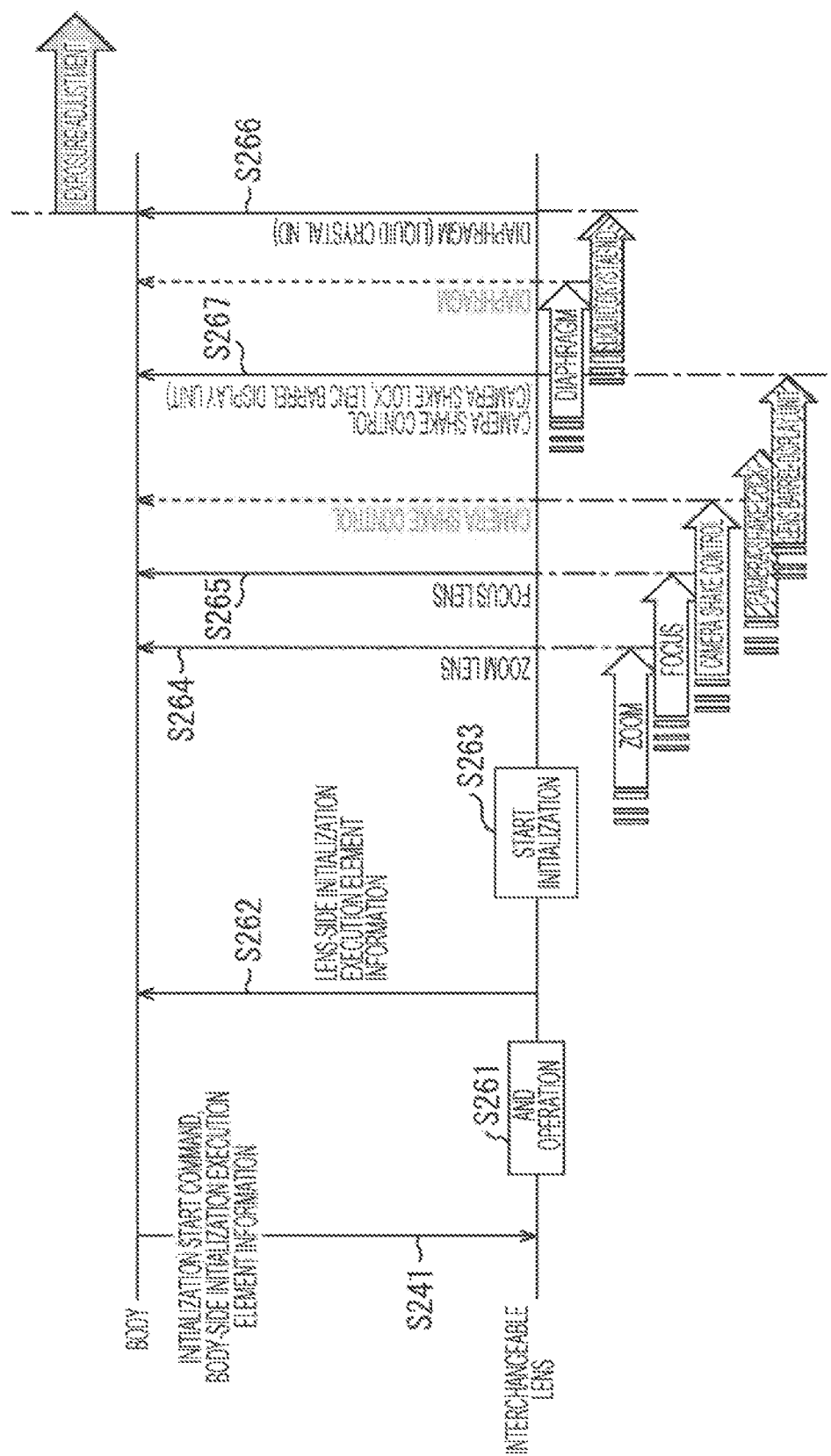
FIG. 27 is a diagram illustrating a process flow of a second initialization process corresponding to a case illustrated in FIG. 12.

FIG. 27 is different from FIG. 25 in that the initialization completion timing of the liquid crystal ND which is an exposure influencing element is later than the timing of the initialization completion of the camera shake lock and the barrel display unit which are exposure non-influencing elements. Therefore, in FIG. 27, the order of step S266 of transmitting the initialization completion signal of the diaphragm to the body control unit 72 and step S267 of transmitting the initialization completion signal of the camera shake control to the body control unit 72 is opposite to that in the case of FIG. 25. With respect to the others, FIG. 27 is similar to FIG. 25.

The lens control unit 22 does not transmit the initialization completion signal of the camera shake control at the timing when the initialization of the camera shake control has been completed, and the lens control unit 22 transmits the initialization completion signal of the camera shake control to the body control unit 72 at the timing when the initialization of both of the camera shake lock and the lens barrel display unit has been completed.

Figure 28:
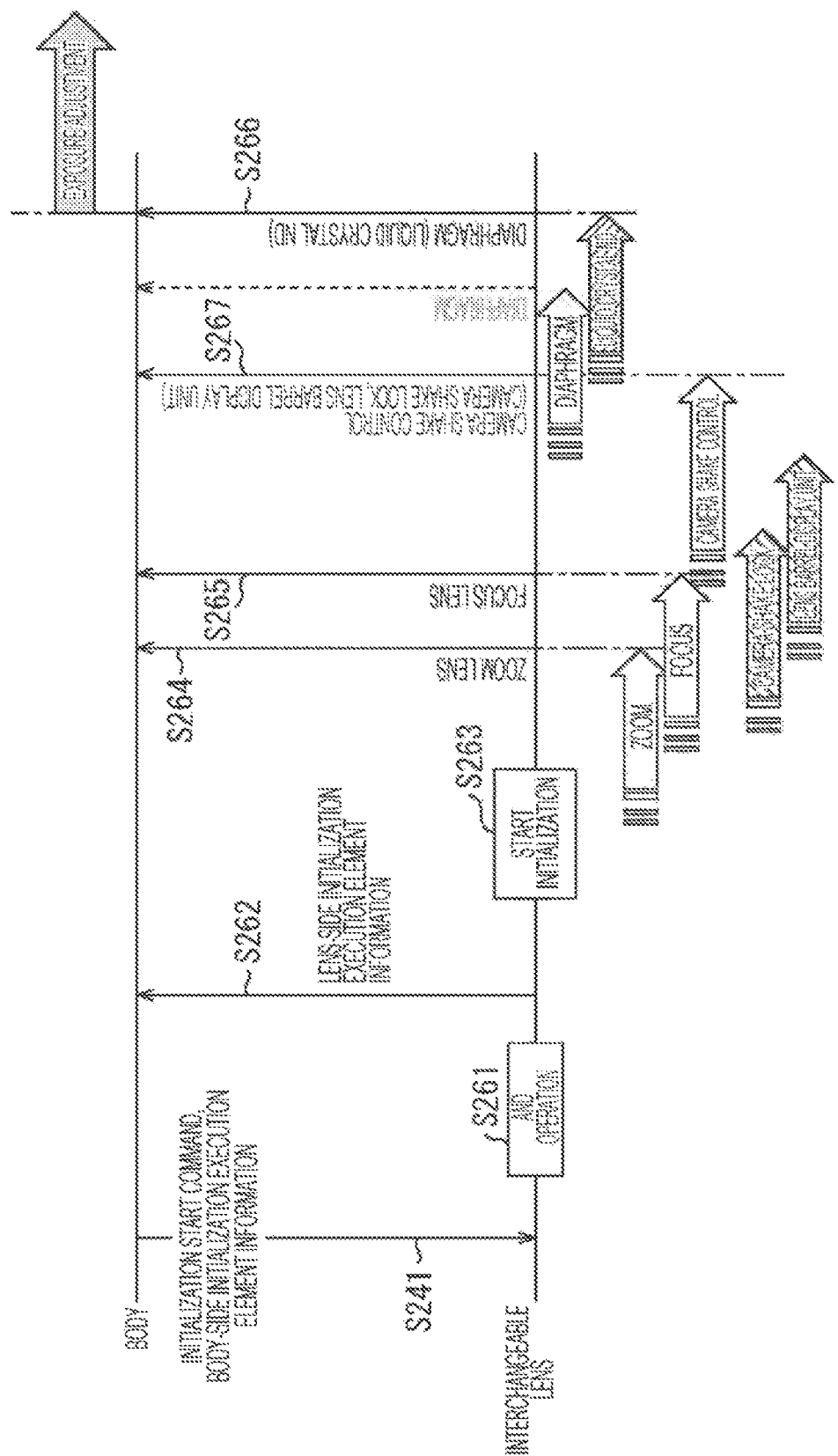
FIG. 28 is a diagram illustrating a process flow of a second initialization process corresponding to a case illustrated in FIG. 13.

Next, FIG. 28 illustrates a process flow in a case where the initialization of the element to which the body 60 does not correspond among the plurality of exposure non-influencing elements corresponding to the case illustrated in FIG. 13 in the first initialization process has been completed earlier, after that, the initialization of the elements to which the body 60 does correspond has been completed, and finally, the initialization of the exposure influencing element has been completed.

FIG. 28 is different from FIG. 26 in that the initialization completion timing of the liquid crystal ND which is an exposure influencing element is later than the initialization completion timing of the camera shake lock and the lens barrel display unit which are exposure non-influencing elements. Therefore, in FIG. 28, the order of step S266 of transmitting the initialization completion signal of the diaphragm to the body control unit 72 and step S267 of transmitting the initialization completion signal of the camera shake control to the body control unit 72 is opposite to that in the case of FIG. 26. With respect to the others, FIG. 28 is similar to FIG. 26.

The lens control unit 22 transmits the initialization completion signal of the camera shake control to the body control unit 72 at the timing when the initialization of both of the camera shake lock and the lens barrel display unit has been completed, and after that, the initialization of the camera shake control has been completed.

<Flowchart of Second Initialization Process on Body Side>

Figure 29:
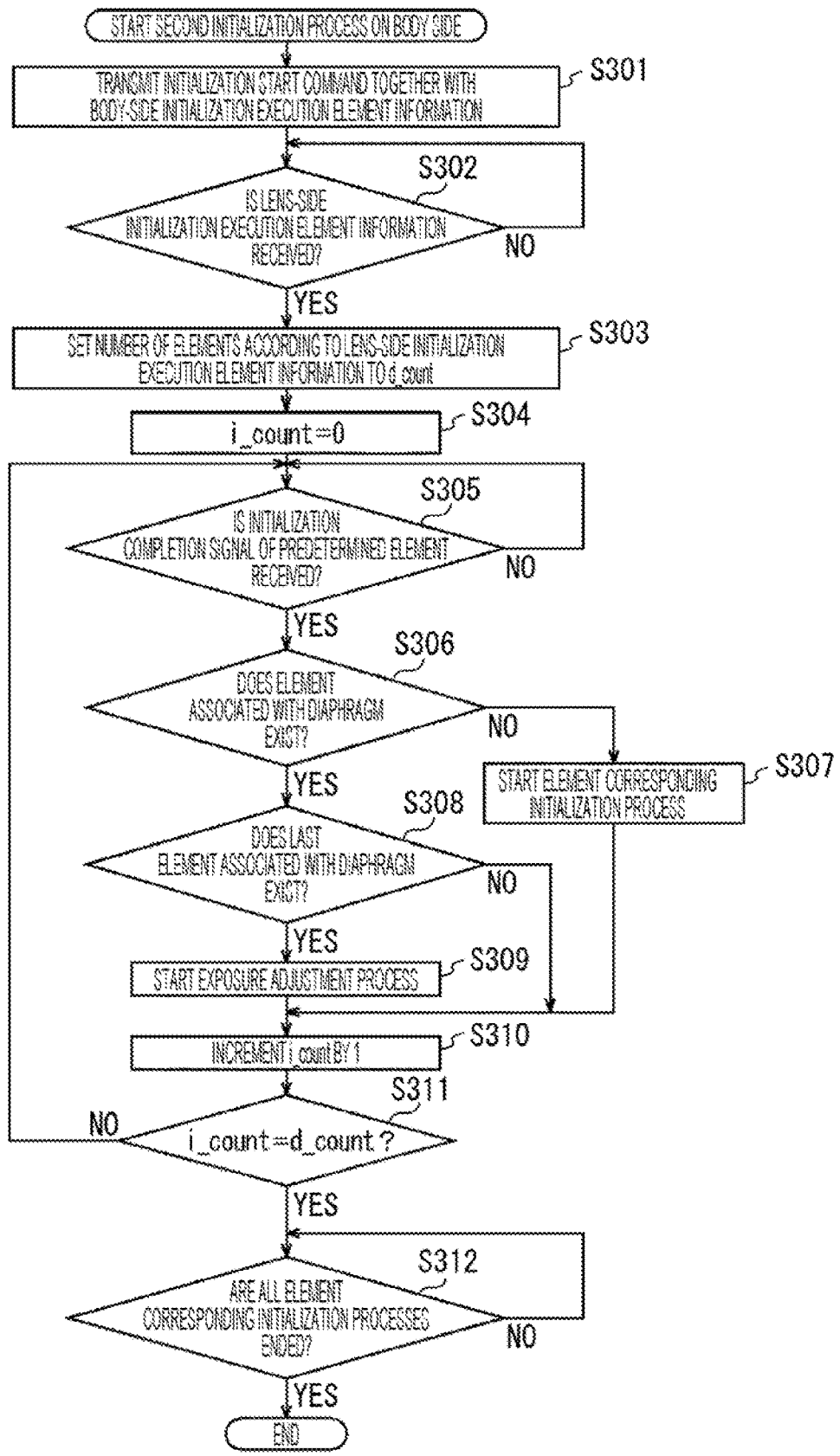
FIG. 29 is a flowchart illustrating a second initialization process executed on the body side in a case where only the interchangeable lens corresponds to a new element.

Next, in a case where only the interchangeable lens 10 corresponds to a new element, a second initialization process executed on the body 60 side will be described with reference to the flowchart of FIG. 29. This process is started, for example, when the interchangeable lens 10 is attached to the body 60 and the power is turned on.

First, in step S301, the body control unit 72 transmits an initialization start command for starting initialization, together with the body-side initialization execution element information indicating elements on which the body 60 performs initialization, to the lens control unit 22.

In step S302, the body control unit 72 determines whether or not the lens-side initialization execution element information indicating elements on which the interchangeable lens 10 performs initialization has been received from the lens control unit 22, and the process of step S302 is repeated until it is determined that the lens-side initialization execution element information has been received. Unlike the first initialization process, the received lens-side initialization execution element information is a result of the AND operation between the body-side initialization execution element information and the element information indicating the element to which the interchangeable lens 10 corresponds and denotes an initialization completion transmission element of which the initialization completion signal is transmitted. Therefore, the lens control unit 22 can recognize the element of which the initialization completion signal is transmitted on the basis of the initialization execution element information.

Then, in a case where it is determined in step S302 that the lens-side initialization execution element information has been received, the process proceeds to step S303, and the body control unit 72 sets the number of elements corresponding to the received lens-side initialization execution element information to a variable d_count indicating the elements scheduled to be received. According to the example of FIG. 6, the variable d_count is set to 4.

Figure 15:
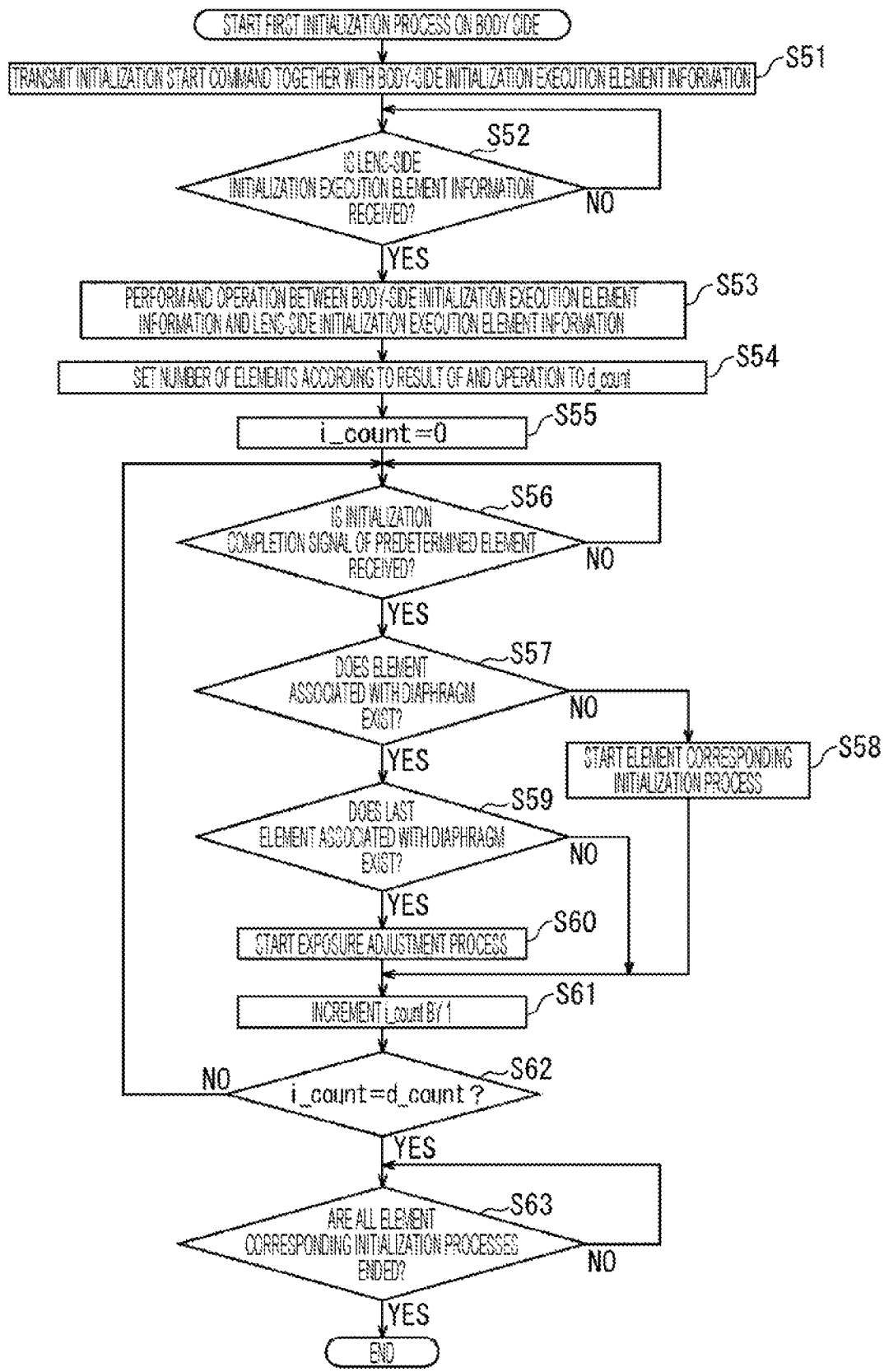
FIG. 15 is a flowchart illustrating a first initialization process executed on the body side in a case where only the interchangeable lens corresponds to a new element.

The subsequent processes of steps S304 to S312 are similar to the processes of steps S55 to S63 of FIG. 15, respectively, and thus, the description thereof will be omitted.

The second initialization process on the body 60 side is executed in such a manner as described heretofore.

<Flowchart of Second Initialization Process on Lens Side>

Figure 30:
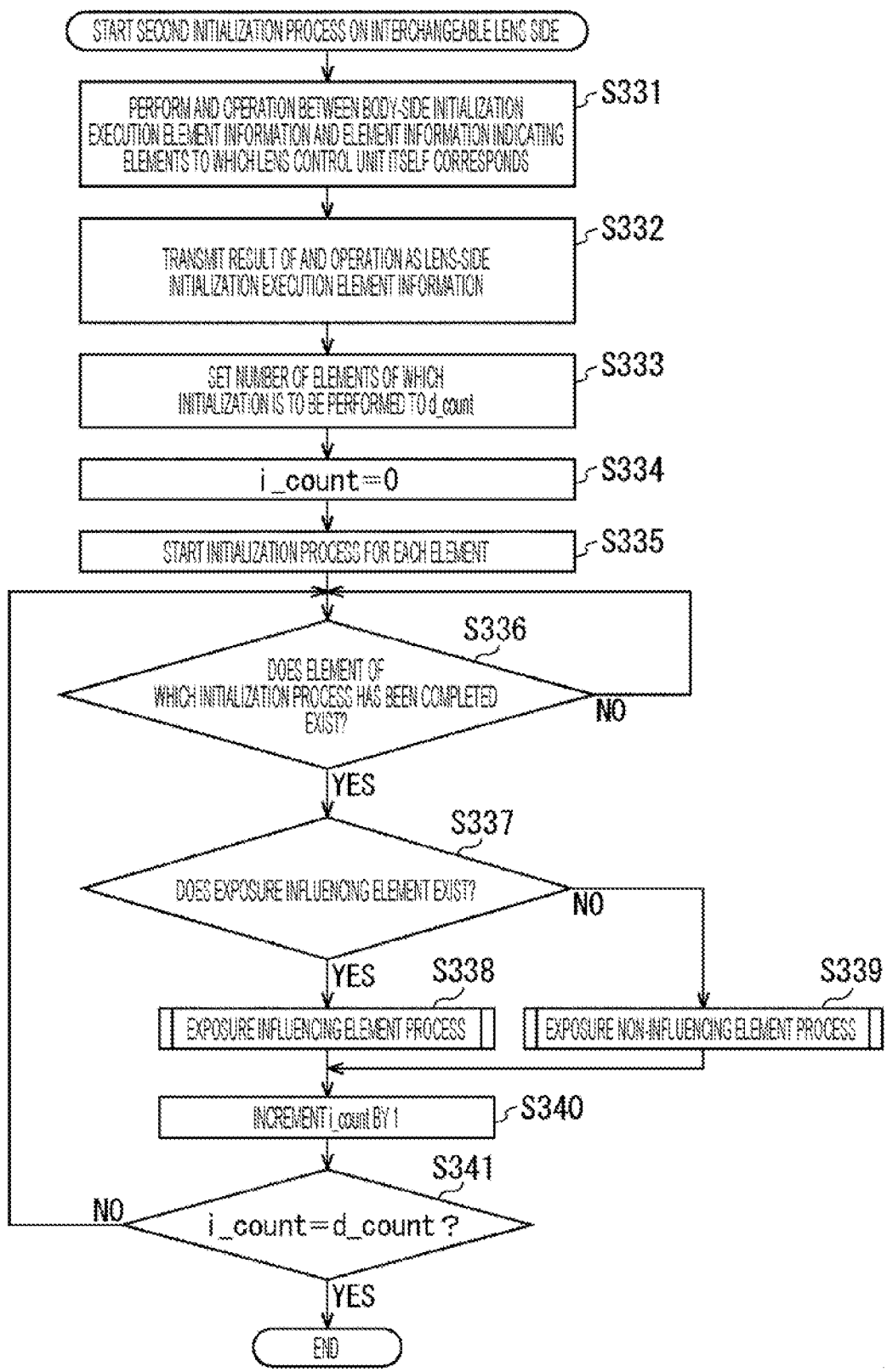
FIG. 30 is a flowchart illustrating a second initialization process executed on the interchangeable lens side in a case where only the interchangeable lens corresponds to a new element.

Next, in a case where only the interchangeable lens 10 corresponds to a new element, a second initialization process executed on the interchangeable lens 10 side will be described with reference to the flowchart of FIG. 30. This process is started, for example, when the initialization start command and the body-side initialization execution element information transmitted from the body control unit 72 are received.

First, in step S331, the lens control unit 22 performs an AND operation between the received body-side initialization execution element information and the element information indicating an element to which the lens control unit itself corresponds.

In step S332, the lens control unit 22 transmits a result of the AND operation to the body control unit 72 as lens-side initialization execution element information indicating elements on which the lens control unit itself performs initialization.

The subsequent processes of steps S333 to S341 are similar to the processes of steps S73 to S81 of FIG. 16, respectively, and thus, the description thereof will be omitted.

The second initialization process on the interchangeable lens 10 side is executed in such a manner as described heretofore. According to the second initialization process of the camera system 1 described above, even in a case where only the interchangeable lens 10 corresponds to a new element, the interchangeable lens 10 can perform initialization of all the elements which the interchangeable lens 10 includes, and the body 60 can appropriately start the initialization of the body 60 side in the order in which necessary initialization has been completed in units of an element on the interchangeable lens 10 side including elements to which the body does not correspond. In addition, the initialization completion signal of the element to which the body 60 does not correspond is not received.

Accordingly, it is possible to correctly recognize the elements of each of the body 60 and the interchangeable lens 10 and to appropriately execute the initialization process.

Upon receiving the lens-side initialization execution element information, the body control unit 72 can recognize that the initialization start command is normally received by the interchangeable lens 10 side and the initialization process is performed on the interchangeable lens 10 side, in other words, that it is possible to expect initialization completion signal of each element to be received.

In addition, according to the second initialization process, the lens-side initialization execution element information of the elements common to the elements to which the body 60 side corresponds and the elements which the interchangeable lens 10 includes is transmitted from the interchangeable lens 10 side to the body 60 side. Therefore, since the lens-side initialization execution element information indicates the initialization completion transmission element of which the initialization completion signal is transmitted, the body control unit 72 can wait for the initialization completion signal of the elements scheduled to be received without concerning a difference in function between the interchangeable lens 10 side and the body 60 side. In other words, difference between the elements (functions) of the interchangeable lens 10 side and the body 60 side can be absorbed by the interchangeable lens 10 side.

<5.2 Case where Interchangeable Lens and Body are Equivalent in Function>

Next, a case where the interchangeable lens 10 and the body 60 are equivalent in function will be described.

Figure 31:
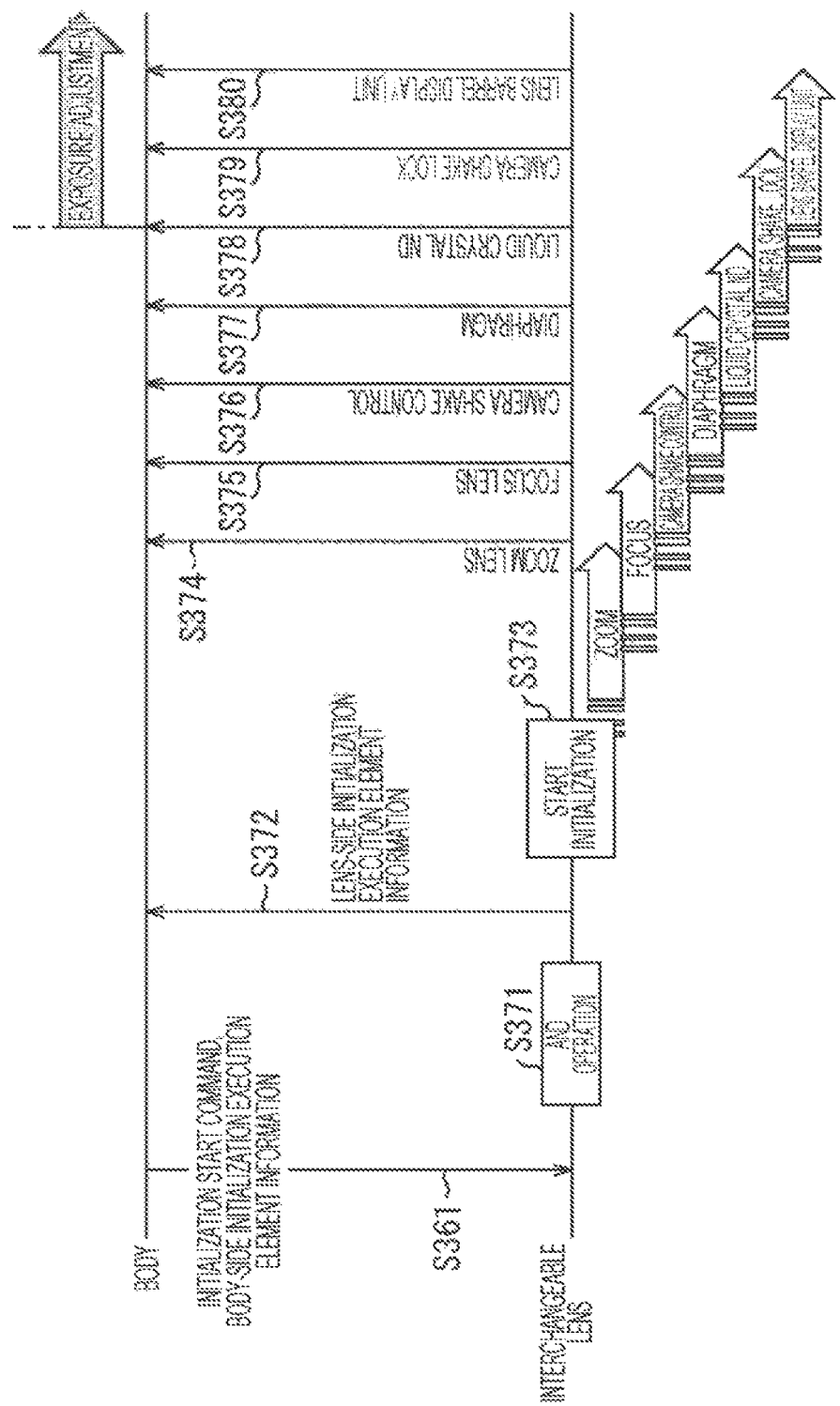
FIG. 31 is a diagram illustrating a process flow of a second initialization process corresponding to a case illustrated in FIG. 21.

FIG. 31 illustrates a process flow in a case where the elements to which the interchangeable lens 10 and the body 60 correspond are coincident with each other, corresponding to the case illustrated in FIG. 21 in the first initialization process.

First, in step S361, the body control unit 72 transmits the body-side initialization execution element information indicating elements on which the body 60 performs initialization, together with the initialization start command requesting the start of initialization, to the lens control unit 22.

Upon receiving the initialization start command and the body-side initialization execution element information, in step S371, the lens control unit 22 performs an AND operation between the received body-side initialization execution element information and the element information indicating an element to which the lens control unit itself corresponds.

Then, in step S372, the lens control unit 22 transmits a result of the AND operation as lens-side initialization execution element information indicating initialization elements on which the lens control unit 22 itself performs initialization to the body control unit 72.

The body-side initialization execution element information transmitted by the body control unit 72 in step S361 is the same as the body-side initialization execution element information indicated by A of FIG. 20. On the other hand, the lens-side initialization execution element information transmitted by the lens control unit 22 in step S372 is element information corresponding to a result of the AND operation illustrated by C of FIG. 20.

After transmitting the lens-side initialization execution element information in step S372, the lens control unit 22 starts the initialization process of each element in step S373. Any one of the processes of step S372 and step S373 may be performed earlier, or the processes may be performed simultaneously.

After that, in steps S374 to S380, the lens control unit 22 transmits the initialization completion signal of the element of which the initialization process has been completed to the body control unit 72 at the timing when the initialization process of each element has been completed.

In the example of FIG. 31, in steps S374 to S380, the initialization processes have been completed in the order of the zoom lens, the focus lens, the camera shake control, the diaphragm, the liquid crystal ND, the camera shake lock, and the lens barrel display unit, and the initialization completion signals are transmitted in this order. The order of completion of the initialization is an exemplary one.

In a case where the elements to which the interchangeable lens 10 and the body 60 can correspond are coincident with each other, the body control unit 72 determines which element among the plurality of elements of which the completion of initialization is transmitted from the lens control unit 22 is associated with the exposure adjustment process (diaphragm). Accordingly, in a case where the initialization completion of both of the diaphragm and the liquid crystal ND is received, the body control unit 72 starts the diaphragm element corresponding initialization process including the exposure adjustment process.

<Flowchart of Second Initialization Process on Body Side>

The second initialization process executed on the body 60 side in a case where the elements to which the interchangeable lens 10 and the body 60 can correspond are coincident with each other is similar to the second initialization process described with reference to FIG. 29 in a case where only the interchangeable lens 10 corresponds to a new element, and thus, the description thereof will be omitted.

<Flowchart of Second Initialization Process on Lens Side>

Next, in a case where the elements to which the interchangeable lens 10 and the body 60 correspond are coincident with each other, a second initialization process executed on the interchangeable lens 10 side will be described with reference to the flowchart of FIG. 32. This process is started, for example, when the initialization start command and the body-side initialization execution element information transmitted from the body control unit 72 are received. First, in step S401, the lens control unit 22 performs an AND operation between the received body-side initialization execution element information and the element information indicating an element to which the lens control unit itself corresponds.

In step S402, the lens control unit 22 transmits a result of the AND operation to the body control unit 72 as lens-side initialization execution element information indicating elements on which the lens control unit itself performs initialization.

Figure 22:
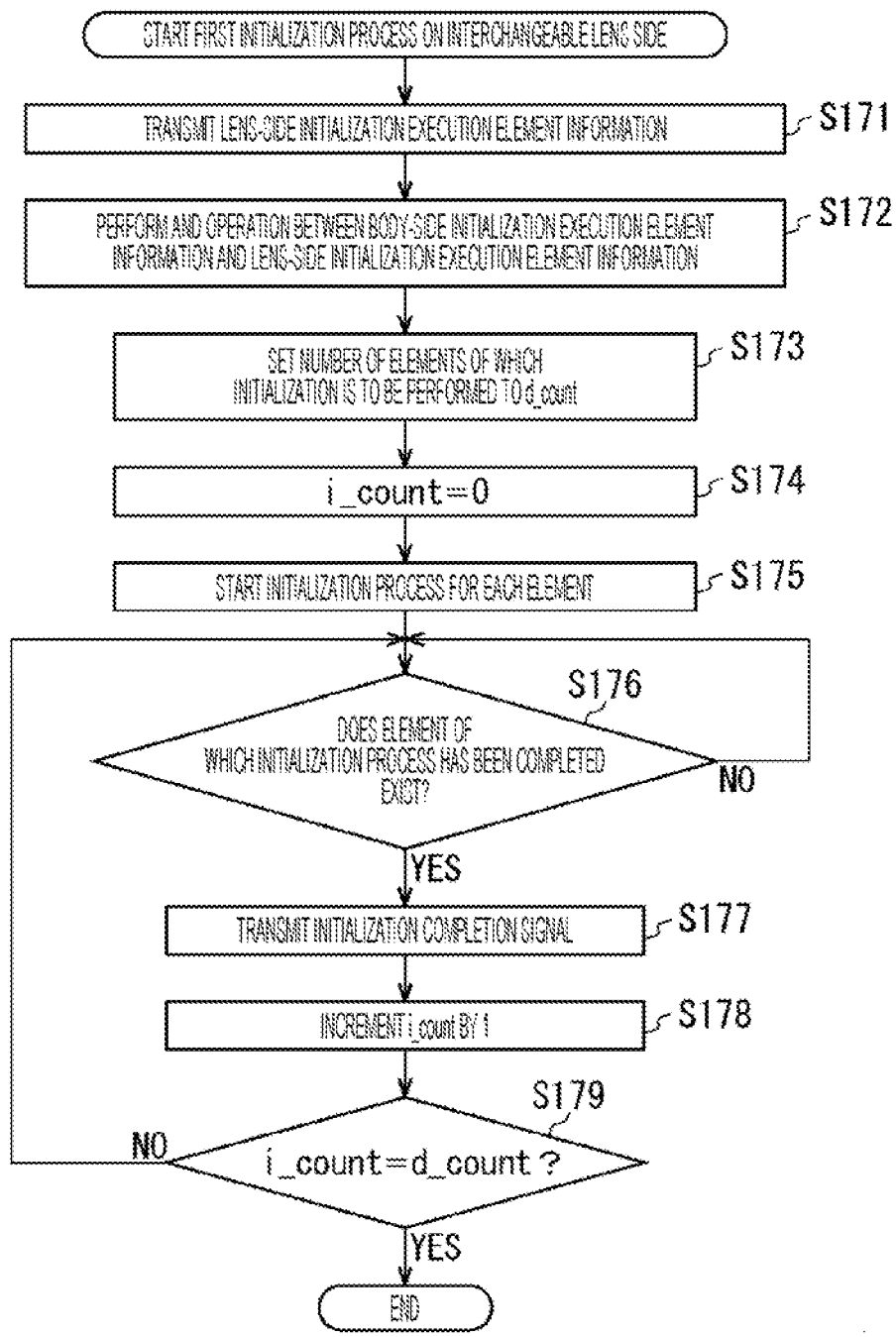
FIG. 22 is a flowchart illustrating a first initialization process executed on the interchangeable lens side in a case where elements to which the interchangeable lens and the body can correspond are coincident with each other.

The subsequent processes of steps S403 to S409 are similar to the processes of steps S173 to S179 of FIG. 22, respectively, and thus, the description thereof is omitted.

According to the second initialization process of the camera system 1 described above, even in a case where the elements to which the interchangeable lens 10 and the body 60 correspond are coincident with each other, the interchangeable lens 10 can perform initialization of all the elements which the interchangeable lens includes, and the body 60 can appropriately start the element corresponding initialization process in the order in which the initialization of each element on the interchangeable lens 10 side has been completed.

Accordingly, it is possible to correctly recognize the elements of each of the body 60 and the interchangeable lens 10 and to appropriately execute the initialization process.

<5.3 Case where Interchangeable Lens is Lower in Function than Body>

Next, a case where the interchangeable lens 10 is lower in function than the body 60 will be described.

Specifically, similarly to the case of the first initialization process, the body 60 corresponds to the diaphragm, the zoom lens, the focus lens, and the camera shake control, and the interchangeable lens 10 is a short focus lens and does not have a zoom function and a camera shake correction function but corresponds to only the diaphragm and the focus lens.

Figure 33:
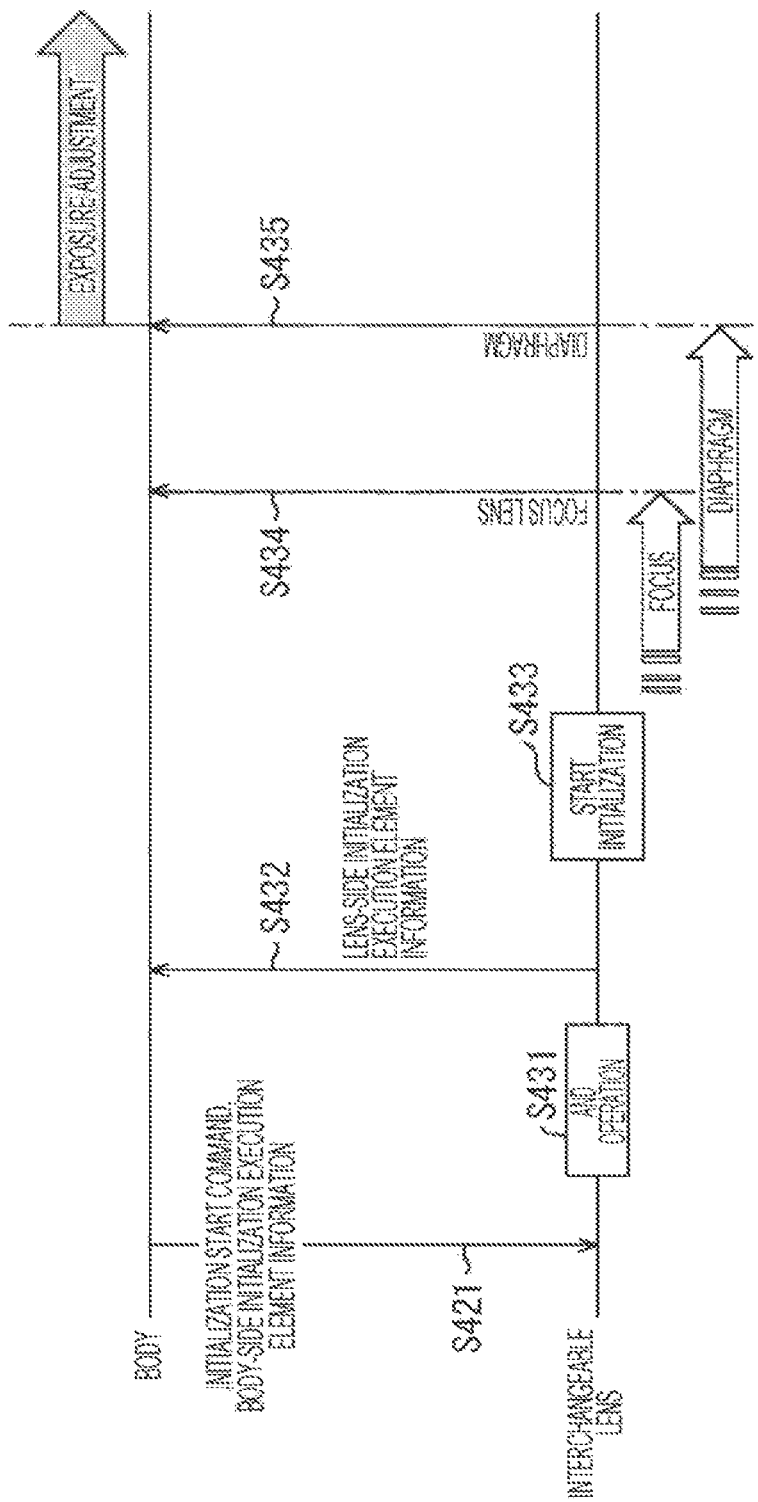
FIG. 33 is a diagram illustrating a process flow of a second initialization process corresponding to the case illustrated in FIG. 24.

FIG. 33 illustrates a process flow in a case where the interchangeable lens 10 does not correspond to the elements to which the body 60 can correspond, corresponding to the case illustrated in FIG. 24 in the first initialization process.

First, in step S421, the body control unit 72 transmits the body-side initialization execution element information indicating elements on which the body 60 performs initialization, together with an initialization start command requesting the start of initialization, to the lens control unit 22.

Upon receiving the initialization start command and the body-side initialization execution element information, in step S431, the lens control unit 22 performs an AND operation between the received body-side initialization execution element information and the element information indicating an element to which the lens control unit itself corresponds.

Then, in step S432, the lens control unit 22 transmits a result of the AND operation as lens-side initialization execution element information indicating initialization elements on which the lens control unit 22 itself performs initialization to the body control unit 72.

The body-side initialization execution element information transmitted by the body control unit 72 in step S421 is the same as the body-side initialization execution element information illustrated by A of FIG. 23. The lens-side initialization execution element information transmitted by the lens control unit 22 in step S432 is element information corresponding to a result of the AND operation illustrated by C of FIG. 23. The initialization completion transmission elements are two elements of the diaphragm and the focus lens.

After transmitting the lens-side initialization execution element information in step S432, the lens control unit 22 starts the initialization process of each element in step S433. Any one of step S432 and step S433 may be performed earlier, or the processes may be performed simultaneously.

After that, in steps S434 and S435, the lens control unit 22 sequentially transmits the initialization completion signals of the elements of which the initialization processes have been completed to the body control unit 72 at the timing when the initialization process of each element has been completed.

In the example of FIG. 33, in steps S434 and S435, the initialization process has been completed in the order of the focus lens and the diaphragm, and the initialization completion signals are transmitted in this order. The order of completion of the initialization is an exemplary one.

In a case where the interchangeable lens 10 does not correspond to the elements to which the body 60 can correspond, the body control unit 72 determines which element among the plurality of elements of which the completion of initialization is transmitted from the lens control unit 22 is associated with the exposure adjustment process (diaphragm). Therefore, the body control unit 72 starts the element corresponding initialization process in the order of the elements of which the completion of initialization has been received.

<Flowchart of Second Initialization Process on Body Side>

The second initialization process executed on the body 60 side in a case where the interchangeable lens 10 does not correspond to the elements to which the body 60 can correspond is similar to the second initialization process described with reference to FIG. 29 in a case where only the interchangeable lens 10 corresponds to a new element, and thus, the description thereof will be omitted.

<Flowchart of Second Initialization Process on Lens Side>

The second initialization process executed on the interchangeable lens 10 side in a case where the interchangeable lens 10 does not correspond to the elements to which the body 60 can correspond is similar to the second initialization process described with reference to FIG. 32 in a case where the elements to which the interchangeable lens 10 and the body 60 can correspond are coincident with each other, and thus, the description thereof will be omitted.

According to the second initialization process of the camera system 1 described above, even in a case where the interchangeable lens 10 does not correspond to the elements to which the body 60 can correspond, the interchangeable lens 10 can perform initialization of all the elements which the interchangeable lens includes, and the body 60 can appropriately start the element corresponding initialization process in the order in which the initialization of each of the elements on the interchangeable lens 10 side has been completed.

Accordingly, it is possible to correctly recognize the elements of each of the body 60 and the interchangeable lens 10 and to appropriately execute the initialization process.

<6. Selection of Initialization Process>

As described above, in the interchangeable lens 10, in a case where the elements which the body 60 and the interchangeable lens 10 include are equal to each other or in a case where the interchangeable lens 10 does not correspond to the elements to which the body 60 can correspond, the body 60 can correspond all the elements which the interchangeable lens 10 includes, each element in the interchangeable lens 10 may transmit the initialization completion signal to the body 60 at the timing when the initialization has been completed.

On the other hand, in a case where the interchangeable lens 10 is higher in function than the body 60 and the body 60 does not correspond to some elements (new elements) which the interchangeable lens 10 includes, the interchangeable lens 10 side determines whether or not the new elements are associated with the exposure adjustment process (whether or not the new elements influences the exposure adjustment process). In a case where it is determined that the new elements are associated with the exposure adjustment process, the initialization completion signal of the diaphragm is allowed to wait as necessary, and it is necessary to transmit the initialization completion signal as included in the initialization completion signal of the diaphragm to the body 60.

Therefore, it may be necessary for the interchangeable lens 10 to switch the initialization process depending on whether or not the interchangeable lens 10 is higher in function than the body 60.

Figure 34:
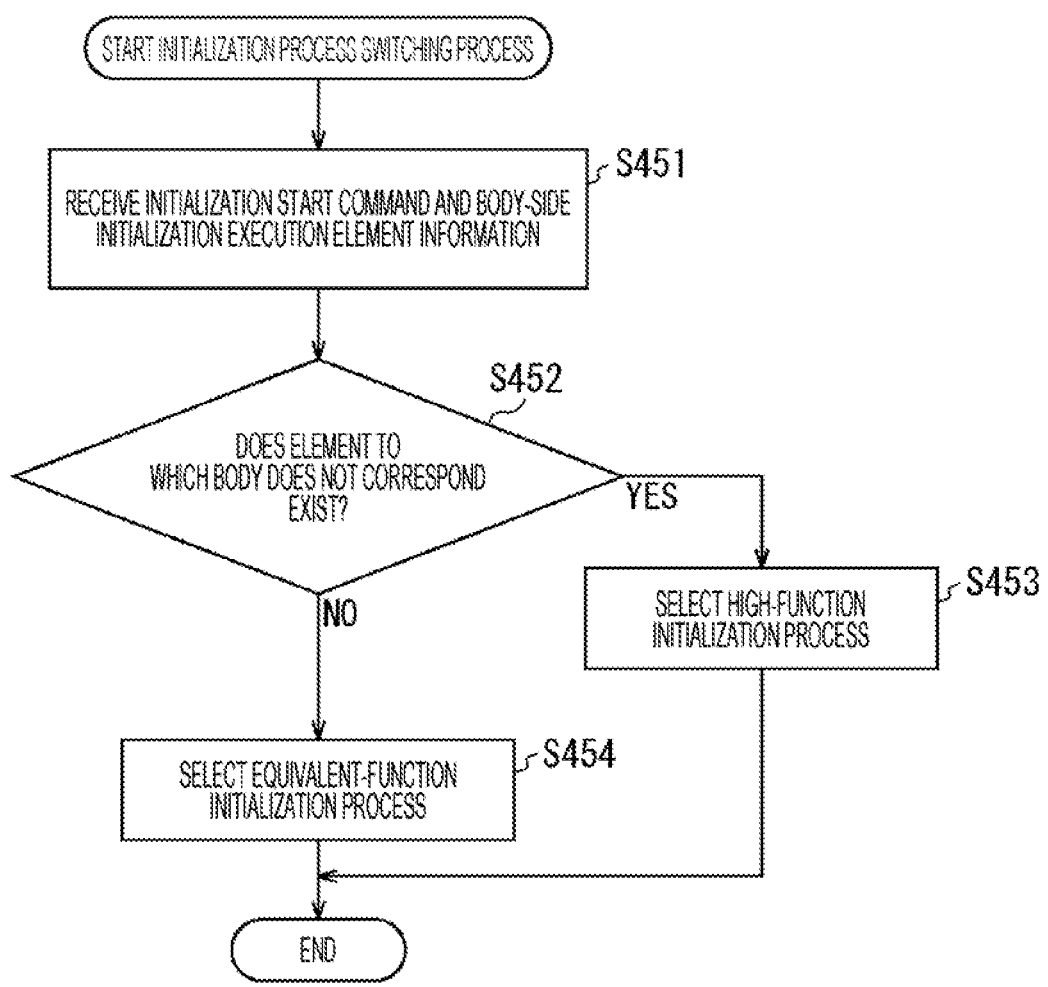
FIG. 34 is a flowchart illustrating an initialization process switching process executed by an interchangeable lens.

FIG. 34 is a flowchart of the initialization process switching process executed by the interchangeable lens 10.

First, in step S451, the lens control unit 22 receives the initialization start command and the body-side initialization execution element information transmitted from the body control unit 72.

In step S452, the lens control unit 22 compares the received body-side initialization execution element information with the element information indicating an element to which the lens control unit itself corresponds and determines whether or not the interchangeable lens 10 has an element to which the body 60 does not correspond.

In step S452, in a case where it is determined that the interchangeable lens 10 has the element to which the body 60 does not correspond, the process proceeds to step S453, and the lens control unit 22 selects a high-function initialization process. With respect to the first initialization process, the high-function initialization process corresponds to the first initialization process illustrated in FIG. 16, and with respect to the second initialization process, the high-function initialization process corresponds to the second initialization process illustrated in FIG. 30.

On the other hand, in a case where it is determined in step S452 that the interchangeable lens 10 does not have the element to which the body 60 does not correspond, the process proceeds to step S454, and the lens control unit 22 selects an equivalent-function initialization process.

Figure 32:
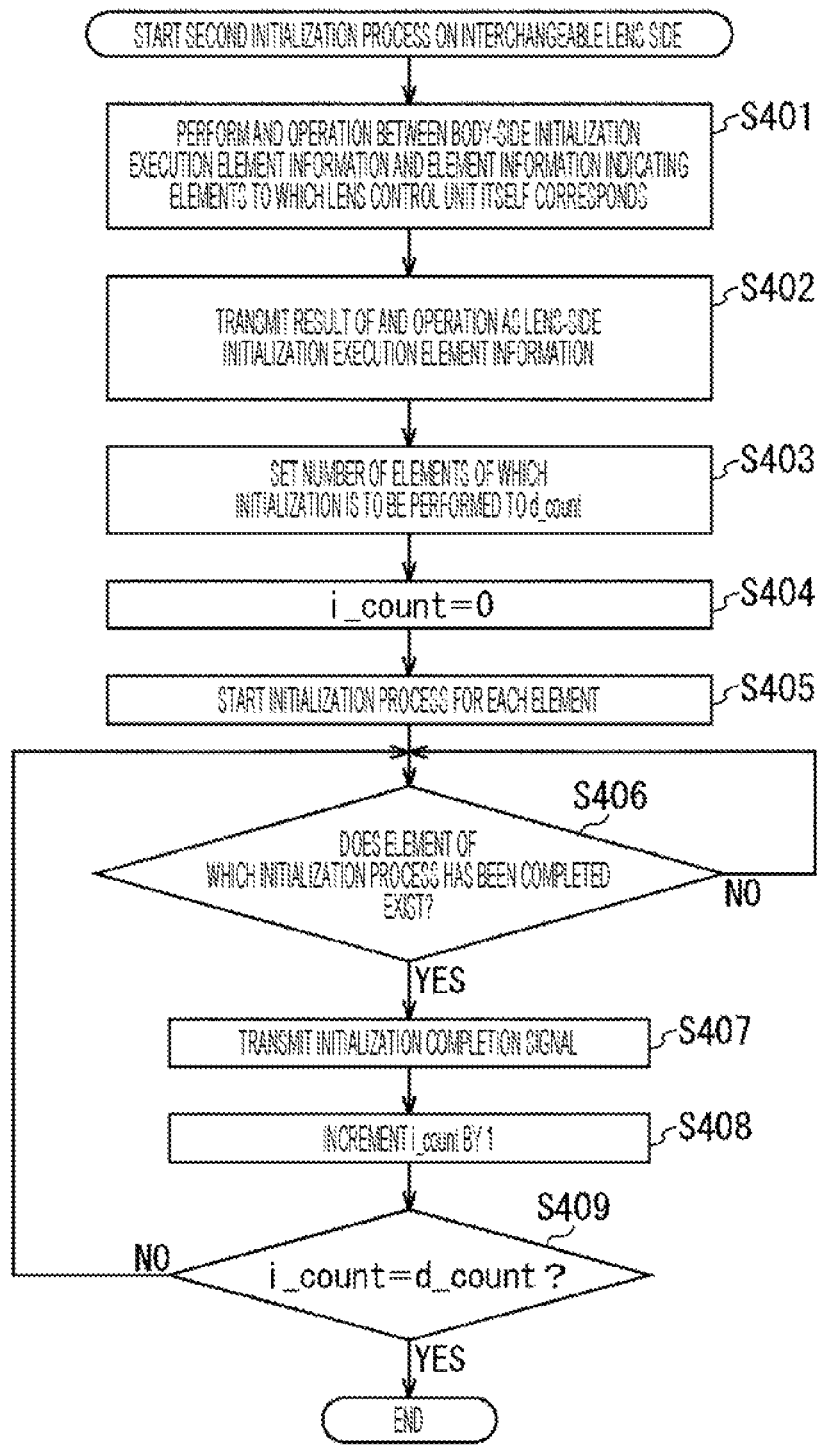
FIG. 32 is a flowchart illustrating a second initialization process executed on the interchangeable lens side in a case where elements to which the interchangeable lens and the body can correspond are coincident with each other.

With respect to the first initialization process, the equivalent function initialization process corresponds to the first initialization process illustrated in FIG. 22, and with respect to the second initialization process, the equivalent function initialization process corresponds to the second initialization process illustrated in FIG. 32.

In addition, a process of determining whether or not the interchangeable lens 10 includes an element to which the body 60 does not correspond in step S452 is configured to be inserted after step S76 of FIG. 16. In a case where it is determined that the interchangeable lens 10 includes an element to which the body 60 does not correspond, the processes of steps S77 to S79 of FIG. 16 are configured to be executed. In a case where it is determined that the interchangeable lens 10 does not include an element to which the body 60 does not correspond, the process of step S177 of FIG. 22 is configured to be executed. As a result, the flowcharts of FIGS. 16 and 22 are combined into one flowchart.

As described above, the interchangeable lens 10 switches the initialization process depending on whether or not the interchangeable lens itself is higher in function than the body 60.

<7. Summary>

In the camera system 1 including the interchangeable lens 10 and the body 60, the body control unit 72 transmits the body-side initialization execution element information indicating the elements (body-side elements) on which the body 60 performs initialization to the lens control unit 22 and receives the lens-side initialization execution element information which is transmitted from the lens control unit 22 according to the body-side initialization execution element information and indicates the elements (lens-side elements) on which the interchangeable lens 10 performs initialization.

In response to reception of the body-side initialization execution element information indicating the elements (body-side elements) on which the body 60 performs initialization from the body control unit 72, the lens control unit 22 transmits the lens-side initialization execution element information indicating the elements (lens-side elements) which the interchangeable lens 10 performs initialization to the body control unit 72.

The lens-side initialization execution element information in the first initialization process is information which can identify all of the plurality of lens-side elements on which the interchangeable lens 10 performs initialization, and the lens-side initialization execution element information in the second initialization process is information capable of identifying at least one common element common to the plurality of lens-side elements on which the interchangeable lens 10 performs initialization and the plurality of lens-side elements which are indicated by the body-side initialization execution element information. In the first initialization process, if all the common elements common to the plurality of body-side elements indicated by the body-side initialization execution element information and the plurality of lens-side elements indicated by the lens-side initialization execution element information are received, the body control unit 72 determines that the initialization on the interchangeable lens 10 side has been completed. In the second initialization process, if the initialization completion signals of all of the plurality of lens-side elements indicated by the lens-side initialization execution element information are received, the body control unit 72 determines that the initialization on the interchangeable lens 10 side has been completed.

As described with reference to FIG. 17, in a case where the plurality of elements which the interchangeable lens 10 includes include the diaphragm and the non-corresponding exposure influencing elements to which the body 60 does not correspond and which influence the exposure adjustment process of the body 60, the lens control unit 22 stores the initialization completion signal of the diaphragm in the queue buffer for command transmission at the timing according to the initialization completion of all the non-corresponding exposure influencing elements and the diaphragm. In a case where the plurality of elements which the interchangeable lens 10 includes include the corresponding elements to which the body 60 corresponds and the non-corresponding elements to which the body 60 does not correspond, if there are two or more corresponding elements of which the initialization has not been completed, irrespective of the presence or absence of non-corresponding elements of which the initialization has not been completed, the lens control unit 22 stores the initialization completion signals of one corresponding element of which the initialization has been completed in the queue buffer for command transmission at the timing according to the initialization completion of the one corresponding element among the two or more corresponding elements of which the initialization has not been completed.

As described with reference to FIG. 18, in a case where the plurality of elements which the interchangeable lens 10 includes include the non-corresponding exposure influencing elements to which the body 60 does not correspond and which influence the exposure adjustment process of the body 60 and the corresponding exposure influencing elements to which the body 60 correspond and which influences the exposure adjustment process of the body 60, if the corresponding exposure influencing element of which the initialization completion signal has not been transmitted is the last one, the lens control unit 22 stores the initialization completion signal of the last corresponding exposure influencing element to which the body 60 corresponds in the queue buffer at the time when the initialization of all the non-corresponding exposure influencing elements has been completed.

As described with reference to FIG. 19, in a case where the plurality of elements which the interchangeable lens 10 includes include at least one corresponding exposure non-influencing element which does not influence the exposure adjustment process of the body 60 and to which the body 60 corresponds and at least one non-corresponding exposure non-influencing element which does not influence the exposure adjustment process of the body 60 and to which the body 60 does not correspond, if the non-corresponding exposure non-influencing elements of which the initialization has not been completed remain at the timing when the entire initialization of the corresponding exposure non-influencing elements has been completed, the lens control unit 22 waits for the initialization completion of all the non-corresponding exposure non-influencing elements and stores the initialization completion signal of the corresponding exposure non-influencing element of which the initialization has been finally completed in the queue buffer for command transmission.

The lens control unit 22 performs the initialization process on the exposure influencing elements which influence the exposure adjustment process of the body 60 and the exposure non-influencing elements which do not influence the exposure adjustment process of the body 60 in different schemes. Alternatively, the lens control unit 22 performs the initialization process on the corresponding elements to which the body 60 corresponds and the non-corresponding elements to which the body 60 does not correspond in different schemes. Herein, the different schemes denote that the timing of storage in the queue buffer for command transmission is different. In response to reception of the initialization completion signal of all elements influencing the exposure adjustment process, the body control unit 72 starts the initialization including the exposure adjustment process.

By transmitting and receiving the body-side initialization execution element information and the lens-side initialization execution element information, it is possible to correctly recognize the elements of each of the body 60 and the interchangeable lens 10 and to appropriately execute the initialization process.

In the initialization process described above, the body-side initialization execution element information is configured to be transmitted from the body 60 to the interchangeable lens 10 together with the initialization start command. However, the body-side initialization execution element information may be configured to be transmitted from the body 60 to the interchangeable lens 10 at a timing different from that of the initialization start command. For example, the body-side initialization execution element information may be configured to be transmitted from the body 60 to the interchangeable lens 10 at a timing after or before the initialization start command, differently from the initialization start command.

<8. Synchronization Command and Asynchronization Commands>

In the camera system 1 of FIG. 1, one or more commands are packetized into one packet and transmitted through packet communication. One packet is configured to include a header, a command, and a footer. The header is added before the command, and the footer is added after the command. The footer includes a checksum for confirming the presence or absence of a communication error of the command on the reception side.

As commands exchanged between the lens control unit 22 and the body control unit 72, there are two kinds of commands, that is, a synchronization command for performing communication in synchronization with a synchronization signal and a synchronization command for performing communication at an arbitrary timing independently of the timing of the synchronization signal. Herein, the synchronization signal used for the synchronization command includes not only a synchronization signal itself transmitted through a synchronization signal terminal but also a signal obtained by frequency-dividing or multiplying the synchronization signal. Namely, the lens control unit 22 performs communication by using a synchronization command with the body control unit 72 on the basis of a synchronization signal or a signal obtained by frequency-dividing or multiplying the synchronization signal. In case of performing communication based on a signal obtained by frequency-dividing or multiplying a synchronization signal, the lens control unit 22 also performs a process of generating a signal obtained by frequency-dividing or multiplying a synchronization signal transmitted through the synchronization signal terminal.

Since a synchronization command is communicated in synchronization with a synchronization signal, the timing of transmitting a next second synchronization command after transmitting a first synchronization command becomes the timing of a synchronization signal after the synchronization signal that has transmitted the first synchronization command.

A synchronization command is used, for example, as a command for the lens control unit 22 to notify the body control unit 72 of a lens state of the interchangeable lens 10. More specifically, a synchronization command is used for the lens control unit 22 to transmit position information of the zoom lens 23, the diaphragm 25, and the focus lens 26. In addition, a synchronization command is also used for instructing a predetermined operation from the body control unit 72 to the lens control unit 22.

On the other hand, for example, in a case where communication error of a command occurs in the interchangeable lens 10, an asynchronization command is used for immediately notifying the body control unit 72 of a message indicating that the communication error has occurred. Namely, the lens control unit 22 detects the presence or absence of communication error of the command transmitted from the body control unit 72 by determining the checksum, and in a case where the communication error is detected, the lens control unit transmits a message indicating that the communication error has occurred to the body control unit 72 by using an asynchronization command. Therefore, the body control unit 72 that has received the asynchronization command indicating that the communication error has occurred can immediately perform a recovery process for recovering the communication error.

In addition, an asynchronization command is also used as a command (including data) such as the initialization start command, the initialization execution element information, and the initialization completion signal transmitted between the lens control unit 22 and the body control unit 72 in the above-described first and second initialization processes.

In addition, in a case where the control unit (the lens control unit 22 or the body control unit 72) on the reception side normally receives a command through the communication terminal, the control unit on the reception side may return a response indicating that the command has been received or may not return a response depending on the type of the received command.

Figure 35:
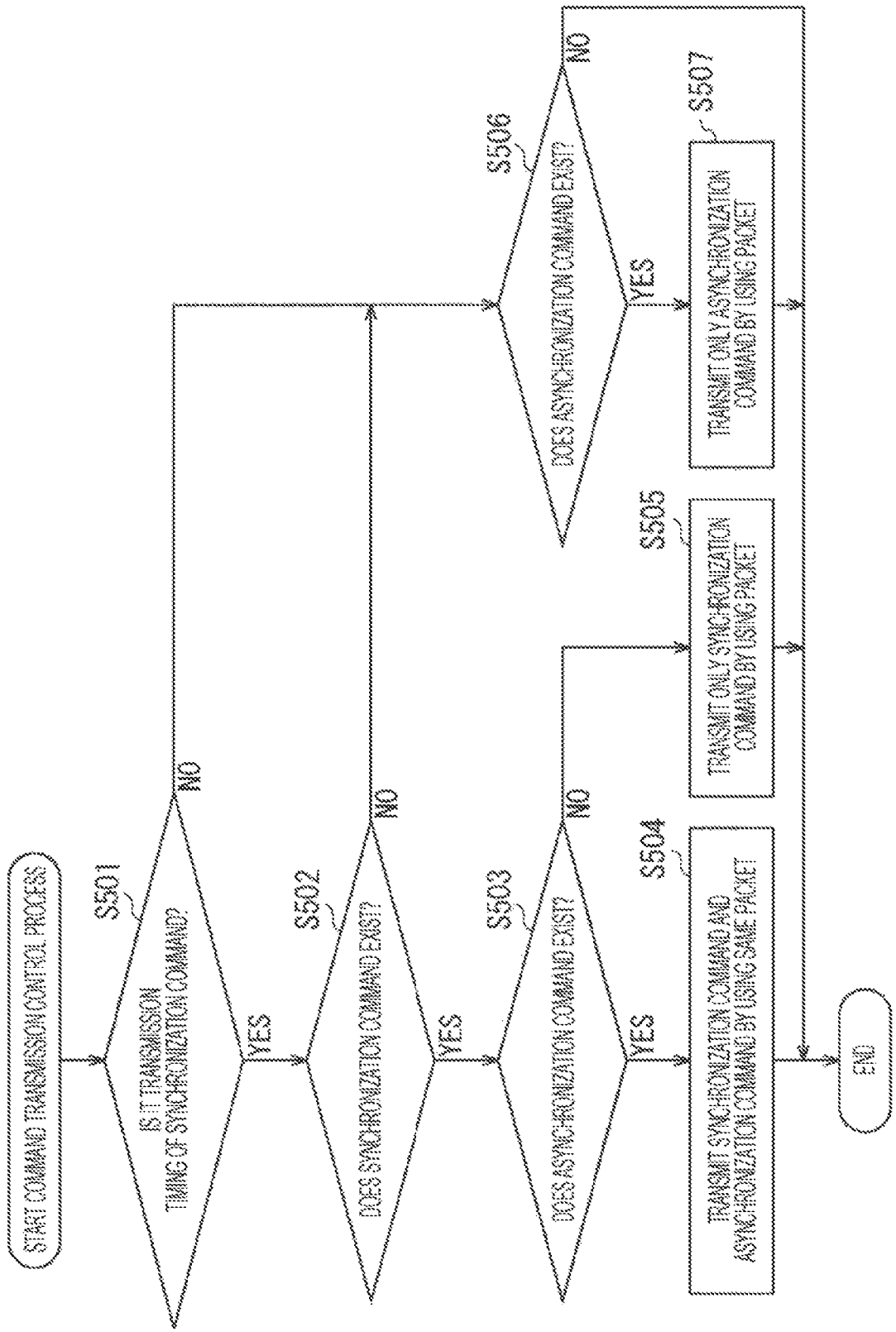
FIG. 35 is a flowchart illustrating a command transmission control process.

A command transmission control process which is a control process where the lens control unit 22 transmits a command to the body control unit 72 will be described with reference to the flowchart of FIG. 35. The command transmission control process of FIG. 35 is repeatedly executed, for example, at a cycle obtained by multiplying the synchronization signal, or at a cycle shorter than the multiplied cycle thereof.

First, in step S501, the lens control unit 22 determines whether or not it is the transmission timing of the synchronization command.

In a case where it is determined in step S501 that it is the transmission timing of the synchronization command, in step S502, the lens control unit 22 determines whether or not a synchronization command to be transmitted to the body control unit 72 exists.

In a case where the synchronization command to be transmitted to the body control unit 72 in response to the control of the interchangeable lens 10 such as the position information of the focus lens 26 is generated, the lens control unit 22 stores the synchronization command in the queue buffer for the synchronization command inside the lens control unit 22. In step S502, the lens control unit 22 determines whether or not a synchronization command to be transmitted to the body control unit 72 exists in the queue buffer for the synchronization command.

In step S502, in a case where it is determined that there is a synchronization command to be transmitted to the body control unit 72, the process proceeds to step S503, and the lens control unit 22 determines whether or not an asynchronization command to be transmitted to the body control unit 72 exists.

In a case where an asynchronization command to be transmitted to the body control unit 72 is generated in response to the control of the interchangeable lens 10 such as driving amount information of the focus lens 26, the lens control unit 22 stores the asynchronization command in a queue buffer for an asynchronization command inside the lens control unit 22. In step S503, the lens control unit 22 determines whether or not the asynchronization command to be transmitted to the body control unit 72 exists in the queue buffer for the asynchronization command.

In a case where it is determined in step S503 that the asynchronization command exists, the process proceeds to step S504, the lens control unit 22 transmits the synchronization command and the asynchronization command existing in the queue buffer to the body control unit 72 by using the same packet, and the process is ended.

Figure 36:
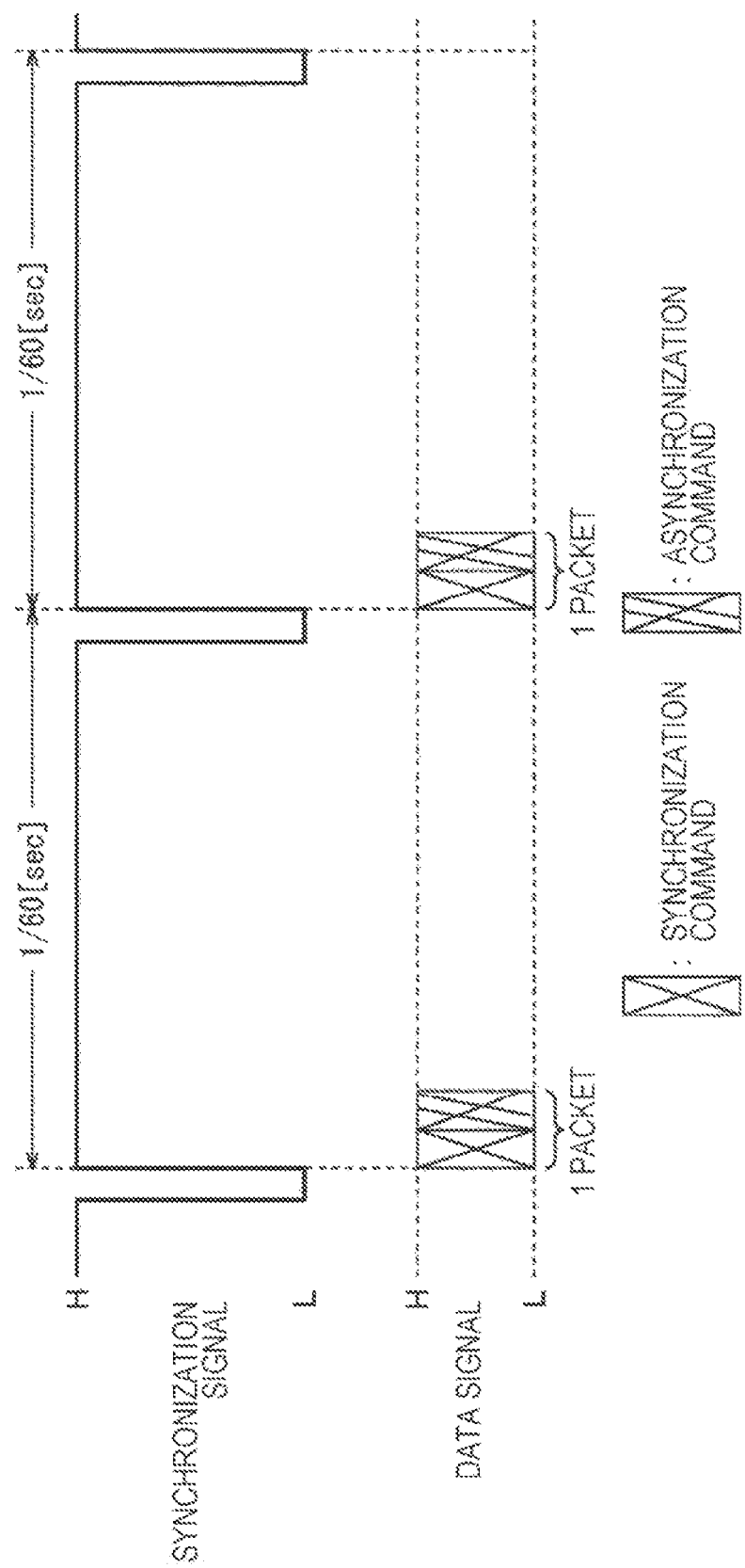
FIG. 36 is a time chart illustrating an example of packet communication in step S504 of FIG. 35.

FIG. 36 is a time chart illustrating an example of the packet communication executed in step S504.

In FIG. 36, a cycle of the synchronization signal is 1/60 sec, and a minimum transmission interval of the synchronization command is 1/60 sec.

In a case where the asynchronization command exists at the transmission timing of the synchronization command, as illustrated in FIG. 36, the synchronization command and the asynchronization command are multiplexed and transmitted by using one packet. In FIG. 36, the state where the synchronization command and the asynchronization command are in contact with each other indicates that the synchronization command and the asynchronization command are transmitted in one packet.

On the other hand, in a case where it is determined in step S503 that no asynchronization command exists, the process proceeds to step S505, the lens control unit 22 transmits only the synchronization command to the body control unit 72 by using a packet, and the process is ended.

Figure 37:
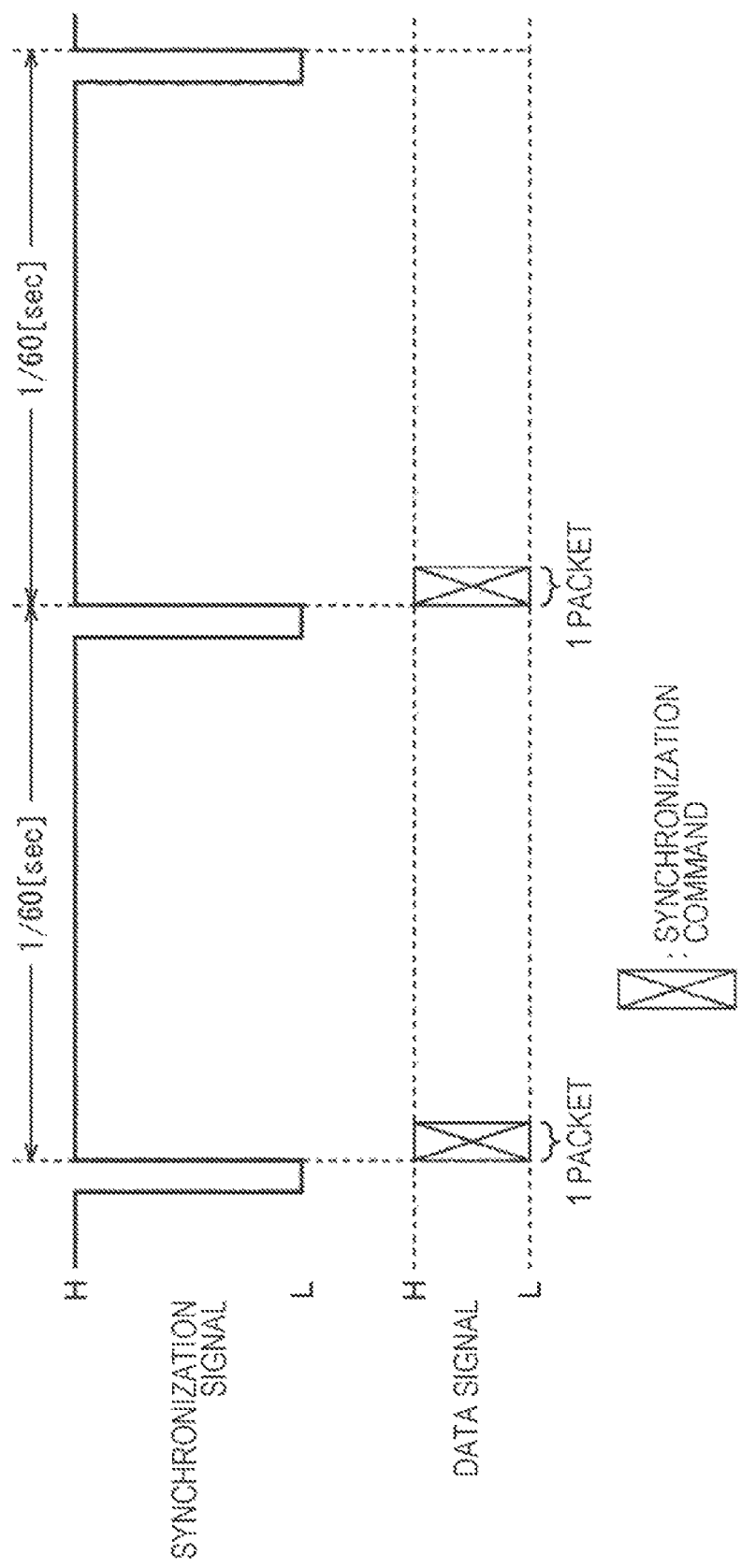
FIG. 37 is a time chart illustrating an example of packet communication in step S505 of FIG. 35.

FIG. 37 is a time chart illustrating an example of packet communication executed in step S505.

In a case where no asynchronization command exists at the transmission timing of the synchronization command, as illustrated in FIG. 37, only the synchronization command is transmitted by using one packet.

On the other hand, in a case where it is determined in step S501 that it is not the timing of transmitting the synchronization command, or in a case where it is determined in step S502 that no synchronization command to be transmitted to the body control unit 72 exists, the process proceeds to step S506, and the lens control unit 22 determines whether or not an asynchronization command to be transmitted to the body control unit 72 exists in the queue buffer for the asynchronization command.

In a case where it is determined in step S506 that an asynchronization command exists, the process proceeds to step S507, the lens control unit 22 transmits only the asynchronization command to the body control unit 72 by using a packet, and the process is ended.

FIG. 38 is a time chart illustrating an example of packet communication executed in step S507.

In a case where an asynchronization command exists except for the transmission timing of the synchronization command, as illustrated in FIG. 38, a packet with only the asynchronization command is transmitted. In a case where a plurality of asynchronization commands exist, the plurality of asynchronization commands are multiplexed and transmitted by using one packet. In FIG. 38, the state where two asynchronization commands are in contact with each other indicates that the two asynchronization commands are transmitted by using one packet. The asynchronization command can be transmitted at the time corresponding to a cycle of the synchronization signal or a cycle obtained by multiplying the synchronization signal.

On the other hand, in a case where it is determined in step S506 that no asynchronization command exists, the lens control unit 22 ends the process as it is. Namely, in a case where it is determined in step S506 that no asynchronization command exists, neither the synchronization command nor the asynchronization command is transmitted, and the process is ended.

The above-described command transmission control process is a process in a case where the lens control unit 22 transmits a command to the body control unit 72. Similarly, even in case of transmitting a command from the body control unit 72 to the lens control unit 22, the command transmission control process is executed.

As described above, in a case where the timing of transmitting the asynchronization command is coincident with the timing of transmitting the synchronization command, the body control unit 72 and the lens control unit 22 can transmit the asynchronization command and the synchronization command by using the same packet. For example, an asynchronization command indicating speed information of the focus lens and a synchronization command indicating position information of the focus lens are multiplexed to be stored in a command portion of the packet. A checksum for determining the presence or absence of communication error is calculated in units of a packet and stored in the footer. Since the checksum determination process is performed for each packet, by multiplexing and transmitting the asynchronization command and the synchronization command by using one packet, it is possible to reduce the checksum determination process, so that it can contribute to reduction of the calculation processing amount and the processing time on the reception side.

In addition, by transmitting the asynchronization command and the synchronization command by using the same packet, it is possible to reduce the amount of data communication, so that it is possible to efficiently transmit and receive data. It also contributes to lower power consumption. Since asynchronization commands are also used for commands (including data) such as the initialization start command, the initialization execution element information, and the initialization completion signal described above, after the initialization completion of each element, notice of the completion of initialization can be given from the lens control unit 22 to the body control unit 72 without delay, so that the initialization time of the entire camera system 1 can be shortened.

Embodiments of the present technology are not limited to the above-described embodiments, but various modifications are available within the scope without departing from the spirit of the present technology.

For example, the camera system 1 configured with the detachable interchangeable lens 10 and the imaging apparatus 60 may be configured to perform only one of the first initialization process and the second initialization process described above, may be configured to perform both of the processes, or may be configured to select and perform any one of the processes as necessary.

In the above-described embodiments, under the condition that the body 60 does not correspond to some elements (new elements) which the interchangeable lens 10 includes, a case where the diaphragm is set as a priority element, and the initialization completion signal is included in the diaphragm to be transmitted and a case where the initialization completion signal is included in an element other than the diaphragm to be transmitted are distinguished. However, an element other than the diaphragm may be distinguished as a priority element. In addition, instead of distinguishing into two, the elements may be distinguished into three or more.

In this specification, the steps described in the flowcharts are processed in a time sequence manner according to the order of the disclosure. However, the steps may be not necessarily processed in a time sequence manner, but the steps may be performed either in parallel or in such a manner that the steps are performed at a necessary timing such as a timing when there is a call.

In addition, in this specification, the system denotes a group of a plurality of components (apparatuses, modules (parts), or the like), and it does not matter whether or not all components are in the same casing. Therefore, a plurality of apparatuses accommodated in separate casings and connected through a network and a single apparatus accommodating a plurality of modules in a single casing are systems.

The effects described in this specification are merely exemplary ones and are not intended to limit the present technology, and there may be effects other than those described in this specification. Furthermore, the present technology can also have the following configurations.

(1)

An interchangeable lens including a lens control unit configured to transmit lens-side initialization execution element information indicating a plurality of lens-side elements on which the lens control unit itself performs initialization to an imaging apparatus in response to reception of body-side initialization execution element information indicating body-side elements on which the imaging apparatus performs initialization from the imaging apparatus.

(2)

The interchangeable lens according to (1), in which the lens-side initialization execution element information is information capable of identifying all of a plurality of lens-side elements on which the interchangeable lens performs initialization.

(3)

The interchangeable lens according to (1), in which the lens-side initialization execution element information is information capable of identifying at least one common element common to the plurality of lens-side elements on which the interchangeable lens performs initialization and the plurality of body-side elements indicated by the body-side initialization execution element information.

(4)

The interchangeable lens according to any of (1) to (3), in which the lens control unit receives the body-side initialization execution element information together with an initialization start command requesting start of the initialization of the interchangeable lens from the imaging apparatus.

(5)

The interchangeable lens according to any of (1) to (4), in which the lens control unit transmits the lens-side initialization execution element information to the imaging apparatus before starting the initialization of the plurality of lens-side elements.

(6)

The interchangeable lens according to any of (1) to (5), in which the lens control unit stores an initialization completion signal indicating initialization completion of each of the lens-side elements in a queue buffer for transmission to the imaging apparatus every time when the initialization of each lens-side element of the plurality of lens-side elements has been completed.

(7)

The interchangeable lens according to (6), in which in a case where the plurality of lens-side elements include a diaphragm and non-corresponding exposure influencing element to which the imaging apparatus does not correspond and which influences an exposure adjustment process of the imaging apparatus, and the lens control unit stores the initialization completion signal of the diaphragm in the queue buffer at a timing according to the initialization completion of all the non-corresponding exposure influencing elements and the diaphragm.

(8)

The interchangeable lens according to (6) or (7), in which in a case where the plurality of lens-side elements include corresponding elements to which the imaging apparatus corresponds and non-corresponding elements to which the imaging apparatus does not correspond, if there are two or more corresponding elements of which the initialization has not been completed, irrespective of the presence or absence of the non-corresponding element of which the initialization has not been completed, the lens control unit stores the initialization completion signal of one corresponding element of which the initialization has been completed in the queue buffer at a timing according to the initialization completion of the one corresponding element of the two or more corresponding elements of which the initialization has not been completed.

(9)

The interchangeable lens according to any of (6) to (8), in which in a case where the plurality of lens-side elements include non-corresponding exposure influencing elements to which the imaging apparatus does not correspond and which influence an exposure adjustment process of the imaging apparatus and corresponding exposure influencing elements to which the imaging apparatus corresponds and which influence the exposure adjustment process of the imaging apparatus, if the corresponding exposure influencing element of which the initialization completion signal has not been transmitted is the last one, the lens control unit stores the initialization completion signal of the last corresponding exposure influencing element to which the imaging apparatus corresponds in the queue buffer at a time when the initialization of all the non-corresponding exposure influencing elements has been completed.

(10)

The interchangeable lens according to any of (6) to (9), in which in a case where the plurality of lens-side elements include at least one corresponding exposure non-influencing element which is an exposure non-influencing element which does not influence an exposure adjustment process of the imaging apparatus and to which the imaging apparatus corresponds and at least one non-corresponding exposure non-influencing element which is the exposure non-influencing element and to which the imaging apparatus does not correspond, if the non-corresponding exposure non-influencing elements of which the initialization has not been completed remain at a timing when the entire initialization of the corresponding exposure non-influencing elements has been completed, the lens control unit waits for the initialization completion of all the non-corresponding exposure non-influencing element and stores the initialization completion signal of the corresponding exposure non-influencing element of which the initialization has been finally completed in the queue buffer.

(11)

The interchangeable lens according to any of (6) to (10), in which the lens control unit transmits the initialization completion signal to the imaging apparatus by asynchronous communication.

(12)

The interchangeable lens according to any of (1) to (11), in which the lens control unit exclusively performs the initialization process on a non-corresponding exposure influencing element to which the imaging apparatus does not correspond and which influences an exposure adjustment process of the imaging apparatus and a non-corresponding exposure non-influencing element to which the imaging apparatus does not correspond and which does not influence the exposure adjustment process of the imaging apparatus among the lens-side elements.

(13)

The interchangeable lens according to any of (1) to (12), in which the plurality of lens-side elements include exposure influencing elements which influence an exposure adjustment process of the imaging apparatus and exposure non-influencing elements which do not influence the exposure adjustment process, and the lens control unit performs the initialization process on the exposure influencing elements and the exposure non-influencing elements in different schemes.

(14)

The interchangeable lens according to any of (1) to (12), in which the plurality of lens-side elements include corresponding elements to which the imaging apparatus corresponds and non-corresponding elements to which the imaging apparatus does not correspond, and the lens control unit performs the initialization process on the corresponding elements and the non-corresponding elements in different schemes.

(15)

The interchangeable lens according to (13) or (14), in which the different schemes denote that the timing of storage in the queue buffer for transmission to the imaging apparatus is different among the elements of which the initialization has been completed.

(16)

The interchangeable lens according to any of (1) to (15), in which the lens control unit transmits the lens-side initialization execution element information to the imaging apparatus by asynchronous communication.

(17)

An imaging apparatus including a body control unit configured to transmit body-side initialization execution element information indicating a plurality of body-side elements which are elements on which the body control unit itself performs initialization to an interchangeable lens and to perform initialization on the plurality of body-side elements on which the body control unit itself performs initialization in response to lens-side initialization element information which is received from the interchangeable lens and indicates a plurality of lens-side elements which are elements on which the interchangeable lens performs initialization.

(18)

The imaging apparatus according to (17), in which the lens-side initialization execution element information is information capable of identifying at least one common element common to the plurality of lens-side elements on which the interchangeable lens performs initialization and the plurality of body-side elements indicated by the body-side initialization execution element information.

(19)

The imaging apparatus according to (18), in which the body control unit determines that the initialization on the interchangeable lens side has been completed on the basis of reception of the initialization completion signals of all the common elements indicated by the lens-side initialization execution element information.

(20)

The imaging apparatus according to (17), in which the lens-side initialization execution element information is information capable of identifying all of a plurality of lens-side elements on which the interchangeable lens performs initialization.

(21)

The imaging apparatus according to (20), in which the body control unit determines that the initialization on the interchangeable lens side has been completed on the basis of reception of the initialization completion signals of all the common elements common to the plurality of body-side elements indicated by the body-side initialization execution element information and the plurality of lens-side elements indicated by the lens-side initialization execution element information.

(22)

The imaging apparatus according to any of (17) to (21), in which the body control unit transmits the body-side initialization execution element information together with an initialization start command requesting start of initialization to the interchangeable lens.

(23)

The imaging apparatus according to any of (17) to (22), in which the body control unit starts an exposure adjustment process as the initialization in response to reception of the initialization completion signals of all elements which influence the exposure adjustment process.

(24)

A camera system including:
an interchangeable lens; and
an imaging apparatus,
in which the interchangeable lens includes a lens control unit configured to transmit lens-side initialization execution element information indicating a plurality of lens-side elements which are elements on which the interchangeable lens performs initialization to the imaging apparatus in response to reception of body-side initialization execution element information indicating body-side elements which are elements on which the imaging apparatus performs initialization from the imaging apparatus, and
the imaging apparatus includes a body control unit configured to transmit the body-side initialization execution element information to the interchangeable lens and to perform initialization on a plurality of body-side elements on which the imaging apparatus performs initialization in response to the lens-side initialization execution element information received from the interchangeable lens.

(25)

A control method of an interchangeable lens including a lens control unit configured to transmit lens-side initialization execution element information indicating a plurality of lens-side elements on which the lens control unit itself performs initialization to an imaging apparatus in response to reception of body-side initialization execution element information indicating body-side elements on which the imaging apparatus performs initialization from the imaging apparatus.

(26)

A program causing a computer of a interchangeable lens to execute a process of transmitting lens-side initialization execution element information indicating a plurality of elements on which the lens control unit itself performs initialization to an imaging apparatus in response to reception of body-side initialization execution element information indicating body-side elements on which the imaging apparatus performs initialization from the imaging apparatus.

(27)

A control method of an imaging apparatus, in which a body control unit of the imaging apparatus transmits body-side initialization execution element information indicating a plurality of body-side elements which are elements on which the body control unit itself performs initialization to an interchangeable lens and performs initialization on the plurality of body-side elements on which the body control unit itself performs initialization in response to lens-side initialization element information which is received from the interchangeable lens and indicates a plurality of lens-side elements which are elements on which the interchangeable lens performs initialization.

(28)

A program causing a computer of an imaging apparatus to execute a process of:
transmitting body-side initialization execution element information indicating a plurality of body-side elements which are elements on which a body control unit itself performs initialization to an interchangeable lens; and performing initialization on the plurality of body-side elements on which the body control unit itself performs initialization in response to lens-side initialization element information which is received from the interchangeable lens and indicates a plurality of lens-side elements which are elements on which the interchangeable lens performs initialization.

(A1)

An interchangeable lens including a lens control unit configured to transmit lens-side initialization execution element information indicating a plurality of lens-side elements which are elements on which the lens control unit itself performs initialization in response to an initialization start command from the imaging apparatus to the imaging apparatus.

(A2)

The interchangeable lens according to (A1), in which the lens control unit further stores an initialization completion signal indicating initialization completion of each of the lens-side elements in a queue buffer for transmission to the imaging apparatus every time when the initialization of each lens-side element of the plurality of lens-side elements has been completed.

(A3)

The interchangeable lens according to (A2), in which in a case where the plurality of lens-side elements include a diaphragm and non-corresponding exposure influencing element to which the imaging apparatus does not correspond and which influences an exposure adjustment process of the imaging apparatus, and the lens control unit stores the initialization completion signal of the diaphragm in the queue buffer at a timing according to the initialization completion of all the non-corresponding exposure influencing elements and the diaphragm.

(A4)

The interchangeable lens according to (A2), in which in a case where the plurality of lens-side elements include corresponding elements to which the imaging apparatus corresponds and non-corresponding elements to which the imaging apparatus does not correspond, if there are two or more corresponding elements of which the initialization has not been completed, irrespective of the presence or absence of the non-corresponding element of which the initialization has not been completed, the lens control unit stores the initialization completion signal of one corresponding element of which the initialization has been completed in the queue buffer at a timing according to the initialization completion of the one corresponding element of the two or more corresponding elements of which the initialization has not been completed.

(A5)

The interchangeable lens according to (A2), in which in a case where the plurality of lens-side elements include non-corresponding exposure influencing elements to which the imaging apparatus does not correspond and which influence an exposure adjustment process of the imaging apparatus and corresponding exposure influencing elements to which the imaging apparatus corresponds and which influence the exposure adjustment process of the imaging apparatus, if the corresponding exposure influencing element of which the initialization completion signal has not been transmitted is the last one, the lens control unit stores the initialization completion signal of the last corresponding exposure influencing element to which the imaging apparatus corresponds in the queue buffer at a time when the initialization of all the non-corresponding exposure influencing elements has been completed.

(A6)

The interchangeable lens according to (A2), in which in a case where the plurality of lens-side elements include at least one corresponding exposure non-influencing element which is an exposure non-influencing element which does not influence an exposure adjustment process of the imaging apparatus and to which the imaging apparatus corresponds and at least one non-corresponding exposure non-influencing element which is the exposure non-influencing element and to which the imaging apparatus does not correspond, if the non-corresponding exposure non-influencing elements of which the initialization has not been completed remain at a timing when the entire initialization of the corresponding exposure non-influencing elements has been completed, the lens control unit waits for the initialization completion of all the non-corresponding exposure non-influencing element and stores the initialization completion signal of the corresponding exposure non-influencing element of which the initialization has been finally completed in the queue buffer.

(A7)

The interchangeable lens according to (A2), in which the lens control unit transmits the initialization completion signal to the imaging apparatus by asynchronous communication.

(A8)

The interchangeable lens according to (A1), in which the lens control unit exclusively performs the initialization process on a non-corresponding exposure influencing element to which the imaging apparatus does not correspond and which influences an exposure adjustment process of the imaging apparatus and a non-corresponding exposure non-influencing element to which the imaging apparatus does not correspond and which does not influence the exposure adjustment process of the imaging apparatus among the lens-side elements.

(A9)

The interchangeable lens according to (A1), in which the plurality of lens-side elements include exposure influencing elements which influence an exposure adjustment process of the imaging apparatus and exposure non-influencing elements which do not influence the exposure adjustment process, and the lens control unit performs the initialization process on the exposure influencing elements and the exposure non-influencing elements in different schemes.

(A10)

The interchangeable lens according to (A9), in which the plurality of lens-side elements include corresponding elements to which the imaging apparatus corresponds and non-corresponding elements to which the imaging apparatus does not correspond, and the lens control unit performs the initialization process on the corresponding elements and the non-corresponding elements in different schemes.

(A11)

The interchangeable lens according to (A1), in which the different schemes denote that the timing of storage in the queue buffer for transmission to the imaging apparatus is different among the elements of which the initialization has been completed.

(A12)

The interchangeable lens according to (A1), in which the lens control unit transmits the lens-side initialization execution element information to the imaging apparatus by asynchronous communication.

(B1)

A interchangeable lens including a lens control unit configured to transmit an initialization completion signal indicating initialization completion of each lens-side element to the imaging apparatus at a timing according to the initialization completion of each lens-side element, in a case where the lens-side elements includes a diaphragm and non-corresponding exposure influencing element to which the imaging apparatus does not correspond and which influences an exposure adjustment process of the imaging apparatus, the lens control unit stores the initialization completion signal of the diaphragm in a queue buffer for transmission to the imaging apparatus on condition that the initialization of all the non-corresponding exposure influencing elements and the diaphragm has been completed.

(B2)

The interchangeable lens according to (B1), in which in a case where the plurality of lens-side elements include corresponding elements to which the imaging apparatus corresponds and non-corresponding elements to which the imaging apparatus does not correspond, if there are two or more corresponding elements of which the initialization has not been completed, irrespective of the presence or absence of the non-corresponding element of which the initialization has not been completed, the lens control unit stores the initialization completion signal of one corresponding element of which the initialization has been completed in the queue buffer at a timing according to the initialization completion of the one corresponding element of the two or more corresponding elements of which the initialization has not been completed.

(B3)

The interchangeable lens according to (B1), in which in a case where the plurality of lens-side elements include non-corresponding exposure influencing elements to which the imaging apparatus does not correspond and which influence an exposure adjustment process of the imaging apparatus and corresponding exposure influencing elements to which the imaging apparatus corresponds and which influence the exposure adjustment process of the imaging apparatus, if the corresponding exposure influencing element of which the initialization completion signal has not been transmitted is the last one, the lens control unit stores the initialization completion signal of the last corresponding exposure influencing element to which the imaging apparatus corresponds in the queue buffer at a time when the initialization of all the non-corresponding exposure influencing elements has been completed.

(B4)

The interchangeable lens according to (B1), in which in a case where the plurality of lens-side elements include at least one corresponding exposure non-influencing element which is an exposure non-influencing element which does not influence an exposure adjustment process of the imaging apparatus and to which the imaging apparatus corresponds and at least one non-corresponding exposure non-influencing element which is the exposure non-influencing element and to which the imaging apparatus does not correspond, if the non-corresponding exposure non-influencing elements of which the initialization has not been completed remain at a timing when the entire initialization of the corresponding exposure non-influencing elements has been completed, the lens control unit waits for the initialization completion of all the non-corresponding exposure non-influencing element and stores the initialization completion signal of the corresponding exposure non-influencing element of which the initialization has been finally completed in the queue buffer.

(B5)

The interchangeable lens according to (B1), in which the lens control unit transmits the initialization completion signal to the imaging apparatus by asynchronous communication.

(B6)

The interchangeable lens according to (B1), in which the lens control unit further transmits lens-side initialization execution element information indicating a plurality of lens-side elements which are elements on which the lens control unit itself performs initialization to the imaging apparatus in response to reception of body-side initialization execution element information indicating body-side elements on which the imaging apparatus performs initialization from the imaging apparatus.

(B7)

The imaging apparatus according to (B6), in which the lens-side initialization execution element information is information capable of identifying all of a plurality of lens-side elements on which the interchangeable lens performs initialization.

(B8)

The interchangeable lens according to (B6), in which the lens-side initialization execution element information is information capable of identifying at least one common element common to the plurality of lens-side elements on which the interchangeable lens performs initialization and the plurality of body-side elements indicated by the body-side initialization execution element information.

(B9)

The interchangeable lens according to (B6), in which the lens control unit receives the body-side initialization execution element information together with an initialization start command requesting start of the initialization of the interchangeable lens from the imaging apparatus.

(B10)

The interchangeable lens according to (B6), in which the lens control unit transmits the lens-side initialization execution element information to the imaging apparatus before starting the initialization.

REFERENCE SIGNS LIST

1 Camera system
10 Interchangeable lens
22 Lens control unit
23 Zoom lens
24 Camera shake correction lens
25 Diaphragm
26 Focus lens
27 Liquid crystal ND filter
28 Lens barrel display unit
30 Memory unit
31 Recording unit
60 Imaging apparatus (body)
72 Body control unit
78 Recording unit
83 Recording medium

The invention claimed is:

1. An interchangeable lens comprising:
one or more lens-side processors configured to
transmit lens-side initialization element information indicating a plurality of lens-side elements to an imaging apparatus, and
perform initialization of the plurality of lens-side elements.

2. The interchangeable lens according to claim 1, wherein the one or more lens-side processors is further configured to
transmit the lens-side initialization element information in response to reception of body-side element information, the body-side element information indicating which initialization completion signals of the plurality of lens-side elements the imaging apparatus is configured to recognize, wherein
each of the initialization completion signals corresponds to a different one of the lens-side elements.

3. The interchangeable lens according to claim 2, wherein the one or more lens-side processors is configured to
transmit the initialization completion signal for each of the plurality of lens-side elements that the imaging apparatus is configured to recognize based on the body-side element information.

4. The interchangeable lens according to claim 2, wherein the one or more lens-side processors is configured to
receive the body-side element information and an initialization start command from the imaging apparatus, and
start the initialization of the plurality of lens-side elements in response to the initialization start command.

5. The interchangeable lens according to claim 1, wherein the one or more lens-side processors is configured to
transmit the lens-side initialization element information to the imaging apparatus before starting the initialization of the plurality of lens-side elements.

6. The interchangeable lens according to claim 5, wherein the one or more lens-side processors is configured to
receive an initialization start command from the imaging apparatus, and
start the initialization of the plurality of lens-side elements in response to the initialization start command.

7. The interchangeable lens according to claim 1, wherein the one or more lens-side processors is configured to
transmit a separate initialization completion signal for each of the plurality of lens-side elements.

8. The interchangeable lens according to claim 1, further comprising:
a lens mount configured to attach to the imaging apparatus.

9. The interchangeable lens according to claim 1, wherein the plurality of lens-side elements includes at least two of a zoom lens, a camera shake correction lens, a lock of the camera shake correction lens, a diaphragm, or a focus lens.

10. The interchangeable lens according to claim 1, wherein
when the plurality of lens-side elements includes (i) a diaphragm and (ii) an exposure influencing element that influences an exposure adjustment process of the imaging apparatus and is not recognized by the imaging apparatus, the one or more lens-side processors is configured to transmit an initialization completion signal of the diaphragm after the initialization of the diaphragm and the exposure influencing element are completed.

11. The interchangeable lens according to claim 1, wherein the one or more lens-side processors is configured to
transmit an initialization completion signal of a first one of the plurality of lens-side elements that is recognized by the imaging apparatus after completion of the initialization of the first one of the plurality of lens-side elements and a second one of the plurality of lens-side elements that is not recognized by the imaging apparatus.

12. The interchangeable lens according to claim 1, wherein the one or more lens-side processors is configured to
transmit an initialization completion signal of one of the plurality of lens-side elements in response to completion of the initialization of the one of the plurality of lens-side elements.

13. The interchangeable lens according to claim 1, wherein the one or more lens-side processors is configured to
transmit, for each of the plurality of lens-side elements that the imaging apparatus is configured to recognize, an initialization completion signal to the imaging apparatus by asynchronous communication.

14. An imaging apparatus comprising:
one or more body-side processors configured to
transmit body-side element information to an interchangeable lens, the body-side element information indicating which initialization completion signals of a plurality of lens-side initialization elements the imaging apparatus is configured to recognize, and
recognize at least one of the initialization completion signals of the plurality of lens-side initialization elements according to lens-side initialization element information received from the interchangeable lens.

15. The imaging apparatus according to claim 14, wherein the one or more body-side processors is configured to
transmit the body-side element information before a start of initialization of the plurality of lens-side initialization elements by the interchangeable lens.

16. The imaging apparatus according to claim 14, wherein the lens-side initialization element information indicates each of the plurality of lens-side elements on which the interchangeable lens performs initialization.

17. The imaging apparatus according to claim 15, wherein the one or more body-side processors is configured to
transmit an initialization start command to the interchangeable lens.

18. The imaging apparatus according to claim 14, wherein the one or more body-side processors is configured to
start an exposure adjustment process in response to reception of the initialization completion signal from each of the plurality of lens-side elements that influence the exposure adjustment process and that is recognized by the imaging apparatus.

19. The imaging apparatus according to claim 14, wherein the one or more body-side processors is configured to
determine when an initialization of the interchangeable lens is completed based on reception of each of the initialization completion signals of the plurality of lens-side elements that is recognized by the imaging apparatus.

* * * * *